United States Patent
Noblett et al.

(10) Patent No.: US 12,458,404 B2
(45) Date of Patent: Nov. 4, 2025

(54) METHODS AND ARRANGEMENTS FOR EXTERNAL FIXATORS

(71) Applicants: Smith & Nephew, Inc., Memphis, TN (US); Smith & Nephew Orthopaedics AG, Zug (CH); Smith & Nephew Asia Pacific Pte. Limited, Singapore (SG)

(72) Inventors: Andrew P. Noblett, Bartlett, TN (US); Johnny R. Mason, Bartlett, TN (US); Paul Bell, Memphis, TN (US); Haden Janda, Germantown, TN (US); Shawn Standard, Cockeysville, MD (US); Benjamin Ollivere, Nottingham (GB)

(73) Assignees: SMITH & NEPHEW, INC., Memphis, TN (US); SMITH & NEPHEW ORTHOPAEDICS AG, Zug (CH); SMITH & NEPHEW ASIA PACIFIC PTE. LIMITED, Singapore (SG)

( * ) Notice: Subject to any disclaimer, the term of this patent is extended or adjusted under 35 U.S.C. 154(b) by 611 days.

(21) Appl. No.: 17/791,731

(22) PCT Filed: Feb. 26, 2021

(86) PCT No.: PCT/US2021/019818
§ 371 (c)(1),
(2) Date: Jul. 8, 2022

(87) PCT Pub. No.: WO2021/173931
PCT Pub. Date: Sep. 2, 2021

(65) Prior Publication Data
US 2023/0086184 A1    Mar. 23, 2023

Related U.S. Application Data

(60) Provisional application No. 62/982,215, filed on Feb. 27, 2020.

(51) Int. Cl.
A61B 17/56 (2006.01)
A61B 34/10 (2016.01)

(52) U.S. Cl.
CPC .............. *A61B 17/56* (2013.01); *A61B 34/10* (2016.02)

(58) Field of Classification Search
CPC ................................ A61B 17/56; A61B 34/10
See application file for complete search history.

(56) References Cited

U.S. PATENT DOCUMENTS

2017/0348054 A1*  12/2017  Kumar .................. A61B 34/25

FOREIGN PATENT DOCUMENTS

EP    3251625 A1    12/2017

OTHER PUBLICATIONS

International Search Report and Written Opinion dated Jun. 25, 2021, for the International Patent Application No. PCT/US2021/019818, filed on Feb. 26, 2021, 13 pages.

(Continued)

*Primary Examiner* — Olivia C Chang
(74) *Attorney, Agent, or Firm* — KDW Firm PLLC

(57) ABSTRACT

Logic may provide a deformity analysis to create a treatment plan for external fixators. Logic may further perform additional refinements to the treatment plan to improve the patient experience. Logic may further include pre-operative osteotomy to select an osteotomy and to provide real-time updates to a post-operative image based on changes to an osteotomy line, orientation, and/or rotation point. Logic may facilitate movement of one or two portions of a medical image to determine an alignment of bone segments in the portions of the medical image. Logic may generate deformity parameters based on a combination of translations and/or rotations of the movement to align the portions. Logic (Continued)

may create a treatment plan including a prescription for an external fixator based on deformity parameters.

11 Claims, 32 Drawing Sheets

(56) References Cited

OTHER PUBLICATIONS

Anonymous, "TRAUMACAD Software User Guide Revision 2.0", Dec. 31, 2019 (Dec. 31, 2019), p. 1-162, Retrieved from the Internet: URL:https://www.traumacad.com/support/release/TraumaCad/2.5/Setup/Brainlab/Documents/TraumaCad_User_Guide_2.5.6.1004.pdf XP055814580.

TraumaCad, "TraumaCad Deformity Course Part 3—Taylor Spatial Frame", Jan. 14, 2014 (Jan. 14, 2014), p. 2 pp., Retrieved from the Internet: URL:https://www.youtube.com/watch?v=UmMEySRj9_o XP054981914.

* cited by examiner

FIRST COMPONENT
SECOND COMPONENT

EXAMPLE PATIENT ☐ TIBIA EXAMPLE PROGRAM ⟫ RIGHT TIBIA/FIBULA - MID DIAPHYSIS    SURGEON 1  (RIGHT)

FRAME INFO  HARDWARE  IMAGES  SCALE  DEFORMITY  MOUNTING  RATE/SAR  PREVIEW  PRESCRIPTION    GO TO PATIENT SHEET ⟩   HELP

EXAMPLE PATIENT
☐ TIBIA EXAMPLE PROGRAM
  ⟫ RIGHT TIBIA/FIBULA - MID DIAPHYSIS

CARE TEAM CONTACT INFO       PRESCRIPTION NOTES

START  02/22/2018    ADJUSTMENTS PER DAY  ▽
REMINDERS  ON  OFF           ACTIVATE       ☐ PREVIEW PRESCRIPTION      ☐ PREVIEW REPORT
CORRECTION RATES
MAX. TRANSLATION 1 MM/DAY    MAX. ROTATION - - DEG/DAY
PRESCRIPTION

| DATE | WEEK DAY | DAY | STRUT 1 | STRUT 2 | STRUT 3 | STRUT 4 | STRUT 5 | STRUT 6 | NEW TR |
|---|---|---|---|---|---|---|---|---|---|
| 02/22/2018 | THU | 0 | 160.00 | 160.00 | 160.00 | 160.00 | 160.00 | 160.00 | 🗑 |
| 02/23/2018 | FRI | 1 | 161.00 | 159.50 | 160.00 | 160.25 | 160.75 | 159.50 | 🗑 |
| 02/24/2018 | SAT | 2 | 161.75 | 159.25 | 160.00 | 160.25 | 161.50 | 159.00 | 🗑 |
| 02/25/2018 | SUN | 3 | 162.75 | 158.75 | 160.25 | 160.50 | 162.00 | 158.50 | 🗑 |
| 02/26/2018 | MON | 4 | 163.50 | 158.50 | 160.25 | 160.75 | 162.75 | 158.00 | 🗑 |
| 02/27/2018 | TUE | 5 | 164.50 | 158.00 | 160.25 | 161.00 | 163.50 | 157.75 | 🗑 |
| 02/28/2018 | WED | 6 | 165.50 | 157.75 | 160.50 | 161.25 | 164.25 | 157.25 | 🗑 |
| 03/01/2018 | THU | 7 | 166.50 | 157.25 | 160.50 | 161.25 | 164.75 | 156.75 | 🗑 |
| 03/02/2018 | FRI | 8 | 167.25 | 157.00 | 160.50 | 161.50 | 165.50 | 156.50 | 🗑 |
| 03/03/2018 | SAT | 9 | 168.25 | 156.50 | 160.50 | 161.75 | 166.25 | 156.00 | 🗑 |
| 03/04/2018 | SUN | 10 | 169.25 | 156.25 | 160.75 | 161.75 | 167.00 | 155.75 | 🗑 |
| 03/05/2018 | MON | 11 | 170.25 | 155.75 | 160.75 | 162.00 | 167.75 | 155.50 | 🗑 |
| 03/06/2018 | TUE | 12 | 171.25 | 155.50 | 160.75 | 162.25 | 168.25 | 155.00 | 🗑 |
| 03/07/2018 | WED | 13 | 172.25 | 155.00 | 160.75 | 162.50 | 169.00 | 154.75 | 🗑 |

METHODS AND ARRANGEMENTS FOR EXTERNAL FIXATORS

CROSS-REFERENCE TO RELATED APPLICATIONS

This application is a National Phase filing of International Application No. PCT/US2021/019818, filed Feb. 26, 2021, which application is a non-provisional of, and claims the benefit of the filing date of, U.S. provisional patent application No. 62/982,215, filed Feb. 27, 2020, entitled "METHODS AND ARRANGEMENTS FOR EXTERNAL FIXATORS" the entirety of each application is incorporated by reference herein.

FIELD OF THE DISCLOSURE

The present disclosure relates generally to orthopedic devices, systems, and methods to facilitate alignment of bone segments or surgical navigation associated with a bone segments, and particularly to describe a deformity of the bone for generation of a treatment plan for external fixators.

BACKGROUND OF THE DISCLOSURE

Orthopedic surgeons must analyze a wide variety of deformities in which two or more bone segments are displaced or not aligned properly. Some simple deformities can be resolved acutely in clinic or in the operating room. Other ailments require careful planning and more prolonged treatment.

Also, many situations require the surgeons to cut deformed bone segments apart so that they can be corrected. The location of the cut, osteotomy, is critical to the end result of the procedure and can be difficult to plan. Literature states that an osteotomy should be placed at the apex of the deformity and oriented to the transverse bisector of the two axes if possible. However, clinical situations and anatomical constraints often prevent an osteotomy from being placed in the optimal location. A poorly chosen osteotomy location can result in residual deformities, poor corrections, and other issues. Literature does provide calculations to assess the impact of placing an osteotomy away from the ideal position but visualizing the true clinical impact can be difficult for surgeons. Prior art software tools do exist to aid with preoperatively planning osteotomies, but significant improvements are needed for the usability and versatility of such tools.

After an acceptable osteotomy location is established, an external fixator may be applied. When an external fixator is applied, the surgeon will need to analyze the patient's postoperative deformity in order to correct it. It is standard practice for surgeons to take multiple medical images when analyzing orthopedic deformities. Typically, images are captured of the involved bone segments in the frontal (AP) and sagittal (LAT) planes.

Orthopedic deformities are three dimensional problems and are typically described quantitatively with six deformity parameters, which can be measured with medical images and clinical evaluations. The deformity parameters are usually described as anteroposterior (AP) view translation, AP view angulation, sagittal (LAT) view translation, LAT view angulation, axial view translation, and axial view angulation. Deformity parameters are evaluated from medical images, AP and Lateral radiographs or three-dimensional (3D) imaging modalities, and clinical evaluations.

Since deformity analysis can be complicated, many software solutions exist to assist surgeons. Many external fixators also require software solutions to relate the deformity parameters of a patient to the hardware applied to the patient to generate a plan for adjusting the hardware to solve the patient's deformity. Some software solutions include digital tools for preoperative deformity planning, postoperative deformity analysis, and hardware related parameters within the same system. However, current software tools tend to be laborious and often require specialized knowledge in order to properly analyze deformed bone segments.

The methods and arrangements disclosed herein describe a comprehensive fixator software solution including a graphical method for digitally assessing bone segments preoperative and postoperatively that is designed to improve analysis speed and be more easily understood by those minimally skilled in orthopedic deformities over prior art.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The present disclosure provides methods and arrangements for determining preoperative osteotomy, deformity analysis, and creation of a treatment plan for external fixators. Some embodiments advantageously provide deformity analysis including creation of a treatment plan with tools to refine the treatment plan to improve the patient experience.

Preoperative osteotomy logic circuitry embodiments may utilize an image of a bone with a deformity and identify an osteotomy location on the bone either automatically based on known information about the image or based on location of a mechanical axis line for one or both bone segments input by a user. Osteotomy logic circuitry may divide the image into two portions and display the two portions in a potential post-operative result window next to a pre-operative plan window that includes the original image. A first portion of the image may have a first bone segment and a second portion of the image may have a second bone segment to facilitate alignment of the bone segments based on movement of the first and second portions of the image by the user. Furthermore, comprehensive logic circuitry may implement functionality to display, in real-time, how adjustments of an osteotomy position and/or rotation point affect correction plans in the post-operative window.

Comprehensive logic circuitry embodiments resulting in the generation of an external fixator adjustment plan may involve provision of the dimensions and specifications of external fixator hardware, deformity analysis of postoperative patient anatomy, parameters defining the position of the external fixation on the patient anatomy, and parameters defining the rate of correction. Deformity analysis may include identification of one or more post-operative medical images for processing, and division of the one or more images to include a first bone segment in a first portion and a second bone segment in a second portion. Once the images are divided into two portions, the user can translate and/or rotate one or both portions about a rotation point to align the bone segments. In some embodiments, deformity analysis logic circuitry may record the movement of the image segments, each containing a bone segment, to calculate deformity parameters. In other embodiments, deformity analysis logic circuitry may compare the original and final locations of the image segments, each containing a bone segment, to determine deformity parameters. The position of the external fixator on the patient and a correction rate may also be necessary user inputs prior to the comprehensive logic circuitry creating a treatment plan with a prescription for the external fixator.

Further features and advantages of at least some of the embodiments of the present invention, as well as the structure and operation of various embodiments of the present invention, are described in detail below with reference to the accompanying drawings.

BRIEF DESCRIPTION OF THE DRAWINGS

By way of example, a specific embodiment of the disclosed device will now be described, with reference to the accompanying drawings, in which:

FIG. 5D depicts an embodiment of a graphical user interface of a comprehensive logic circuitry defining the hardware used to construct the patient's external fixator;

FIG. 5H depicts an embodiment of a graphical user interface of a comprehensive logic circuitry showing a second image portion rotated relative to a first image portion about rotation point to achieve alignment and initial deformity parameters of the AP view calculated as the image portions are manipulated;

FIG. 5J depicts an embodiment of a graphical user interface of a comprehensive logic circuitry showing and a second image portion rotated relative to a first image portion about rotation point to achieve alignment and initial deformity parameters of the LAT view calculated as the image portions are manipulated;

FIG. 5K depicts an embodiment of a graphical user interface of a comprehensive logic circuitry showing calculated mounting parameters, which describe the location of the reference ring relative to the anatomy;

FIG. 5L depicts an embodiment of a graphical user interface of a comprehensive logic circuitry showing the determination of the correction rate;

FIG. 5M depicts an embodiment of a graphical user interface of a comprehensive logic circuitry showing a treatment plan;

Figure 1A:
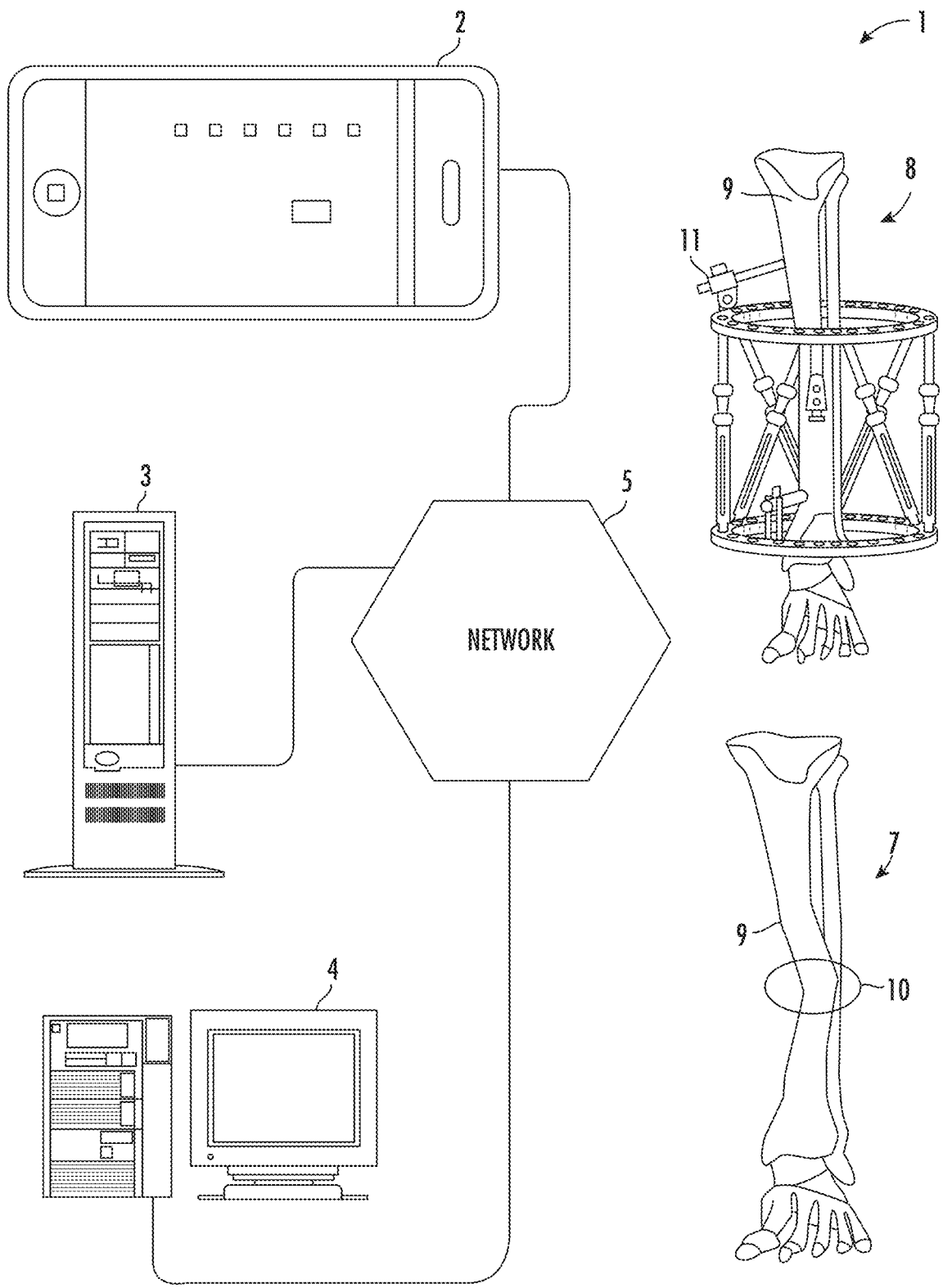
FIG. 1A illustrates an embodiment of is a system for treating a patient.

The drawings are not necessarily to scale. The drawings are merely representations, not intended to portray specific parameters of the disclosure. The drawings are intended to depict various embodiments of the disclosure, and therefore are not be considered as limiting in scope. In the drawings, like numbering represents like elements.

DETAILED DESCRIPTION

Embodiments comprise systems and arrangements for deformity analysis for external fixators to determine deformity parameters for a treatment plan. Some embodiments further comprise systems and arrangements for a preoperative osteotomy assessment to determine possible postoperative result of an osteotomy on a bone that may or may not be treated with an external fixator. Other embodiments further comprise systems and arrangements to generate a treatment plan for an external fixator. Still other embodiments comprise preoperative osteotomy, deformity analysis, and tools for generating a treatment plan for external fixators.

Many embodiments include osteotomy logic circuitry to perform a preoperative osteotomy assessment. The osteotomy logic circuitry may interact with a user to select an image of a bone with a deformity, interact with the user to determine placement of a virtual osteotomy and rotation point, and, in some embodiments, advantageously provide real-time feedback to the user by illustrating a possible correction of the deformity based on the osteotomy location/orientation and rotation point.

In many embodiments, the osteotomy logic circuitry may interact with a user to overlay a line to represent the osteotomy. In other words, the line may illustrate a surgical division of the bone into a first bone segment and a second bone segment. The ideal location for the osteotomy rotation point is the apex of the deformity. The apex of the deformity is at the intersection of the mechanical axes of the bone segments.

The ideal osteotomy location is the transverse bisector line of the apex of deformity, various issues may make an osteotomy location at the transverse bisector of the apex of deformity infeasible or impossible. For instance, growth plates or tissue damage may exist at the transverse bisector of the apex of deformity or the transverse bisector of the apex of deformity may be at a joint where there is no bone to osteotomize.

For situations in which the ideal osteotomy location is not feasible or possible, the osteotomy logic circuitry may interact with a user to determine an alternative osteotomy location that can still provide a desirable correction of the deformity. However, osteotomies and/or osteotomy rotation points located away from the ideal will result in unwanted translation(s) of the bone segments during correction. The unwanted translation(s) may be calculated by relating the position and orientation of the osteotomy and osteotomy rotation point to the ideal position and orientation. In several embodiments, the osteotomy logic circuitry may interact with a user to adjust the osteotomy and/or adjust the osteotomy rotation point and, in real-time, can illustrate the effect of the adjustments on the correction of the bone deformity.

In many embodiments, the osteotomy logic circuitry may interact with a user to determine a correction for the deformity by tracking user translation and/or rotation of one or two bone segments of the bone. Furthermore, the osteotomy logic circuitry may track or otherwise determine translations and/or rotations of the one or two bone segments used to align the bone segments and utilize the translations and/or rotations to determine measurements and/or deformity parameters associated with correction of the deformity of the bone.

In several embodiments, the osteotomy logic circuitry may interact with a user to overlay a mechanical axis through one of the two bone segments to facilitate determination of a correction of the bone deformity by the user. In other embodiments, the osteotomy logic circuitry may interact with a user to overlay a mechanical axis through each of the two bone segments to facilitate identification of the transverse bisector at the apex of the deformity and to facilitate identification of a correction via alignment of the mechanical axes of the two bone segments of the bone. Other embodiments may require the image of the bone to be oriented such that one bone segment is oriented at a predetermined orientation such as the mechanical axis of one segment being oriented vertical relative to the display window. In such embodiments, when the rotation point is placed at a predetermined location, such as the center of the bone segment along the osteotomy, the osteotomy logic circuitry can determine the mechanical axis of a bone segment as an axis corresponding to the orientation of the image and passing through the rotation point.

After preoperative osteotomy and/or after attachment of an external fixator to two bone segments to correct alignment of the two bone segments, many embodiments comprise deformity analysis logic circuitry to perform a deformity analysis as a component of a comprehensive logic circuitry for generating an adjustment plan for an external fixator. In some embodiments of the comprehensive logic circuitry, the deformity analysis logic circuitry may receive information about the preoperative osteotomy and one or more post-operative images to determine deformity measurements and parameters to correct the bone deformity.

In some embodiments, the deformity analysis logic circuitry may interact with a user to identify one or more two-dimensional (2D) or three-dimensional (3D) medical images in a data storage device such as a hard drive, disc drive, solid-state drive, and/or the like. The 2D medical images may include radiographs such as x-rays and the 3D medical images may comprise 3D medical images, such a CT scans, MRI scans, and/or the like.

The deformity analysis logic circuitry may interact with a user and one or more images to scale the image(s), identify the orientation of the image(s), identify a marker in the image(s) or a point common to more than one of the 2D images, and divide the image(s) into a first portion including a first bone segment and a second portion including a second bone segment. The anatomical directions necessary to orient the calculated translations and angulations require a coordinate system be established for each image. The coordinate system can be derived from markers within the image such radiolucent markers, user input (e.g. an origin point and an axis placed on the image), required orientation of the images (e.g. medial is oriented to the right and proximal is oriented at the top of the screen), or hardware orientation restrictions (e.g. bone fragment oriented orthogonal to certain fixator components).

The deformity analysis logic circuitry may interact with a user and one or more images to determine movements including translations and/or rotations to determine deformity parameters to facilitate generation of a treatment plan for an external fixator. Many embodiments facilitate identification and communication of the deformity by facilitation of graphical manipulation of the bone segments of a bone in one or more medical images. For example, an embodiment may comprise deformity analysis logic circuitry to interact with a user such as, e.g., a doctor. In such embodiments, the doctor may graphically interact with one or more images with at least two bone segments to determine information about the deformity of the bone segments. Graphical interaction between the doctor and the one or more images of the bone segments create a mathematical representation of the deformity of bone segments by digitally aligning the bone segments. The graphical interaction advantageously utilizes the skills already developed by physicians to physically align bones.

In some embodiments, the deformity analysis logic circuitry may record each translation and/or angulation of one or both bone segments. In other embodiments, the deformity analysis logic circuitry may compare the positions of one or both bone segments at least once, such as after the alignment of the bone segments in an image is approved, to determine each translation and angulation of the bone segments prior to correction. In some embodiments, using 3D imaging modalities of the deformity analysis logic circuitry, the alignment of one bone segment to the other bone segment plane may provide an estimate of the six deformity parameters. Some embodiments receive graphical input and perform the translation and angulations based on or responsive to the graphical input. For instance, using 3D imaging modalities, many embodiments may automatically determine an axial angulation.

Some embodiments may overlay one or more reference axes and/or reference lines on the first and/or second bone segments to facilitate graphical correction of the bone deformity. Further embodiments facilitate nudging (e.g. add 1 millimeter (mm) of translation medially, add 2 degrees of valgus about the rotation point, and/or the like) one or both bone segments in portions of an image to refine the alignment of the two bone segments.

In addition to identifying an alignment of the two bone segments through graphical manipulation of the first and/or second portions of the image, the deformity analysis logic circuitry may determine mounting parameters for the external fixator, determine the correction rate for the correction of the bone deformity via the external fixator, and calculate deformity parameters.

In some embodiments, the deformity analysis logic circuitry may reside in a remote computer accessible via a network and, in further embodiments, via an application such as a web browser. In other embodiments, the deformity analysis logic circuitry may reside on a local computer directly accessible by the user. In further embodiments, the deformity analysis logic circuitry may partially reside on a remote computer and partially reside on a local computer.

In some embodiments, the deformity analysis logic circuitry may couple with additional tools to facilitate generation of a treatment plan for the external fixator. For instance, the deformity analysis logic circuitry may interact with a user to modify the correction path, mark structures that are to be protected during the correction process, and possibly other processes to refine or improve the treatment plan.

While many embodiments herein discuss an exterior fixator for tibia and fibula fractures, embodiments are applicable to deformations of any orthopedic correction area. Furthermore, embodiments described herein focus primarily on a single fracture that separates a bone into two bone segments, but embodiments are not limited to a single fracture of, e.g., a tibia or fibula. Embodiments may address each pair of bone segments separately and the bone segments may be part of any bone. For instance, a tibia may be fractured into three bone segments, i.e., a first bone segment, a second bone segment, and a third bone segment. Such embodiments may identify the deformity of the first bone segment and the second bone segment and identify the deformity of the third bone segment with respect to the second bone segment.

Logic circuitry herein refers to a combination of hardware and code to perform functionality. For instance, the logic circuitry may include circuits such as processing circuits to execute instructions in the code, hardcoded logic, application specific integrated circuits (ASICs), processors, state machines, microcontrollers, and/or the like. The logic circuitry may also comprise memory circuits to store code and/or data, such as buffers, registers, random access memory modules, flash memory, and/or the like.

An embodiment of a system 1 for treating a patient is illustrated in FIG. 1A. The system 1 illustrated is only one example of a system. The system 1 may include comprehensive logic circuitry 180 (shown in FIG. 1H). Referring to FIGS. 1A and 1H, the comprehensive logic circuitry 180 may include the osteotomy logic circuitry 182, deformity analysis logic circuitry 188, and treatment logic circuitry 192. The comprehensive logic circuitry 180 may comprise any combination of hardware-based logic in the form of circuitry designed, configured, configured via code, and/or circuitry maintaining code to perform one or more elements of a comprehensive package of tools to create a treatment plan for external fixators such as the bone alignment device 11. In some embodiments, the comprehensive logic circuitry 180 may also include tracking logic circuitry 184, navigated surgery logic circuitry 186, and library logic circuitry 190.

The comprehensive logic circuitry 180 may comprise the osteotomy logic circuitry 182 to interact with a user such as a surgeon to graphically identify a preoperative osteotomy location on a bone 9 with a deformity 10, to perform deformity analysis post-operatively of the bone segments resulting from an osteotomy, and to perform additional processing, as desired, to create a treatment plan for an external fixator based on deformity parameters determined during the deformity analysis. Other systems may use the different external fixators than the bone alignment device 11 to repair bone deformities in the same or other bones.

The system 1 may begin with a preoperative procedure using osteotomy logic circuitry 182 to analyze the deformity 10 of the bone 9 for a patient. In some embodiments, the osteotomy logic circuitry 182 is a stand-alone software application and not a part of a comprehensive logic circuitry 180. The osteotomy logic circuitry 182 may interact with a user to identify one or more images to process to analyze the deformity. For instance, the user may identify the one or more images on a local device such as a Health Care Practitioner (HCP) device 4 and/or remotely on a server such as the server computer 3. In some embodiments, the osteotomy logic circuitry 182 may reside in the server computer 3 and may interact with the user remotely via. e.g., the HCP device 4. In other embodiment, the osteotomy logic circuitry 182 may reside in the HCP device 4 and may interact with the server computer 3 remotely to access data such as a library of external fixator specifications and dimensions, software, and/or medical images in the library logic circuitry 190. In still other embodiments, the osteotomy logic circuitry 182 may reside partially or entirely in the server computer 3, the HCP device 4, and/or other devices coupled with the network 5 and may interact with a user of the HCP device 4.

In some embodiments, the osteotomy logic circuitry 182 may only require a 2D view in an image to analyze the deformity 10. In other embodiments, the osteotomy logic circuitry 182 may require a 3D analysis of the deformity 10. In embodiments for 3D deformity analysis, the osteotomy logic circuitry 182 may analyze the deformity via, e.g., two 2D images or one 3D image.

When performing a 3D analysis, the osteotomy logic circuitry 182 may use AP and LAT views in 2D images with known scales and require identification of a common point or marker to create a coordinate system for the image that can be translated into a 3D coordinate system implemented by the osteotomy logic circuitry 182. In further embodiments, the osteotomy logic circuitry 182 may interact with the user to identify a marker or common point to the two 2D images or to identify a marker in the 3D image of known dimensions and orientation such as an anatomical structure, a structure of the bone alignment device 11, or a structure attached to the bone alignment device 11 or bone 9 in the image. The marker may facilitate a determination of the orientation and scale of the 2D or 3D image(s).

After identifying the image(s) and establishing one or more coordinate systems for the image(s), the osteotomy logic circuitry 182 may interact with the user to identify an osteotomy. The osteotomy may be a cut through the bone 9 with the deformity 10 to divide the bone into two segments. In many embodiments, the bone is intended to be aligned via the bone alignment device 11, but the osteotomy logic circuitry 182 may not be limited to applications featuring bone alignment devices. For a 2D analysis, the osteotomy may appear as a cut line across the bone. As mentioned, the ideal location for the osteotomy is a bisector line through the apex of the deformity, which is the intersection of the mechanical axes of the two bone segments. The osteotomy logic circuitry 182 can interact with the user, in many embodiments, as needed to assist the user in identifying the apex, the concave angle of the two mechanical axes, and a bisector line through the concave angle of the mechanical axes. However, the user is free to establish an osteotomy anywhere along the bone 9 and at any angle.

For 3D analysis, the osteotomy logic circuitry 182 may identify the osteotomy in the form of a cut plane. The osteotomy logic circuitry 182 may interact with the user to draw a line on each of two 2D images of the bone 9 to define the cut plane or may interact with the user to define a cut plane on the 3D image to divide the bone 9 into two segments including a first bone segment above the cut plane and a second bone segment below the cut plane.

In many embodiments, after identification of the osteotomy, the osteotomy logic circuitry 182 may illustrate the bone 9 with the deformity 10 in a pre-operation window along with a post-operation result window. If there are more than one images such two 2D images, the pre-operation window may include the more than one images with a cut line or cut plane identified on the bone 7 and the more than one images in the post-operation result window on one or more displays of the HCP device 4. Each image in the post-operation result window may be split along the cut plane into two portions of the image, the first portion of the image including the first bone segment and the second portion of the image including the second bone segment.

In some embodiments, the osteotomy logic circuitry 182 may include or optionally include mechanical axis lines through one or both of the two bone segments. Such embodiments may also include other lines or reference markings to aid the user such as rulers, dimensions such as angles and lengths, and/or the like.

Once the one or more images in the post-operative result window are divided into two portions, the osteotomy logic circuitry 182 may insert an osteotomy rotation point to form a pivot point on one of the bone segments such as the first bone segment about which the bone segments can rotate and/or one of the bone segments can translate to align the bone segments. In some embodiments, the osteotomy logic circuitry 182 may interact with the user graphically to move one or both portions of the images via translations and rotations to align the first and second bone segments. For multiple 2D images, the user can graphically manipulate the portions individually and each manipulation may, in many embodiments, advantageously appear in real-time in the other images of the post-operation result window. The real-time post-operation results may be particularly advantageous to users when the osteotomy and/or osteotomy rotation point are placed away from their ideal location as the osteotomy logic circuitry 182 may, in real-time, display any resulting translations.

Furthermore, the osteotomy logic circuitry 182 may interact with the user graphically to move or adjust the osteotomy line or plane in one or more images in the pre-operation window and/or the osteotomy rotation point about the osteotomy line or plane. In many embodiments, the osteotomy logic circuitry 182 may reflect adjustments to the osteotomy rotation point and/or the osteotomy line or plane with real-time adjustments to the post-operation result image(s) including, in several embodiments, any angle or dimension call-outs that the user added to the image(s) in the post-operation result window.

The osteotomy logic circuitry 182 may include or couple with a tracking logic circuitry that tracks movements on an image segment relative to the coordinate system established for the images or implemented as a global coordinate system for all the images by the osteotomy logic circuitry 182. The tracking logic circuitry may translate or convert the graphical manipulations of the bone segments (or portions of the images) in the post-operation result window to determine components of movements so the components of the movements can be translated or converted to coordinate systems in other images. In some embodiments, the tracking logic circuitry determines the pre-corrected measurements of the bone segments relative to the osteotomy rotation point and the mechanical axis of one of the bone segments.

The osteotomy logic circuitry 182 may interact with the user graphically or just present the aligned bone segments in the image(s) in the post-operation result window to facilitate assessment of the aligned bone segments illustrated in the post-operation result window. If the user is satisfied with the result of the correction of the deformity, the osteotomy logic circuitry 182 may pass data related to the preoperative osteotomy to the deformity analysis logic. Other embodiments may allow the user to export the results of the osteotomy logic circuitry so that the data may be beneficially applied to procedures not requiring deformity analysis logic.

Some embodiments may include a navigated surgery logic circuitry in the server computer 3 and/or the HCP device 4. The navigated surgery logic circuitry may, e.g., assist a surgeon during surgery with other data about a patient to perform the osteotomy to correct a bone deformity 10 and install a bone alignment device such as the external bone alignment device 11 on the bone 9 for correction in accordance with the pre-operative osteotomy discussed above. Other data about the patient may include, for instance, locations of anatomical features to avoid or about which to orient hardware connections with the bone alignment device 11.

After the navigated surgery, the navigated surgery logic circuitry may pass data such as updated data about the locations at which the bone alignment device 11 attach to the bone 9, location of the clinical osteotomy (actual osteotomy as opposed to planned osteotomy), locations of anatomical features with respect to the hardware interconnections of the bone alignment device 11, and/or the like.

Note that some embodiments of the osteotomy logic circuitry 182 may accommodate installation of the bone alignment device 11 and/or portions thereof on the bone 9 prior to surgery and prior to the preoperative osteotomy. Such embodiments differ based on the inclusion of the hardware in the pre-operative images, the availability of locations for the osteotomy line or plane, and/or the like.

After the operation to install the bone alignment device 11, the deformity analysis logic circuitry 188 of the system 1 may analyze the deformity along with the location of the bone alignment hardware to determine post-operative deformity parameters and mounting parameters to create a treatment plan. The treatment plan may include a prescription to adjust the lengths of the struts of the bone alignment device 11 to implement the correction of the deformity initial planned via the osteotomy logic circuitry 182.

Note that, in other embodiments, the deformity analysis logic circuitry 184 may begin with a patient that has the bone alignment device 11 already installed and so the deformity analysis logic circuitry 188 may gather the data about the bone alignment device 11 and the bone deformity to determine the deformity parameters and mounting parameters, as well as the correction rate to facilitate generation of the treatment plan.

The illustrated bone alignment device 11 may comprise a six-axis external fixator. In other embodiments, a bone alignment device 11 may be any other external fixator capable of coupling to two bones and moving or aligning the bones relative to one another.

In some embodiments, comprehensive logic circuitry 180 of the server computer 3 may communicate with the HCP device 4 via, e.g., a web browser or other client software installed (comprehensive logic circuitry 180) on the HCP device 4 to facilitate interaction with a user such as an orthopedic surgeon to pre-operatively and/or post-operatively describe a deformity based on a set of one or more medical images such as 2D or 3D images, and create a treatment plan. The HCP device 4 may upload one or more images of the deformity via the network 5. In other embodiments, the deformity analysis logic circuitry 188 may reside on and may comprise, e.g., code for execution by a processor of the HCP device 4.

The one or more images may be a single image such as a radiograph of a first and second bone segment for a 2D description of the deformity. In other instances, the one or more images may be two 2D images or one 3D image for a 3D description of the deformity. Additional medical imaging (e.g., magnetic resonance imaging (MRI), computed tomography (CT), x-ray, ultra-sound, etc.) can be used to create a 3D model of the patient's bone to analyze deformity parameters of the bone segments. In some embodiments, the comprehensive logic circuitry 180 may use deformity parameters from the deformity analysis and additional inputs such as anatomical features, hardware restraints, hardware orientation relative to anatomical features, and/or a correction path to determine a strut adjustment schedule or prescription for the external bone alignment device 11. For example, the comprehensive logic circuitry 180 may use one or more or any combination of edge and image recognition software, x-ray markers, manual inputs, automated inputs, augmented reality systems, and sensor technologies.

The comprehensive logic circuitry 180 of the server computer 3, may communicate with the HCP device 4 via the network 5 to display on a display device of the HCP device 4, two 2D images or a 3D image of the post-operative bone 8 with the fractured bone 9 after the osteotomy with the bone alignment device 11 attached. The HCP device 4 may transmit graphical and/or other inputs received from a user of the HCP device 4 to identify the orientation of the images, if needed. The HCP device 4 may transmit graphical and/or other inputs received from a user of the HCP device 4 to scale the image(s) if need or to provide a scale for the images. In some embodiments, the user may identify the scale of the image(s) by identifying a marker, structure, and/or anatomical feature that the deformity analysis logic 188 can use as a basis of determining the scale and possibly also determining the orientation or enough information about the orientation to determine a coordinate system for the image(s). Other embodiments may automatically determine the scale of the image(s) through the deformity analysis logic detecting a marker or structure of known size and geometry.

The deformity analysis logic circuitry 188 of the server computer 3, may interact with the user and/or communicate instructions to the HCP device 4 to divide the image(s) into two portions. The first portion may comprise a first bone segment and the second portion may comprise a second bone segment. In several embodiments, the server computer 3 may automatically or through interaction with the user of the HCP device 4 to instruct the HCP device 4 to overlay a cut line (or a cut plane for 3D images) between the bone segments. Thereafter, the deformity analysis logic circuitry 188 may divide the image(s) into the two portions.

Once the image(s) are divided into two portions, the deformity analysis logic circuitry 182 may insert a rotation point to form a pivot point on one of the bone segments such as the first bone segment about which the bone segments can rotate. In embodiments with two 2D images, the rotation point may need to be placed at a common point between the images, such as the center of the osteotomy. In many embodiments, the deformity analysis logic may utilize the rotation point placed in the image as the origin of the image's coordinate system. In 3D embodiments with two 2D images, a marker present in both images may be used to project the rotation point of each image into 3D space.

In some embodiments, the user may freely move one or both portions of the image(s) while rotating the image(s) about the rotation point to align the first bone segment and the second bone segment such that the mechanical axis of the first bone segment is, e.g., colinear with the mechanical axis of the second bone segment. In many embodiments, the comprehensive logic circuitry 180 may provide one or more tools such as tools to graphically overlay the mechanical axis of one or both bone segments of the image(s) as well as possibly other reference lines, dimensions, rulers, and/or the like to help the user align the first bone segment with the second bone segment.

After the user graphically aligns the first bone segment and the second bone segment, in many embodiments, the deformity analysis logic circuitry 188 may provide an opportunity for a user to adjust the alignment if the user of the HCP device 4 determines that the first and second bones segments are not well-aligned, or the alignment could otherwise be improved.

If unsatisfied with the alignment of the bone segments, the user of the HCP device 4 may graphically adjust the position and/or orientation of the first and/or second bone segments by dragging the image segments to new position and/or orientation until satisfied. Some embodiments include nudge tools (e.g. add 1 millimeter (mm) of translation medially, add 2 degrees of valgus about the rotation point, and/or the like) for changing the position and/or orientation of the bone segments. In some embodiments, the nudge tools may initially control angular corrections of the second bone segment although many embodiments allow the user to freely nudge movements in the form of translations or rotations.

For a 3D model, in some embodiments, the deformity analysis logic circuitry 188 of the server computer 3, may communicate instructions to the HCP device 4 to apply a clinically derived axial translation to one or both of the bone segments in the corrected 3D image before or after the translation of the first and second bone segments by the user to align the bone segments.

In many embodiments, the deformity analysis logic circuitry 188 may record the movement of the image segments to determine deformity parameters for each image processed as discussed above. For example, during the movement of the one or both bone segments, the deformity analysis logic circuitry 188 may record in memory, possibly in a data structure such as a vector or table, components of translation. If the image is, e.g., a LAT radiograph with an established coordinate system in the software, the horizontal translation may represent a LAT View translation and the vertical translation may represent an axial translation. Vertical and horizontal references may assume that movement between the top and bottom of the radiograph are vertical movements and that movement from side to side of the radiograph are horizontal movements. Other labels can be used also such as up and down or left and right. Note that vertical and horizontal movement may be relative to the axis of a selected one of the bone segments such as a bone segment selected to be a stationary bone segment for the purposes of determining relative adjustments or movements of other bone segments.

Note that embodiments can use images from any angle or orientation and movements of bone segments may be defined in relation to the coordinate system implemented by the deformity analysis logic circuitry 188 or the tracking logic circuitry 184 if the deformity analysis logic circuitry 188 couples with the tracking logic circuitry 184 to track graphical movements of the bone segments by the user. Thus, references to vertical or horizontal movements relative to a 2D or 3D image may not reflect the actual components of such movements determined and stored by the tracking logic circuitry 184. For instance, a vertical movement with respect to a particular image may represent movement along an x-axis, a y-axis, a z-axis, or any combination thereof, with respect to the coordinate system implemented by the tracking logic circuitry 184. Thus, the tracking logic circuitry 184 may record such movements as a tuple or vector such as (x,y,z), where x, y, and z represent numbers indicative of movement in units such as millimeters or centimeters along the x-axis, y-axis, and z-axis, respectively. A movement of zero, in some embodiments, may represent no movement, a negative movement may represent movement in a first direction with respect to an axis, and a positive movement may represent movement in a second direction with respect to the axis. In addition to recording the translations, the tracking logic circuitry 184 may also record the rotation of the first and/or second bone segments.

AP and LAT views are common practice for radiographs of fractures, but embodiments are not limited to AP and LAT view images. Furthermore, as long as each of the images has a known scale, the images do have to be the same scale. The tracking logic circuitry 184, or deformity analysis logic circuitry 188, may translate or convert scales to a selected, calculated, or default scales implemented by the deformity analysis logic circuitry 188 and translate or convert movements associated with bone segments in images to a coordinate system implemented by the deformity analysis logic circuitry 188.

In some embodiments, the deformity analysis logic circuitry 188 of the server computer 3 may combine the movements for each deformity parameter to determine the set of deformity parameters. Other embodiments, rather than tracking every movement of the bone segments made by the user, may compare the resulting positions of the first and second bone segments to the original positions of the first and second bone segments to determine the deformity parameters.

If the users can capture the entirety of the deformity in one two-dimensional view, then the deformity analysis logic circuitry 188 may only process one scaled image to generate two-dimensional deformity parameters. When calculating three-dimensional (3D) deformity parameters, the deformity analysis logic circuitry 188 may require analysis of, and thus process, at least two scaled images of the bone segments captured at different angular orientations with a common point between the two images. Alternatively, the deformity analysis logic circuitry 188 may analyse and process a single 3D image file.

Note that embodiments are not limited to the comprehensive logic circuitry 180 residing in the server computer 3. The comprehensive logic circuitry 188 may reside in whole or in part in the HCP device 4. The comprehensive logic circuitry 180 may reside in whole or in part in the server computer 3. Furthermore, the comprehensive logic circuitry 180 may reside partially in multiple compute servers and data storage servers managed by a management device and operating as the server computer 3. The comprehensive logic circuitry 180 may also or alternatively reside partially in multiple computers and/or storage devices such as the HCP device 4. Where the comprehensive logic circuitry 180 may reside partially in multiple computers, the comprehensive logic circuitry 180 may include management logic circuitry to manage multiple local and/or remote resources.

After determining the deformity parameters for the bone alignment device 11, the treatment logic circuitry 192 may provide additional tools to create and refine a treatment plan. For instance, the treatment logic circuitry 192 may interact with the user and the image(s) to identify anatomical structures to avoid during correction. In some embodiments, treatment logic circuitry 192 may interact with the user to identify hardware restraints and/or receive hardware restraints for the bone alignment device 11 from the library logic circuitry 190 to compare against one or more correction paths to facilitate selection of a suitable or feasible correction path. Furthermore, the treatment logic circuitry 192 may interact with the user to adjust a correction path for the treatment plan.

After determining the correction path for the treatment plan, the treatment logic circuitry 192 may generate a prescription for the patient of the bone alignment device to follow. The prescription may include a list of adjustments such as daily adjustments for the struts of the bone alignment device 11 based on the correction rate identified for the treatment plan to perform the alignment of the bone segments in accordance with the selected correction path for the treatment plan.

The patient device 2 illustrated is a handheld wireless device. In other embodiments, a patient device may be any brand or type of electronic device capable of executing a computer program and outputting a prescription to a patient and, in many embodiments, capture progress of the prescription of the bone alignment device 11. For example, and without limitation, the patient device 2 may be a smartphone, a tablet, a mobile computer, or any other type of electronic device capable of providing one or both of input and output of information. In some embodiments, the patient device 2 may be a patient owned device. In some embodiments, the patient device 2 may be a handheld device or a desktop device. Such a device may provide ready access for input and output for a patient to whom a medical device such as the bone alignment device 11 is coupled. A patient device such as the patient device 2 may be distinguishable from an HCP device such as the HCP device 4 at least in that a patient device would not necessarily require permission or interaction from an HCP in order for a patient to transmit or receive information regarding the patient's treatment through the patient device 2.

A patient device such as the patient device 2 may be connected to the network 5 by any effective mechanism. For example, and without limitation, the connection may be a wired and/or wireless connection, or any combination thereof, through any number of routers and switches. Data may be transmitted by any effective data transmission protocol. Any patient device of the system may include integrated or separate computer readable media containing instructions to be executed by the patient device. For example, and without limitation, computer readable media may be any media integrated into the patient device such as a hard disc drive, random access memory (RAM), or non-volatile flash memory. Such computer readable media, once loaded into the patient device, may be integrated and non-transitory data storage media. Similarly, computer readable media may be generally separable from the patient device, such as a flash drive, external hard disc drive, Compact Disc (CD), or Digital Versatile Disc (DVD) that is readable directly by the patient device or in combination with a component connectable to the patient device.

The network 5 may be one or more interconnected networks, whether dedicated or distributed. Non-limiting examples include personal area networks (PANs), local area networks (LANs), wide area networks (WANs), metropolitan area networks (MANs), private and/or public intranets, the Internet, cellular data communications networks, switched telephonic networks or systems, and/or the like. Connections to the network 5 may be continuous or may be intermittent, only providing for a connection when requested by a sending or receiving client.

The server computer 3 is shown connected to the network 5 in FIG. 1. The server computer 3 may be a single computing device in some embodiments or may itself be a collection of two or more computing devices and/or two or more data storage devices that collectively function to process data as described herein. The server computer 3, or any one or more of its two or more computing devices, if applicable, may connect to the network 5 through one or both of firewall and web server software and may include one or more databases. If two or more computing devices or programs are used, the devices may interconnect through a back-end server application or may connect through separate connections to the network 5.

The server computer 3 or any component server device of the system may include integrated or separate computer readable media containing instructions to be executed by the server computer. For example, and without limitation, computer readable media may be any volatile or non-volatile media integrated into the server computer 3 such as a hard disc drive, random access memory (RAM), or non-volatile flash memory. Such computer readable media, once loaded into the server computer 3 as defined herein, may be integrated, non-transitory data storage media. In some embodiments, a server computer 3 may include a storage location for information that will be eventually used by the patient device 2, the server computer 3, and/or the HCP device 4.

When stored on the server computer 3, memory devices of the server computer 3, as defined herein, provide data storage, such as non-transitory data storage, and are computer readable media containing instructions. Similarly, computer readable media may be separable from the server computer 3, such as a flash drive, external hard disc drive, tape drive, Compact Disc (CD), or Digital Versatile Disc (DVD) that is readable directly by the server computer 3 or in combination with a component connectable to the server computer 3.

The HCP device 4 is shown connected to the network 5. The HCP device 4 illustrated is a desktop personal computer. In other embodiments, the HCP device 4 may be any brand or type of electronic device capable of executing a computer program and receiving inputs from or outputting information to a user. For example, and without limitation, the HCP device 4 may be a smartphone, a tablet computer, or any other type of electronic device capable of providing one or both of input and output of information. Such a device may provide an interface for data input, compliance monitoring, prescription modification, and communication with a patient, another HCP, or a device or system manufacturer. An HCP device such as the HCP device 4 may be connected to the network 5 by any effective mechanism. For example, and without limitation, the connection may be by wired and/or wireless connection through any number of routers and switches. Data may be transmitted by any effective data transmission protocol. The HCP device 4 may include integrated or separate computer readable media containing instructions to be executed by the HCP device 4. For example, and without limitation, computer readable media may be any media integrated into the HCP device 4 such as a hard disc drive, RAM, or non-volatile flash memory. Such computer readable media once loaded into the HCP device 4 as defined herein may be integrated and non-transitory data storage media. Similarly, computer readable media may be generally separable from the HCP device 4, such as a flash drive, external hard disc drive, CD, or DVD that is readable directly by the HCP device 4 or in combination with a component connectable to the HCP device 4.

FIGS. 1B-1F illustrate LAT and AP images of an unfractured tibia 110 and the same tibia fractured into a first bone segment 112 and a second bone segment 114. Each of FIGS. 1C-1F illustrate at least one of the deformity parameters on the LAT image and the AP image. Note that while the illustrations focus on the tibia and LAT and AP images, embodiments may process any other bone and any other viewing angle in a similar manner.

Figure 1B:
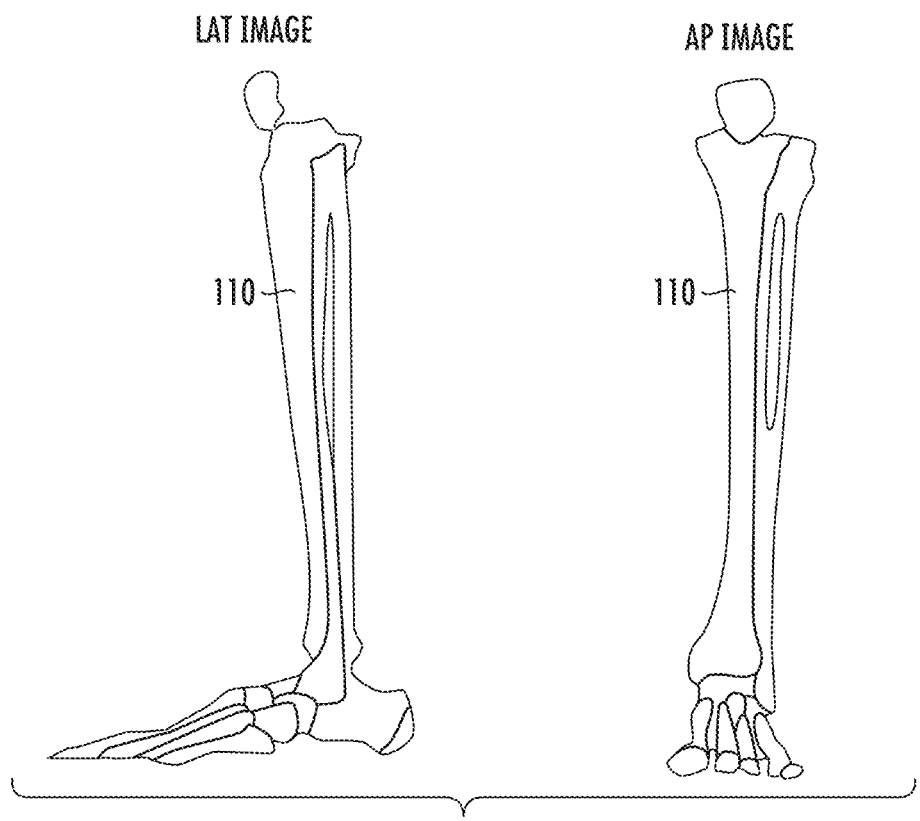
FIGS. 1B-1F illustrate embodiments of anteroposterior (AP) view and lateral (LAT) view outline images of a tibia aligned and misaligned.

FIG. 1B illustrates an embodiment of an AP and a LAT image of an unfractured tibia 110. Note that the AP image provides a fontal view of the tibia and the LAT view provides a side view of the tibia.

Figure 1C:
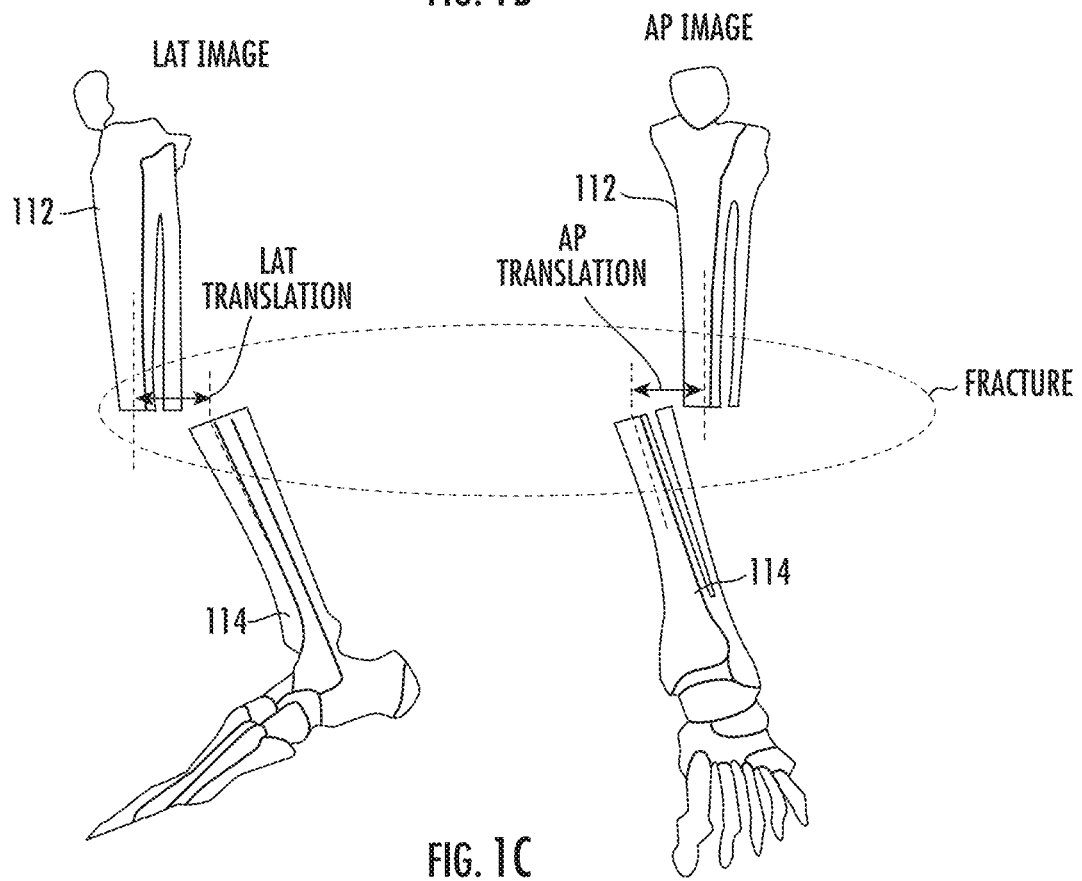

FIG. 1C illustrates an embodiment of the tibia bone 110 fractured into two bone segments, a first bone segment 112 and a second bone segment 114. As discussed therein, the first bone segment typically refers to the fixed bone segment if the processing involves a fixed bone segment. For instance, some embodiments fix the first bone segment and all deformity parameters are determined based upon movement of the second bone segment to align the second bone segment with the first bone segment. Other embodiments may move and/or rotate either or both bone segments and may determine the deformity parameters by recording the movements of either or both bone segments and/or by comparison of the final positions of either or both bone segments against the original positions of either or both bone segments.

In FIG. 1C, the embodiment may determine the LAT translation based on a horizontal translation of the second bone segment 114 to align the second bone segment with the first bone segment 112 on the LAT image. Similarly, the embodiment may determine the AP translation based on a horizontal translation of the second bone segment 114 to align the second bone segment with the first bone segment 112 on the AP image. Other embodiments may determine the LAT or AP translation based on a horizontal translation of both the first bone segment and the second bone segment 114 to align the bone segments 112 and 114. Some embodiments may have a user define an origin one point on one bone segment and a corresponding point on the other bone segment such that translation may be defined as the component distances between the origin and corresponding points. Other embodiments may have a user define an origin and the deformity analysis logic circuitry 188 will determine and/or assume a corresponding point.

Figure 1D:
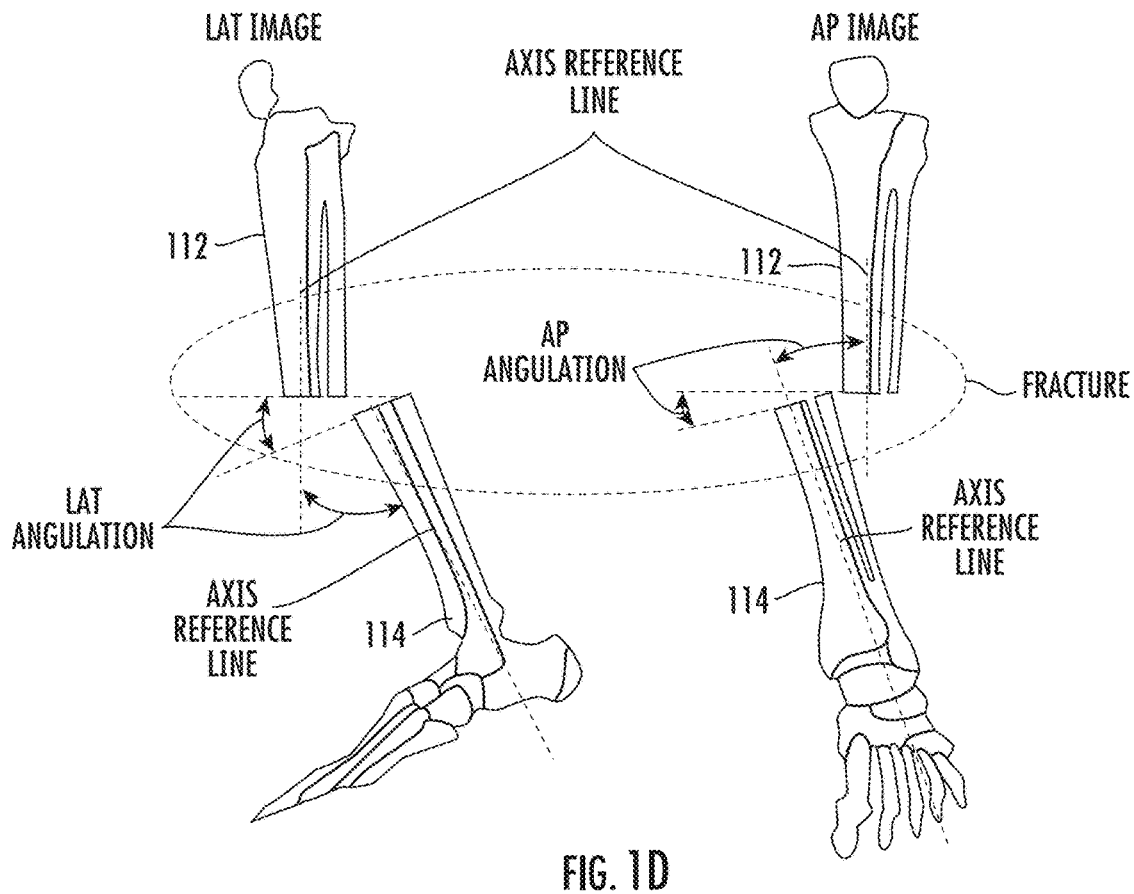

FIG. 1D illustrates an embodiment of the tibia bone 110 fractured into two bone segments, a first bone segment 112 and a second bone segment 114 for purpose of illustrating the deformity parameters of LAT angulation and AP angulation. The LAT angulation is the rotation of the second bone segment 114 required to align the first bone segment 112 with the second bone segment 114 on the LAT image. The AP angulation is the rotation of the second bone segment 114 required to align the first bone segment 112 with the second bone segment 114 on the AP image. As shown in FIG. 1D, an alternative way to illustrate and/or determine the LAT or AP angulation is to overlay a first axis reference line through the axis of the first bone segment 112, overlay a second axis reference line through the axis of the second bone segment 114, and measure the angle between the first and second axis reference lines. The angle between the first and second axis reference lines may be the LAT or AP angulation or an angulation suggested by the deformity analysis logic circuitry 188, depending on which view is being measured.

Figure 1E:
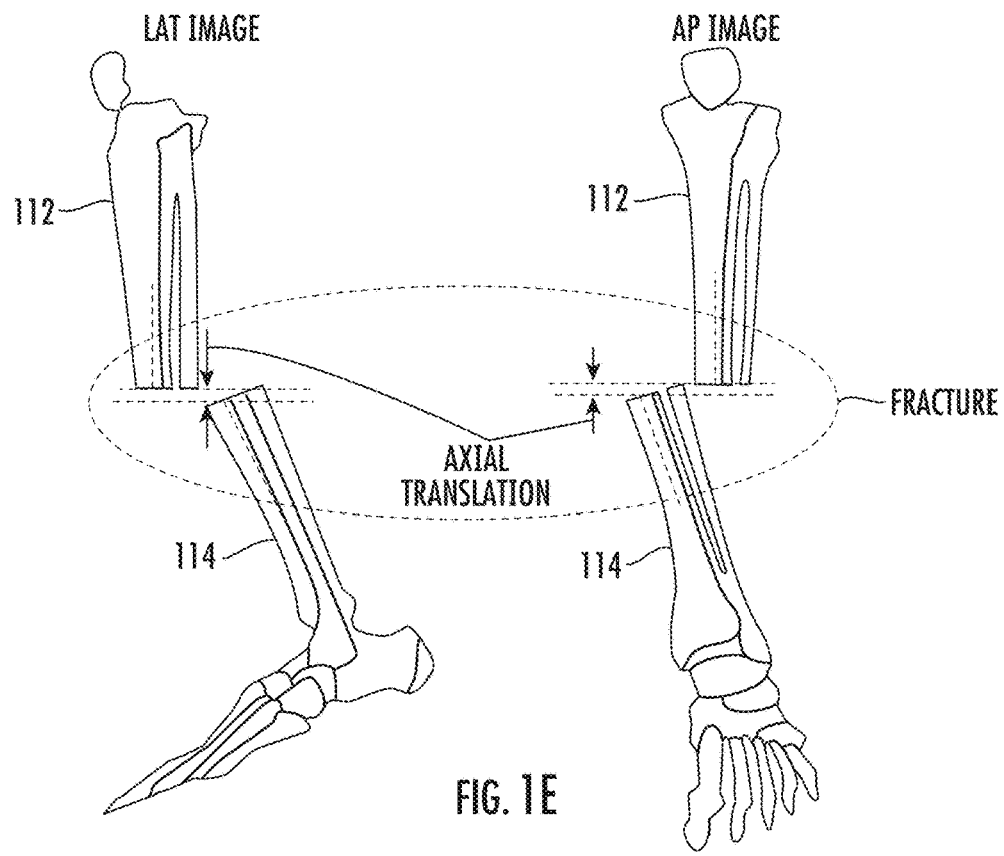

FIG. 1E illustrates an embodiment of the tibia bone 110 fractured into two bone segments, a first bone segment 112 and a second bone segment 114 for purpose of illustrating the deformity parameter of axial translation. Many embodiments determine the axial translation as the vertical movement of either or both the first bone segment 112 and the second bone segment 114 to bring the two bone segments together. The initial estimate of the axial translation is based on the vertical movement to attach the first and the second bone segments. The initial estimate is based on graphical input from a user of the HCP device 4 in FIG. 1A such as an orthopedic surgeon. Many embodiments determine the final axial translation after offering the user an opportunity to adjust the alignment with, e.g., a nudge tool. For 2D deformity parameters, the final axial translation may be determined from a single image. For 3D deformity parameters, the final axial translation parameter may be determined after calculation of an axial translation for two or more images such as a LAT view and an AP view of the bone segments. In still other embodiments, a view may be selected for determining the axial translation prior to processing one or more images for deformity parameters and the deformity analysis logic circuitry 188 may only record movements related to and calculate and/or determine the axial translation based on the view selected for determining the axial translation. Some embodiments may have a user define an origin one point on one bone segment and a corresponding point on the other bone segment such that translation may be defined as the component distances between the origin and corresponding points. Other embodiments may have a user define an origin and the deformity analysis logic circuitry 188 will determine and/or assume a corresponding point.

Figure 1F:
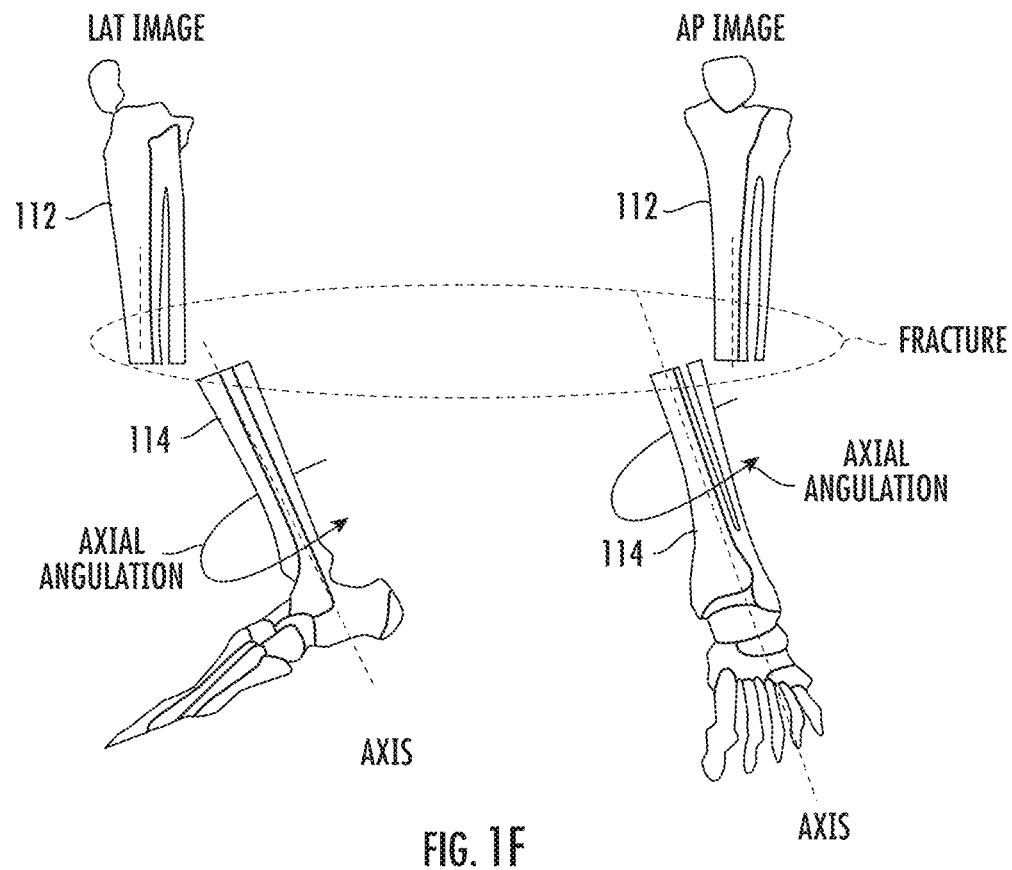

FIG. 1F illustrates an embodiment of the tibia bone 110 fractured into two bone segments, a first bone segment 112 and a second bone segment 114 for purpose of illustrating the deformity parameter of axial angulation. The axial angulation is the rotation of the second bone segment 114 about the axis of the second bone segment 114 to align the second bone segment with the first bone segment 112. In many embodiments, the axial angulation is determined clinically.

Figure 1G:
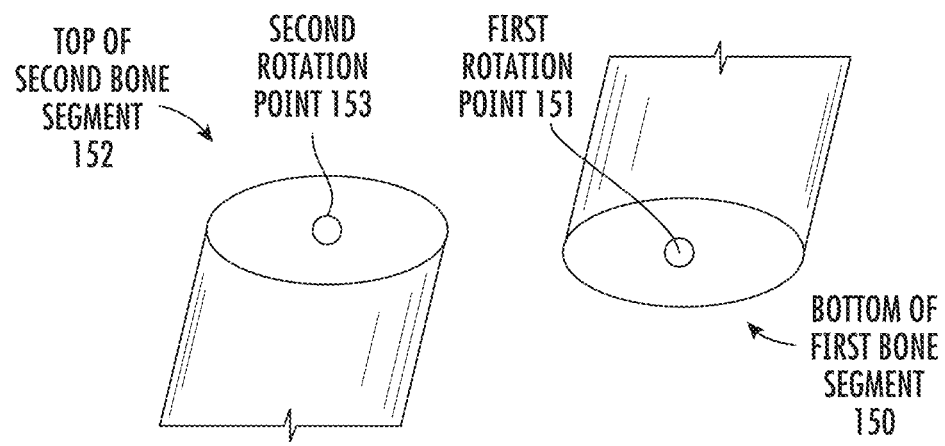
FIG. 1G illustrates a 3D image with points, lines, and planes.
Figure 1H:
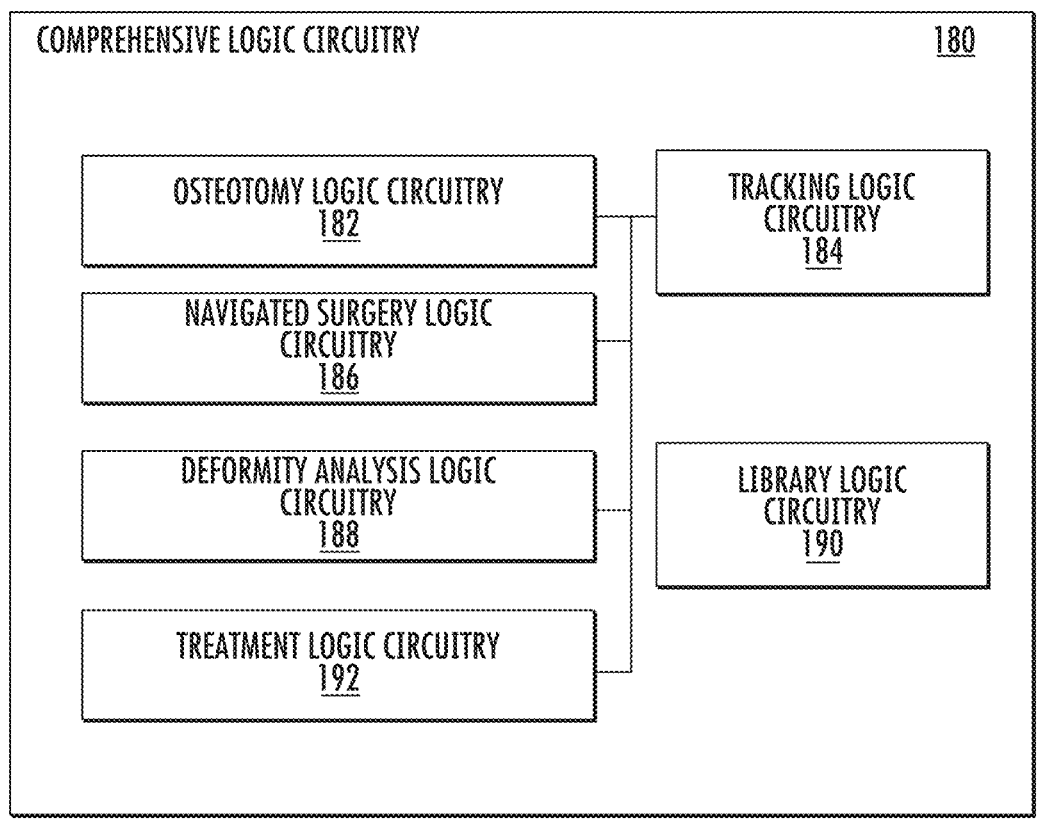
FIG. 1H illustrates an embodiment of comprehensive logic circuitry.

FIG. 1G illustrates optional embodiments for defining a cut plane in a 3D image. Specifically, FIG. 1G shows the bottom of a first bone segment 150 and the top of a second bone segment 152, each having a plane at the fracture between the two bone segments. In many embodiments, at least one of the points on each of the bone segments correspond to each other and will coincide when the bone segments are reduced.

In some embodiments, the deformity analysis logic circuitry 188 may define the points to define a first plane, second plane, or cut plane to facilitate division of a 3D image into a first portion and a second portion. In such embodiments, the points may or may not represent coincident points of well aligned bone segments.

In the present embodiment the deformity analysis logic circuitry 188 may define or allow the user to define a rotation point 151 for the first bone segment 150 and a rotation point 153 for the second bone segment 152. The rotation point for each bone segment will define the point at which the associated bone segment may be rotated in 3D space. Some embodiments may require the rotation points be located such that the rotation points represent coincident points of well aligned bone fragments to facilitate automatic alignment. Embodiments may initially position the rotation points at a calculated optimal position such as the center of corresponding bone segment ends with the aid of technologies such as edge detection or the like. Other embodiments will allow users to freely position the rotation points according the needs of the displayed deformity.

FIGS. 2A-I illustrate an embodiment of a preoperative osteotomy plan by an osteotomy logic circuitry such as the osteotomy logic circuitry 182 shown in FIG. 1H. Note that the embodiment illustrates a 2D pre-operative osteotomy but the process can be repeated for each 2D image based on a known or common scale between the images and known or common features or points are sufficient to create a coordinate system for each image and points on an image can be mapped to the other image. Furthermore, the process can be performed with 3D images also by e.g., drawing and manipulating an osteotomy plane rather than an osteotomy line.

Figure 2A:
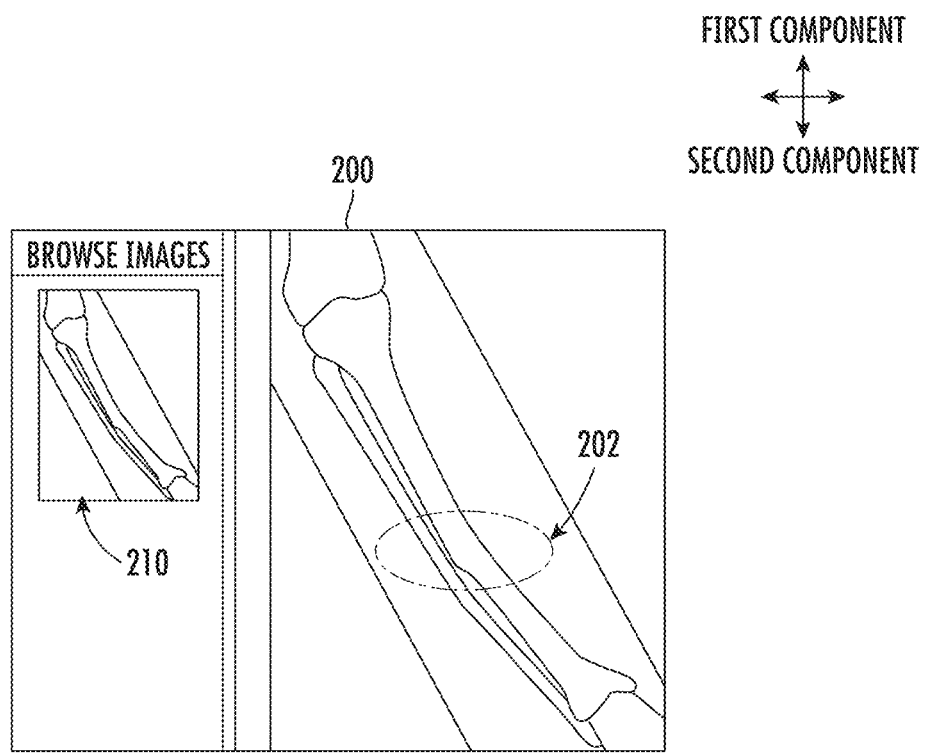
FIGS. 2A-2G illustrate embodiments of preoperative osteotomy software and/or logic circuitry.

FIG. 2A illustrates a user interface 200 for selection of a medical image with a bone having a deformity 202 for pre-operative osteotomy. In the present embodiment, the user may import/upload a radiograph of a deformed bone into memory for the osteotomy logic circuitry 182. This image will represent the pre-operative state of the deformed bone. The images may be edited (crop, rotate, flip, adjust brightness/contrast, etc.) if needed.

Figure 2B:
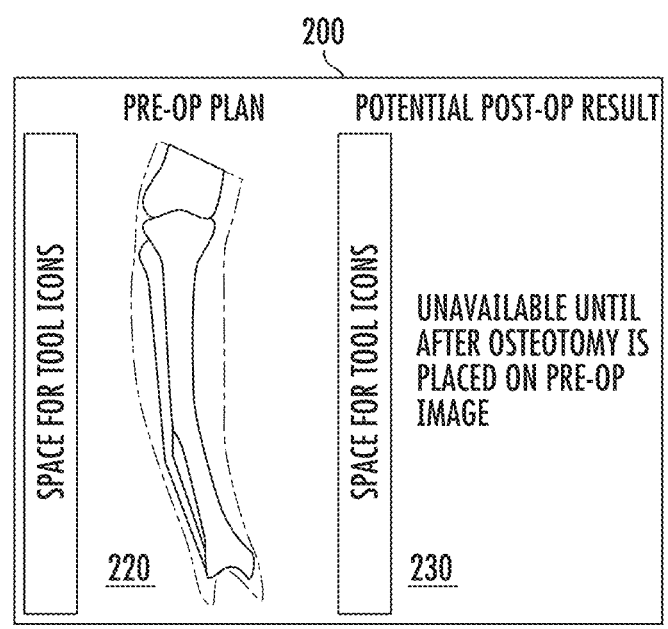

FIG. 2B illustrates the user interface 200 with two windows. The first window 220 shows the preoperative image uploaded for the osteotomy. The osteotomy logic circuitry 182 may use the pre-operative image to plan the osteotomy and illustrate the osteotomy line to illustrate the plan for the osteotomy.

The second window 230 is the potential post-operative result window. The second window 230 may remain empty until the user interacts with the osteotomy logic circuitry 182 to begin the process of planning the osteotomy. In other embodiments, the osteotomy logic circuitry 182 may illustrate the original image in the second window 230 until the process begins. In still other embodiments, the user interface 200 may display additional windows with additional stages of development of the osteotomy plan, alternative osteotomy plans, and/or the like.

Figure 2C:
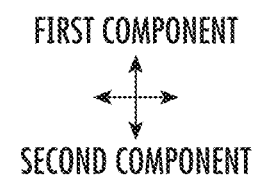
Figure 2C:
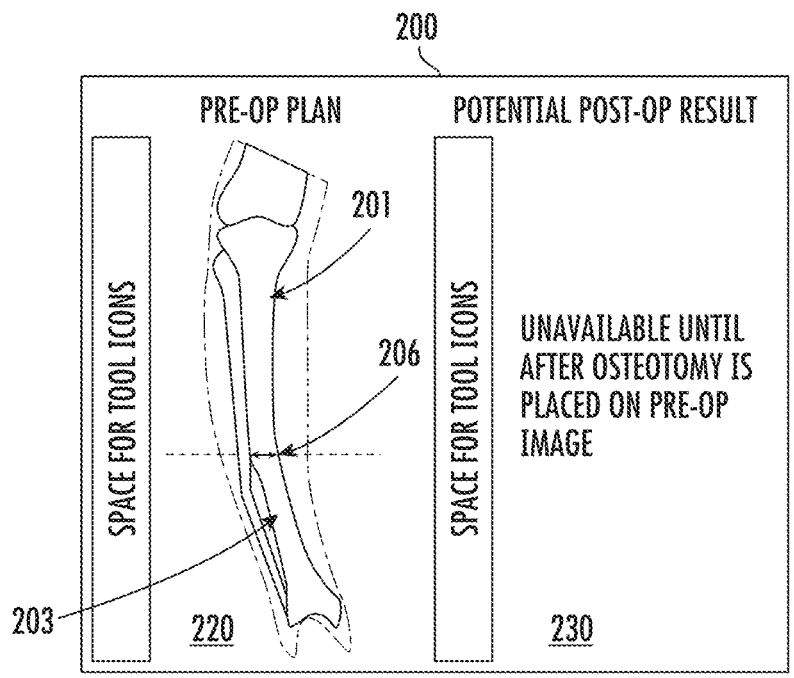

FIG. 2C illustrates the user interface 200 with an osteotomy line 206 selected or identified or drawn by the user on the image in the first window 220 via the osteotomy logic circuitry 182. The osteotomy line 206 in the 2D image represents a cut plane perpendicular to the plane of the image to cut through the bone in the image to create a first bone segment 201 and a second bone segment 203. For instance, in some embodiments, the osteotomy logic circuitry 182 may determine the location of the apex of the deformity and the bisector line through the apex to identify the ideal location of the osteotomy line 206 and overlay the osteotomy line 206 at the ideal location as a suggested position for the user to evaluate. In such embodiments, the user may select the suggested osteotomy line or reject the suggested osteotomy line. In response to the rejection, the osteotomy logic circuitry 182 may suggest an alternative osteotomy line or the user may draw an osteotomy line 206 at a different location.

Figure 2D:
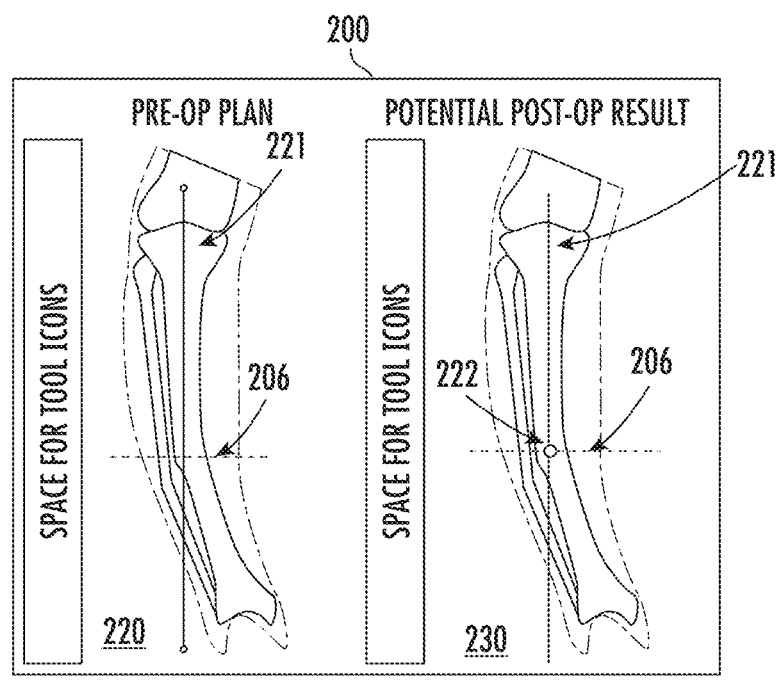

FIG. 2D illustrates the user interface 200 with a selected or drawn osteotomy line 206 overlaying the image in the first window 220 via the osteotomy logic circuitry 182. At this point, with a prospective osteotomy line 206, the image is divided along the osteotomy line 206 to create two portions and the two portions are displayed in the second window 230. The divided image 230 represents potential postoperative results. In many embodiments, the osteotomy logic circuitry 182 may display, to the user, both the divided and the undivided images at the same time or provide a tool to toggle between the two views.

In further embodiments, the osteotomy logic circuitry 182 may determine or may interact with the user to determine which side of the osteotomy line 206 will remain stationary. In another embodiment, the osteotomy logic circuitry 182 may fix the bone segment that is not first selected for movement by the user. In other words, when one bone segment is selected for adjustment, the other bone segment automatically becomes the stationary segment.

In some embodiments, the user may draw/overlay a reference line(s) which serve as a representation of the mechanical axis of one or both of the bone segments. The reference line may be in any format and there can be multiple references lines. In many embodiments, the reference lines do not drive the process so the reference lines are not required but may be a useful graphical check of proper alignment of the bone segments. In the present embodiment, the mechanical axis line 221 for the first bone segment 201 remains fixed to the image segment containing the first bone segment 201. In some embodiments, the mechanical axis line(s) are drawn in both the first window 220 and in the second window 230. In other embodiments, the mechanical axis line(s) are drawn in one of the two windows such as in the second window 230 of the user interface 200 to facilitate evaluation of the alignment of the bone segments.

In other embodiments, neither image portion remains stationary so the user may graphically manipulate both the first bone segment 201 and the second bone segment 203. Tracking logic circuitry may track movements of the two bone segments to determine corrections to align the first bone segment 201 and the second bone segment 203.

In further embodiments, the osteotomy logic circuitry 182 may determine or may interact with the user to determine an osteotomy rotation point 222. The osteotomy rotation point 222 may comprise an overlay of a point on the 2D image and may represent an axis that is perpendicular to the plane of the image about which the first bone segment 201 or the second bone segment 203 may pivot or rotate. Some embodiment may require an axis line such as 221 be placed to orient the coordinate system of the image. Other embodiments assume an axis of the stationary bone segment passing through the rotation point 222 in a set orientation, such as vertical relative display window 230, by requiring the uploaded images to be oriented in a specified manner.

Figure 2E:
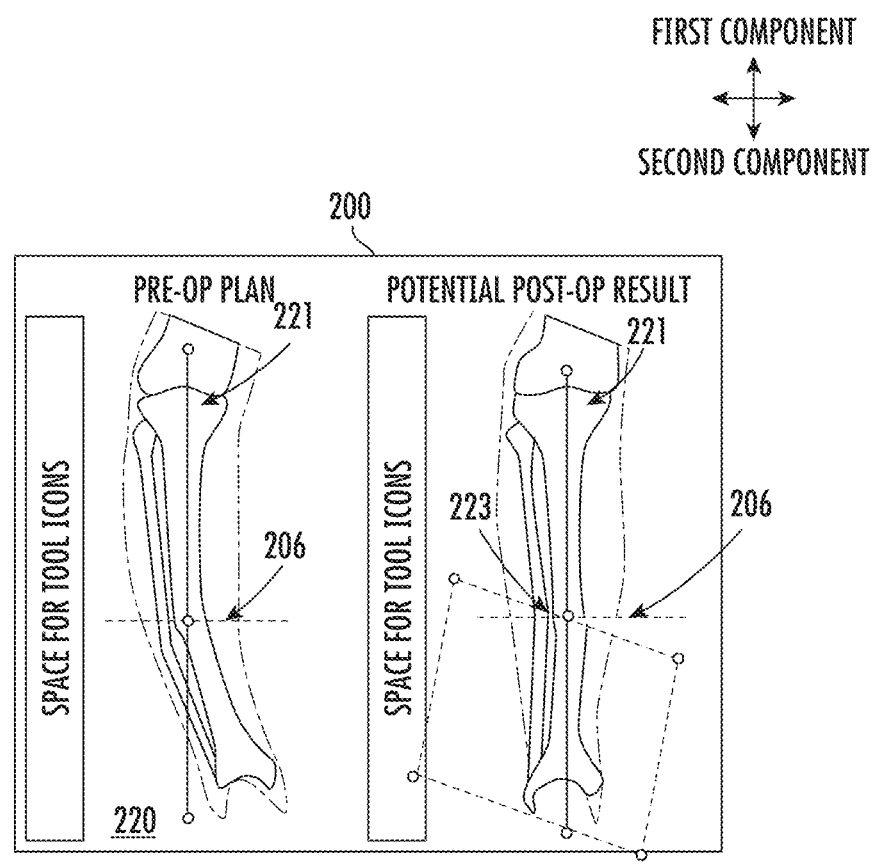

FIG. 2E illustrates the user interface 200 where the user begins to move the second bone segment 203 by rotation of the second bone segment 203 about the osteotomy rotation point 222. The user may also graphically translate the second bone segment 203 to adjust the alignment of the first bone segment 201 and the second bone segment 203 until the user is satisfied with the alignment of the first bone segment 201 and the second bone segment 203.

Figure 2F:
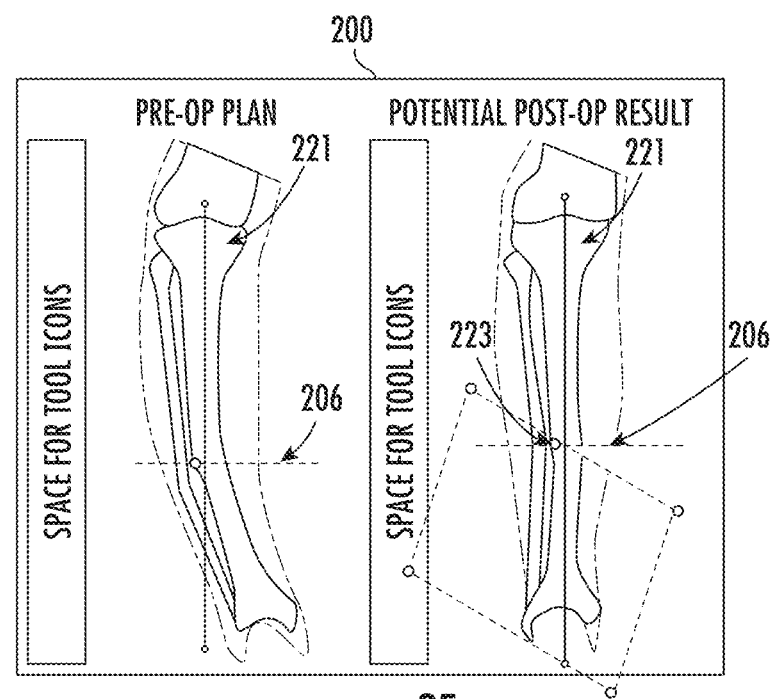

FIG. 2F illustrates the user interface 200 where the user is not satisfied with the achievable alignment on the initial attempt illustrated in FIG. 2E. As a result, the osteotomy logic circuitry 182 may allow the user to manipulate the osteotomy line 206 location/orientation and/or move the osteotomy rotation point 223. The osteotomy logic circuitry 182 may show the impact of changes to the osteotomy line and/or osteotomy rotation point 223 in the postoperative result window (the second window 230). In FIG. 2F, the osteotomy rotation point 222 is moved to the osteotomy rotation point 223 and the resulting change in the rotation of the second bone segment 203 about the osteotomy rotation point 223 is displayed to the user in the second window 230.

Figure 2G:
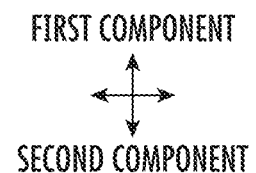
Figure 2G:
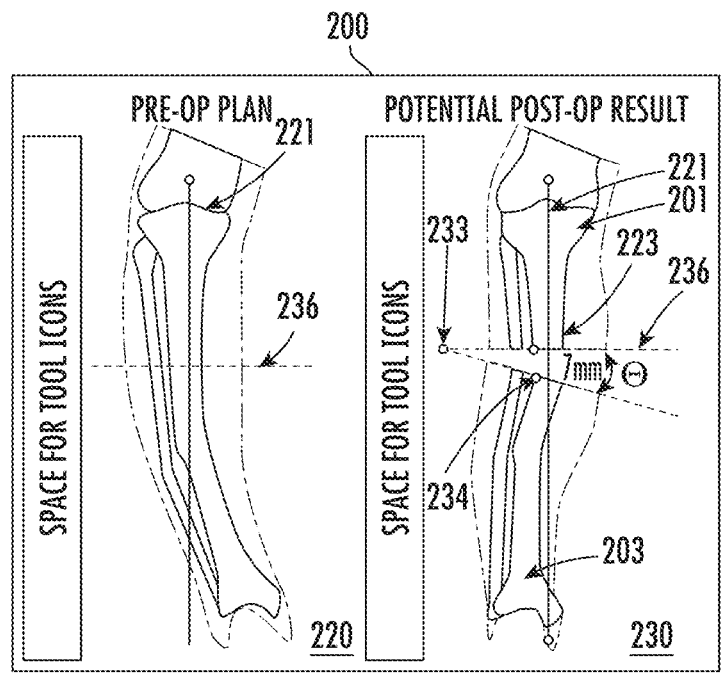

FIG. 2G illustrates the user interface 200 where the user is not satisfied with the achievable alignment on the alignment attempt illustrated in FIG. 2E and graphically moves the location of the osteotomy line 206 to the position of the osteotomy line 233. As a result, the osteotomy logic circuitry 182 may illustrate, in real-time, the impact of changes to the osteotomy line 236 on the postoperative result window (the second window 230). FIG. 2G also illustrates optional dimensions that the osteotomy rotation point 222 can include on the image in the second window 230 including the distance 234 between the bone segments and the angle theta, θ, between the bone segments. In some embodiments, if the image was scaled then translation and angulation is calculated and displayed as component values. In some embodiments, translation is measured as the distance between the rotation point 233 and a corresponding point on the second bone segment 203, which may be either input by a user or determined by the osteotomy logic circuitry 182 and illustrated or assumed by the osteotomy logic circuitry 182. If the image is not scaled, then only measured angles are displayed.

After the user determines an osteotomy that results in a desirable potential postoperative alignment, the osteotomy logic circuitry 182 may generate a report for the user that details the osteotomy rotation point and orientation on the preoperative image and the potential postoperative result that might be achieved with the given osteotomy and rotation point. In further embodiments, such data may be stored and used for a navigated surgery and/or as added information for use in a deformity analysis.

FIGS. 3A-E illustrate alternative embodiments of a preoperative osteotomy by an osteotomy logic circuitry such as the osteotomy logic circuitry 182 shown in FIG. 1H. Note that the embodiment illustrates a 2D pre-operative osteotomy but the process can be repeated for each 2D image based on a known or common scale between the images and known or common features or points are sufficient to create a coordinate system for each image and points on an image can be mapped to the other image. Furthermore, the process can be performed with 3D images also by e.g., drawing and manipulating an osteotomy plane rather than an osteotomy line.

Figure 3A:
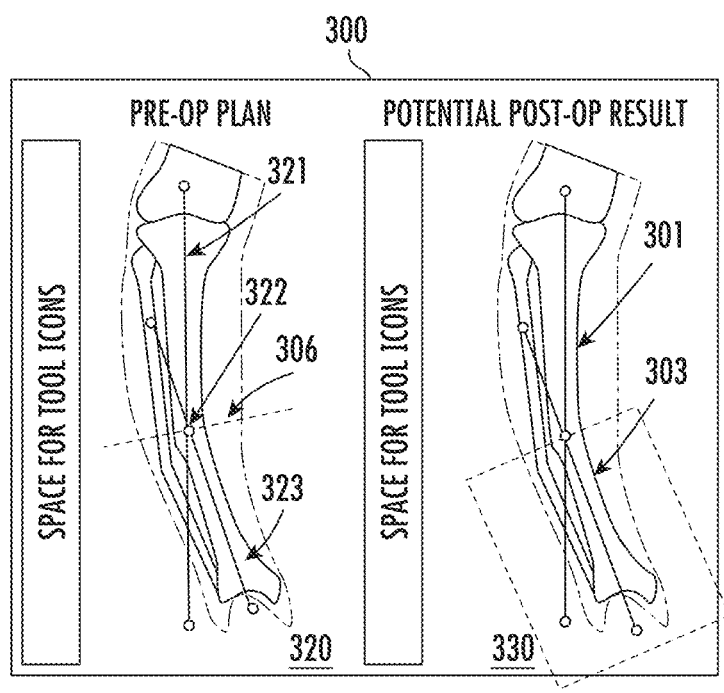
FIGS. 3A-3D illustrate alternative embodiments of preoperative osteotomy software and/or logic circuitry.

FIG. 3A illustrates the user interface 300 with an osteotomy line 306 selected or identified or drawn by the user on the image in the first window 320 via the osteotomy logic circuitry 182. The osteotomy line 306 in the 2D image represents a cut plane perpendicular to the plane of the image to cut through the bone in the image to create a first bone segment 301 and a second bone segment 303. In the present embodiment, the osteotomy logic circuitry 182 may interact with the user to draw the mechanical axis 321 of the first bone segment 301 and the mechanical axis 323 of the second bone segment 302 in both the first window 320 and the second window 330.

Figure 3B:
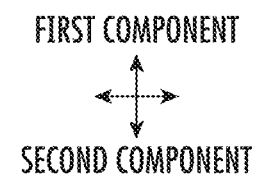
Figure 3B:
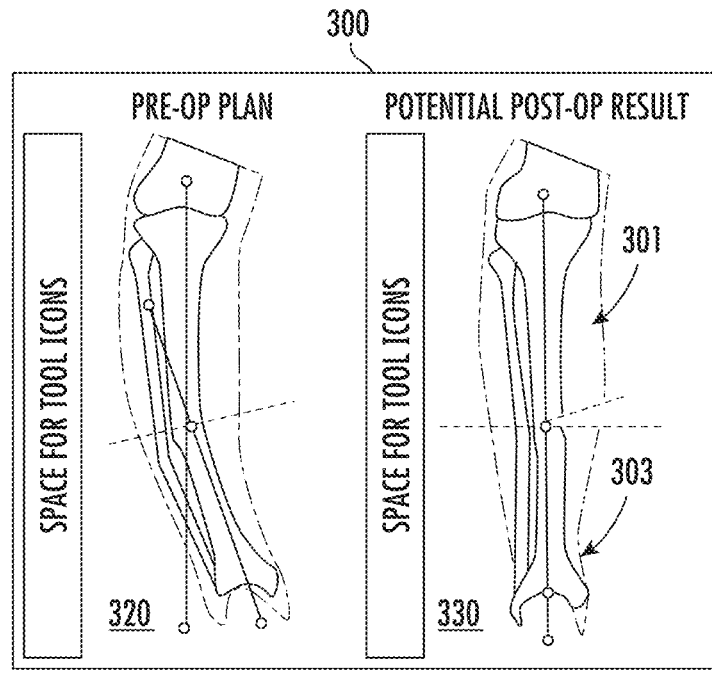

FIG. 3B illustrates the user interface 300 with an osteotomy line 306 drawn on the image in the first window 320 via the osteotomy logic circuitry 182 and two portions of the image in the second window 330. In some embodiments, the user may choose to fix one of the portions of the image such as the first portion including the first bone segment 301. The osteotomy logic circuitry 182 may interact with the user to manipulate the second bone segment by manipulating the second portion of the image to align the mechanical axis 321 of the first bone segment 301 with the mechanical axis 323 of the second bone segment 303. In some embodiments, the osteotomy circuit logic circuitry 182 may automatically present a potential postoperative result in display window 330 with the axis of bone segment one 301 aligned with the axis of bone segment two 303.

FIG. 3B illustrates the user interface 300 with an osteotomy line 306 drawn on the image in the first window 320 via the osteotomy logic circuitry 182 and two portions of the image in the second window 330. In some embodiments, the user may choose to fix one of the portions of the image such as the first portion including the first bone segment 301. The osteotomy logic circuitry 182 may interact with the user to manipulate the second bone segment by manipulating the second portion of the image to align the mechanical axis 321 of the first bone segment 301 with the mechanical axis 323 of the second bone segment 303. In some embodiments, the osteotomy circuit logic circuitry 182 may automatically present a potential postoperative result in display window 330 with the axis of bone segment one 301 aligned with the axis of bone segment two 303.

It should be noted that often the ideal location for the osteotomy is not possible due to any number of anatomic, injury, and/or clinical circumstances. As a result, the osteotomy often has to be positioned/oriented away from the apex and transverse bisector. Literature shows that the effect of moving the osteotomy or rotation point can be calculated. Since we know the location of the apex and transverse bisector, the osteotomy logic circuitry 182 can advantageously calculate the effects of change away from the ideal situation in real time.

Figure 3C:
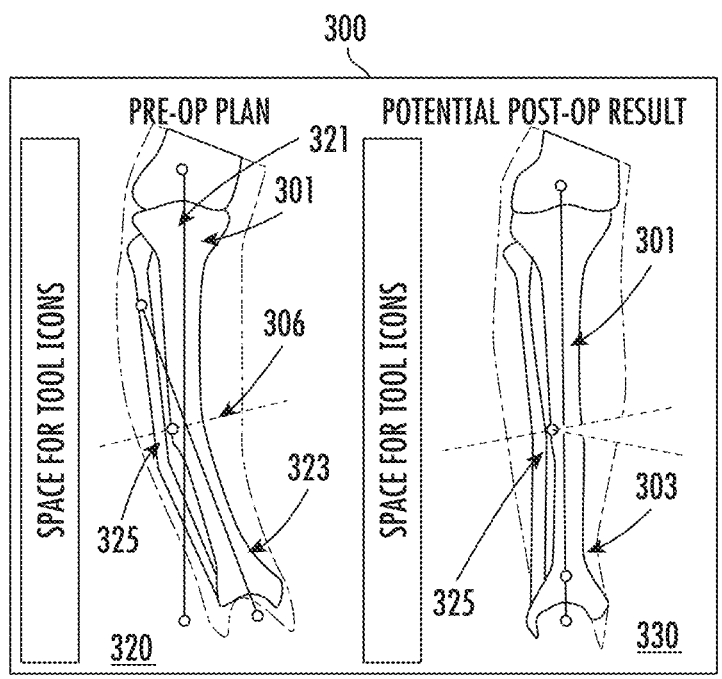

FIG. 3C illustrates a user manipulation of the osteotomy line from osteotomy rotation point 322 to osteotomy rotation point 325. Moving the rotation point away from the apex along the transverse bisector will add length or shorten the bone by a length equal to the distance away from the apex. The osteotomy logic circuitry 182 may calculate the resulting length change and display the change in the length in real-time. Moving the osteotomy line above or below the transverse bisector will add translation equal to the distance between the mechanical axes at that location. The osteotomy logic circuitry 182 can advantageously calculate and show the resulting translation distance in real time in the second window 330.

Figure 3D:
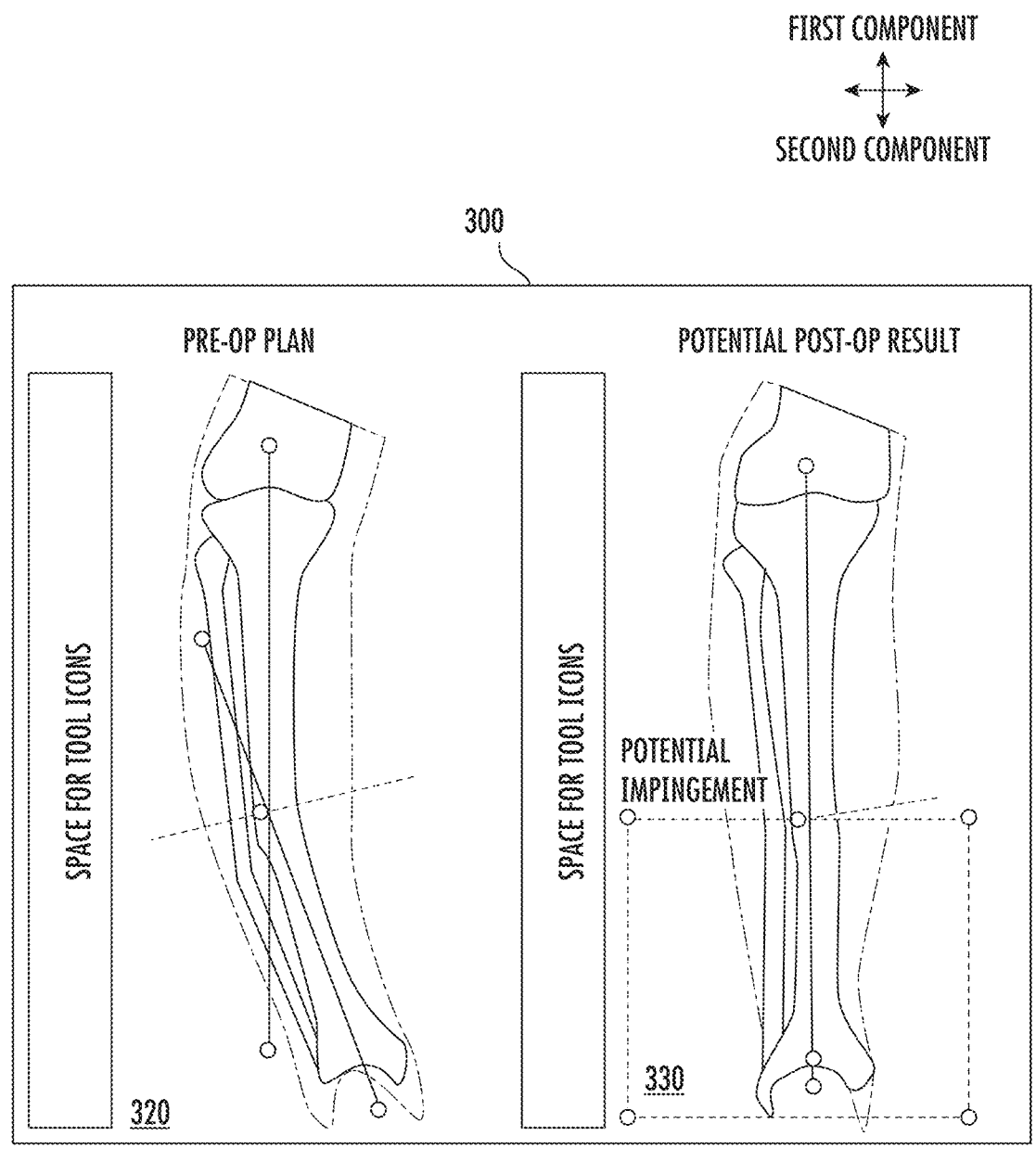

FIG. 3D illustrates a user manipulation of the second bone segment 303 to a rotation and/or position at which the second portion of the image crosses the initial osteotomy. The osteotomy logic circuitry 182 can advantageously highlight the overlap or otherwise communicate the impingement to the user. Communicating potential overlap is not dependent on the axes of both fragments being defined within an image.

FIGS. 4A-J illustrate embodiments of postoperative radiographs (such as x-ray images) of a process of determining movements of two bone segments of a misaligned tibia to align the misaligned tibia by adjustment of the radiographs. This process may be performed by comprehensive logic circuitry such as the comprehensive logic circuitry 180 shown in FIG. 1H and as discussed in relation to other figures. In several embodiments, this process may be performed by deformity analysis logic circuitry such as the deformity analysis logic circuitry 188 shown in FIG. 1H and as discussed in relation to other figures. In many embodiments, the process may begin with defining the hardware of the external fixator. In some embodiments, a library of dimensions for external fixators such as hexapods may be available via a library of library logic circuitry such as the library logic circuitry 190 shown in FIG. 1H.

An example of the external fixator is the bone alignment device 11 shown in FIG. 1A. The external fixator may comprise two rings with six struts interconnecting the rings. Each of the struts may have a minimum and maximum length and may be attached to the bone segments via mounting hardware through a surgical procedure with the rings parallel to one-another and the struts at equal lengths. Alternatively, the struts may be installed such that the rings will become parallel to one-another when the struts are of equal lengths at the completion of the prescription by the patient. A user may select the initial orientation of the external fixator out of necessity to implement a prescription within hardware constraints or based on preference. In further embodiments, the initial and ending configurations of the rings and struts may differ depending on the treatment plan. Embodiments are not limited to a particular initial or ending configuration of an external fixator.

In defining the hardware of the external fixator, a user may enter the locations of the struts relative to one of the rings, which is referred to as the reference ring. This is typically done by specifying the size and type of the reference ring, which defines the default locations of struts on the reference ring.

If the struts are not mounted in standard locations on the ring(s), which can be determined from the ring size and/or type, then the locations of the struts must be defined for both rings of the construct. Furthermore, the strut lengths should be defined.

Figure 4A:
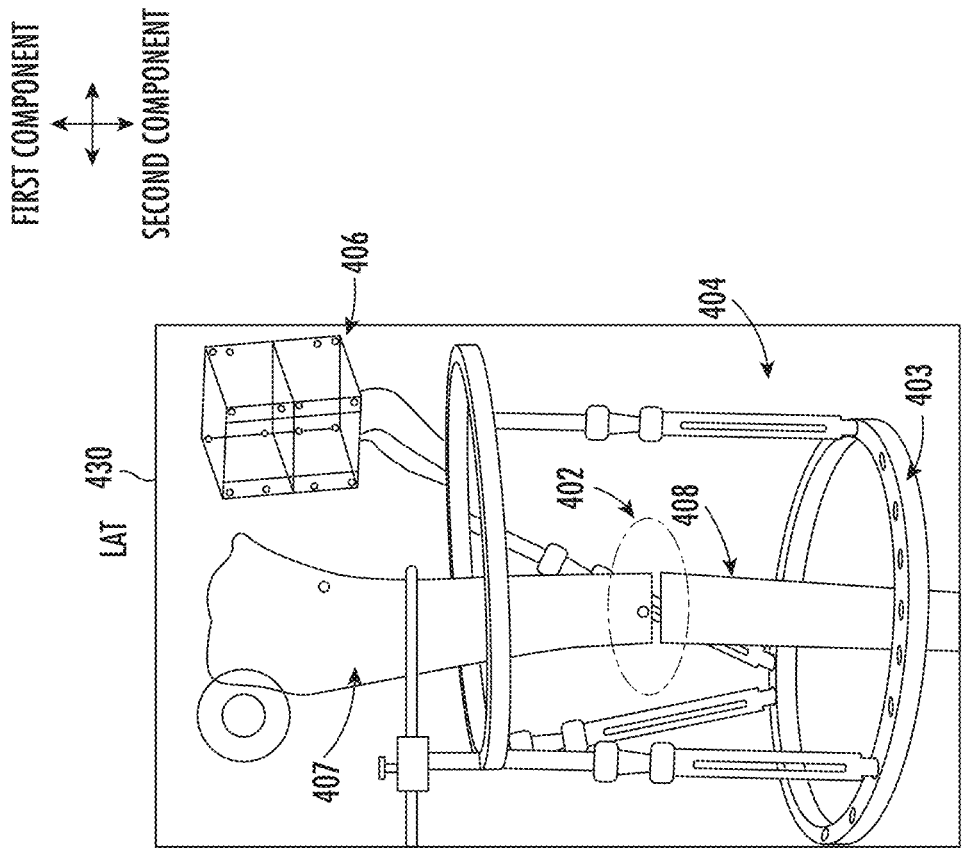
FIGS. 4A-4J illustrate embodiments of postoperative radiographs (such as x-ray images) of a process of determining movements of two bone segments of a misaligned tibia to align the misaligned tibia by adjustment of the radiographs.
Figure 4B:
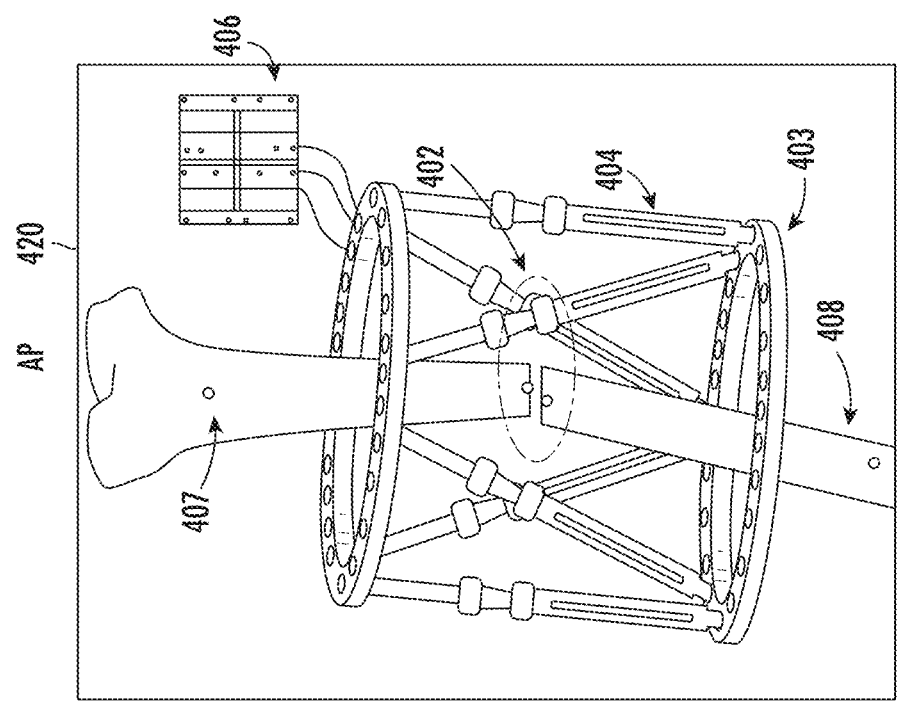

FIGS. 4A-B illustrate post-operative images uploaded by a user for the deformity analysis. Deformity analysis logic circuitry such as the deformity analysis logic circuitry 188 may interact with the user to identify and upload the images such as 2D images or 3D images including two bone segments attached to an external fixator. The user may upload and/or import two digital x-rays of a bone taken at different orientations. Typically, AP and LAT radiographs will be used but it is not necessary for the images to be exactly AP or LAT. The images are scaled by any means and can be edited, if necessary, to improve image quality. The orientations of the images (i.e. which side is medial and which way is anterior) may be established by either placing the images in predetermined orientations or by placing labels on the images. Furthermore, an x-ray marker(s) common to the two 2D images of known size and orientation and attached to a known location of the external fixator can be used to establish a common point between the two 2D images.

FIGS. 4A and 4B include an AP image 420 and a LAT image 430, respectively. The images 420 and 430 are scaled and show a first bone segment 407 and a second bone segment 408 of a fracture 402 attached to a bone alignment device 11. The bone alignment device 11 includes at least a ring 403, a strut 404, and a marker 406 attached to the bone alignment device 11 and common to both the AP image 420 and the LAT image 430. Thus, the deformity analysis logic circuitry 188 may automatically and/or through interaction with the user, identify one or more of these structures or markers of known size and orientation to establish a common point between the AP image 420 and the LAT image 430.

Figure 4C:
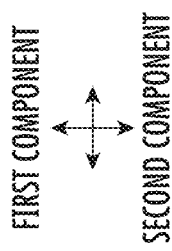
Figure 4C:
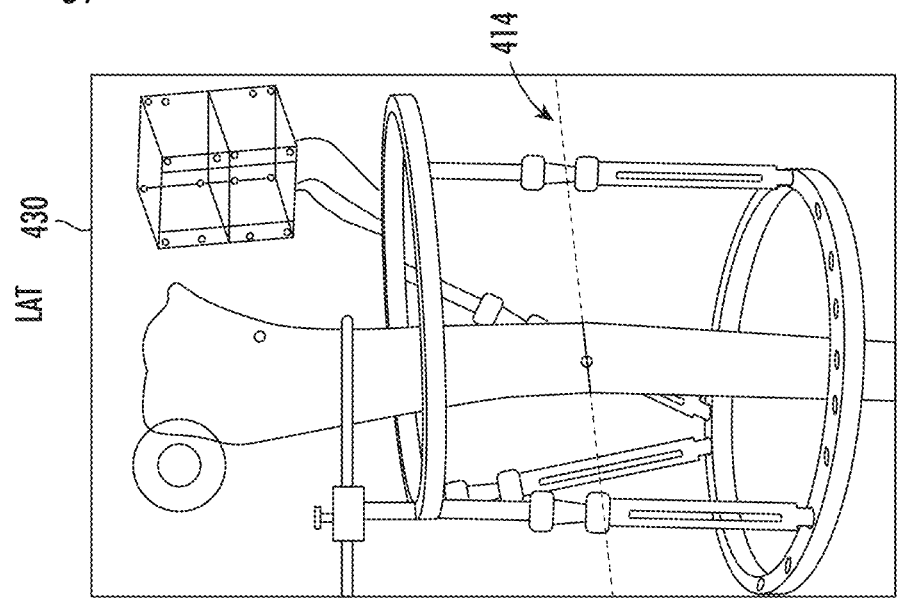
Figure 4D:
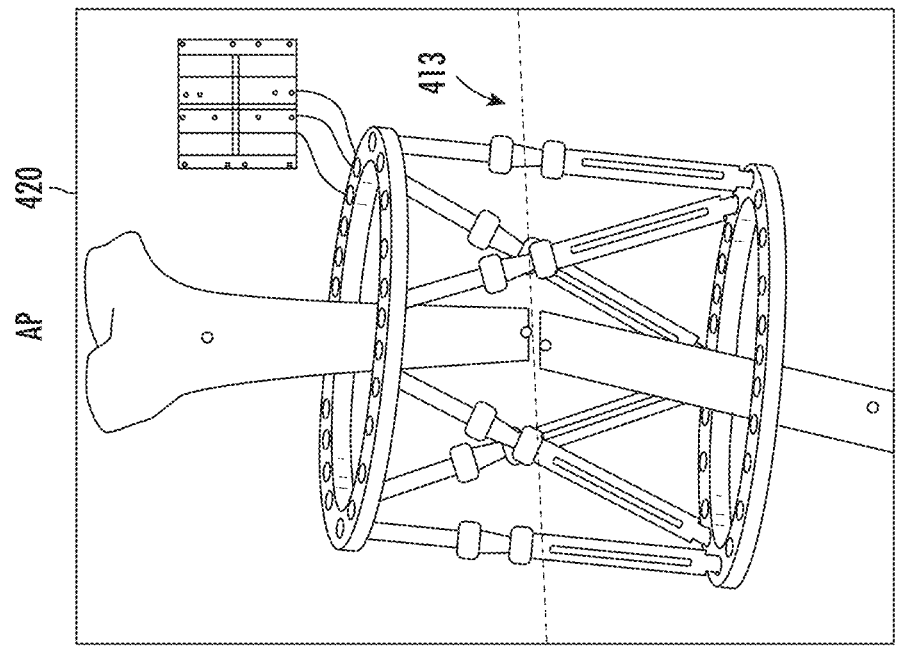

FIGS. 4C-D illustrate an overlay of cut lines 413 and 414 to divide the images 420 and 430 into two portions. The image may be digitally divided into two segments by, e.g., drawing a line, drawing a shape around a segment of the image, or other means. The first portions may include the first bone segment 407 and the second portions may include the bone segment 408. Thereafter, the deformity analysis logic circuitry 188 may interact with the user to analyze the images independently to capture the deformity parameters.

Figure 4F:
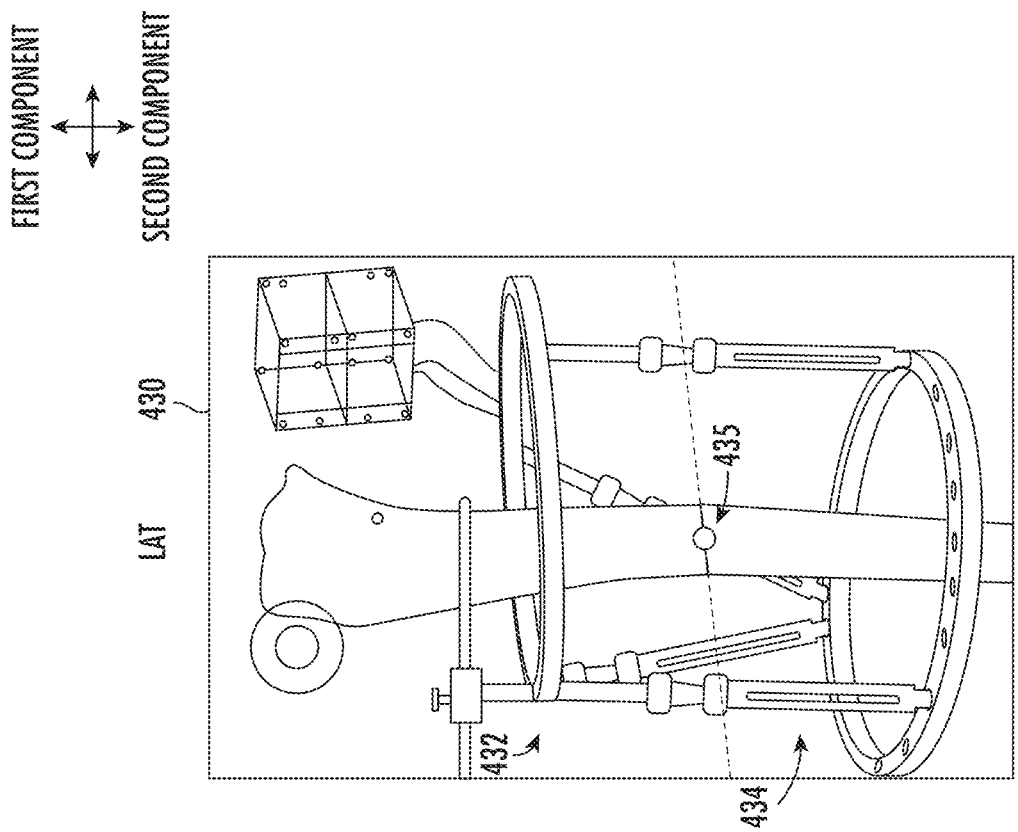
Figure 4E:
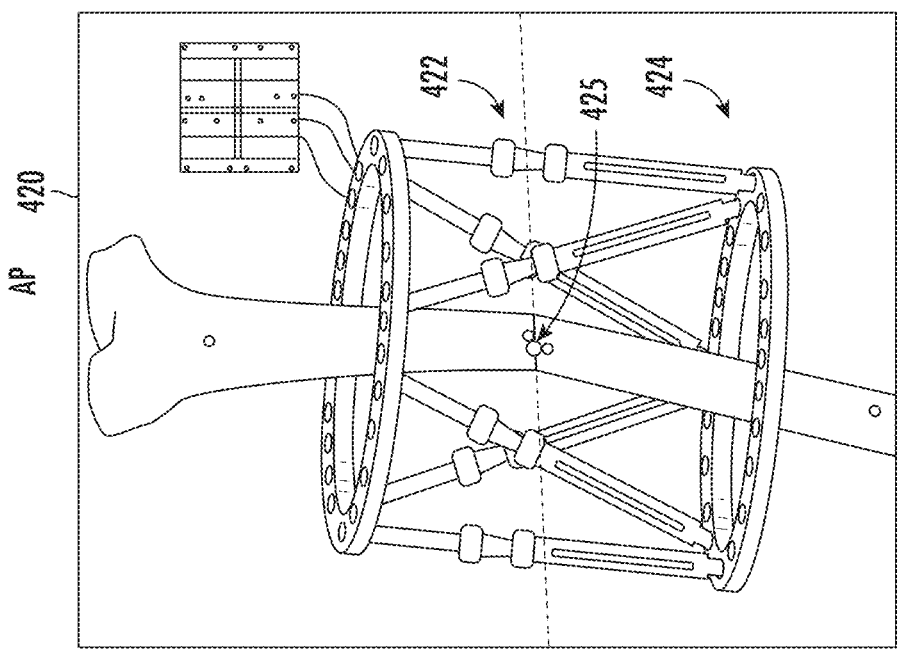

FIGS. 4E-F illustrate the division of the images into two portions. In the present embodiment, the deformity analysis logic circuitry 188 may divide image 420 into a first portion 422 including a first bone segment and a second portion 424 including a second bone segment. Similarly, the deformity analysis logic circuitry 188 may divide image 430 into a first portion 432 including a first bone segment and a second portion 434 including a second bone segment.

The deformity analysis logic circuitry 188 may interact with the user to move one image segment relative to the other by translating and/or rotating about a movable rotation point, such as the rotation point 425 at the bottom of the first bone segment in the image 420 and the rotation point 435 at the bottom of the first bone segment in the image 430, to achieve the desired final alignment. The alignment is not constrained by any lines and/or points but is driven by the user. The deformity analysis logic circuitry 188 (or tracking logic circuitry 184) may track the changes to the position and angulation of the moving image segment. Since the images were scaled, a common point between the two images was established, and the movement of the moving image segment was tracked the deformity analysis logic circuitry 188 (or tracking logic circuitry 184) can establish a 3D coordinate system for the deformity and back calculate the initial deformity parameters of the deformed bone. The deformity parameters can advantageously be displayed in real-time as the moving image segment is adjusted.

Note that if an x-ray marker was not used to create a common point between the images, then a point may be placed in each image that is at point visible and recognizable in both images. The point can be an anatomical landmark or a distinct point on the hardware. The point can be placed via user input or automated through image recognition algorithms.

Figure 4G:
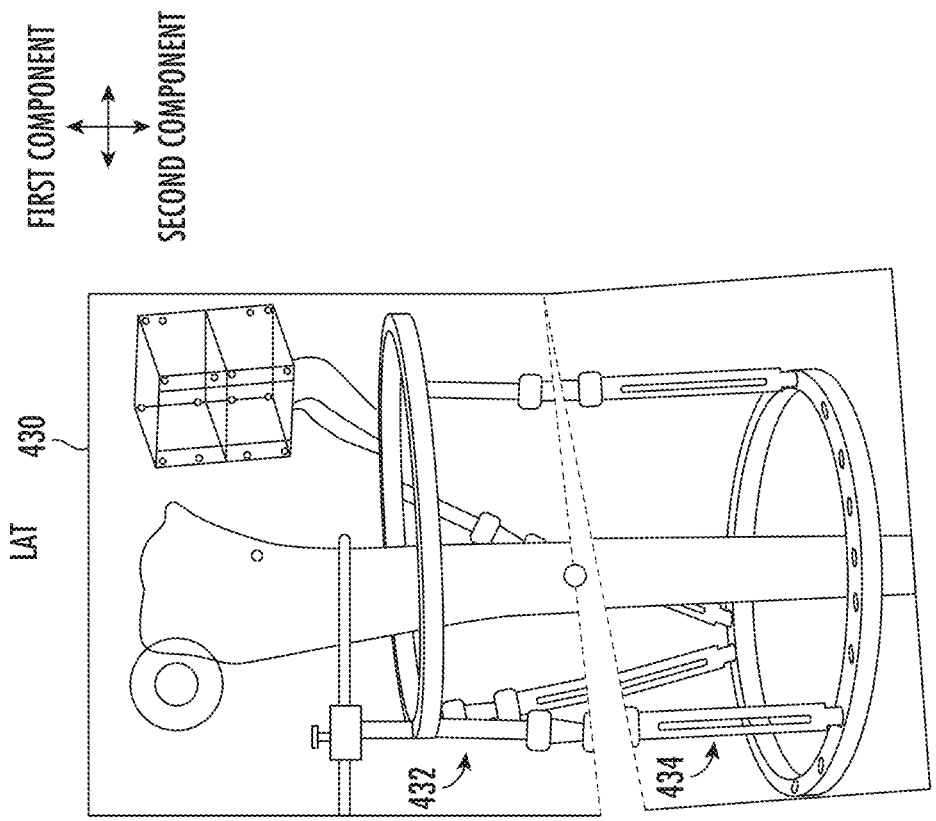
Figure 4H:
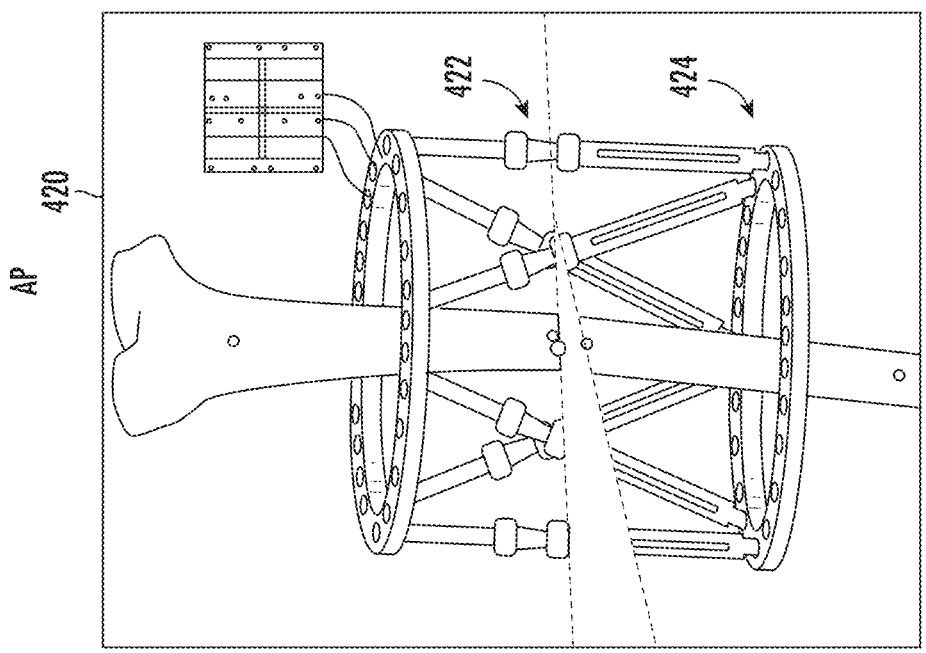

FIGS. 4G-H illustrate manipulation of the two portions. In the present embodiment, the deformity analysis logic circuitry 188 may the fix the first portions 422 and 432 of the images 420 and 430, respectively, and facilitate manipulation of the second portions 424 and 434 by the user to determine an acceptable final alignment of the bone segments.

Figure 4J:
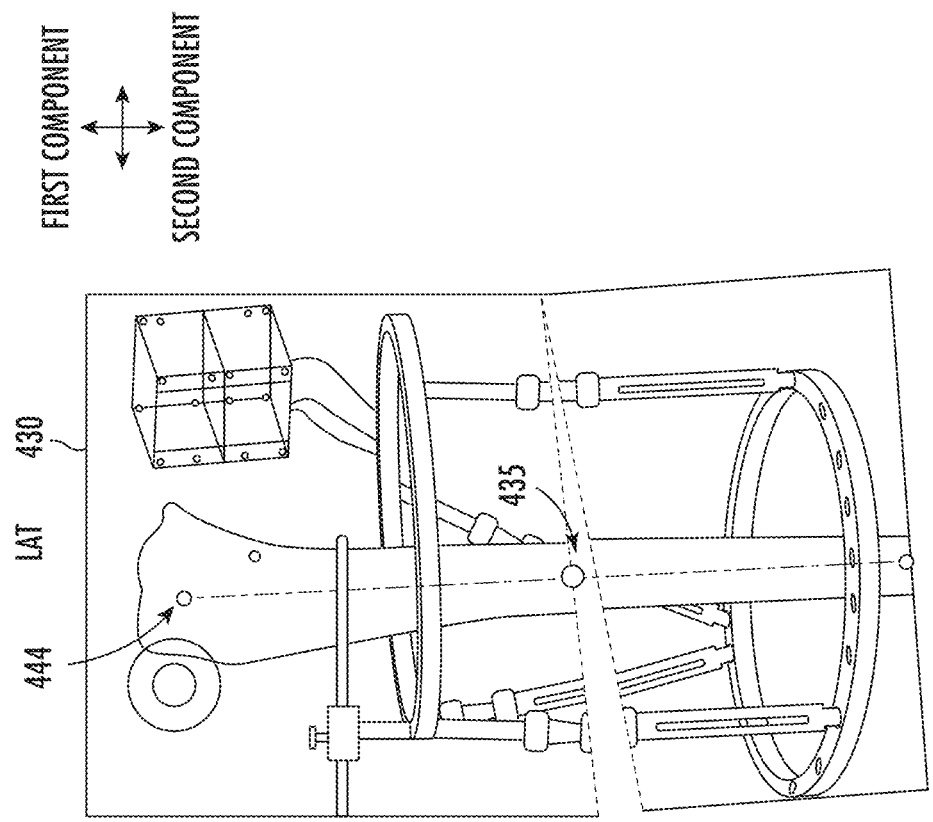
Figure 4I:
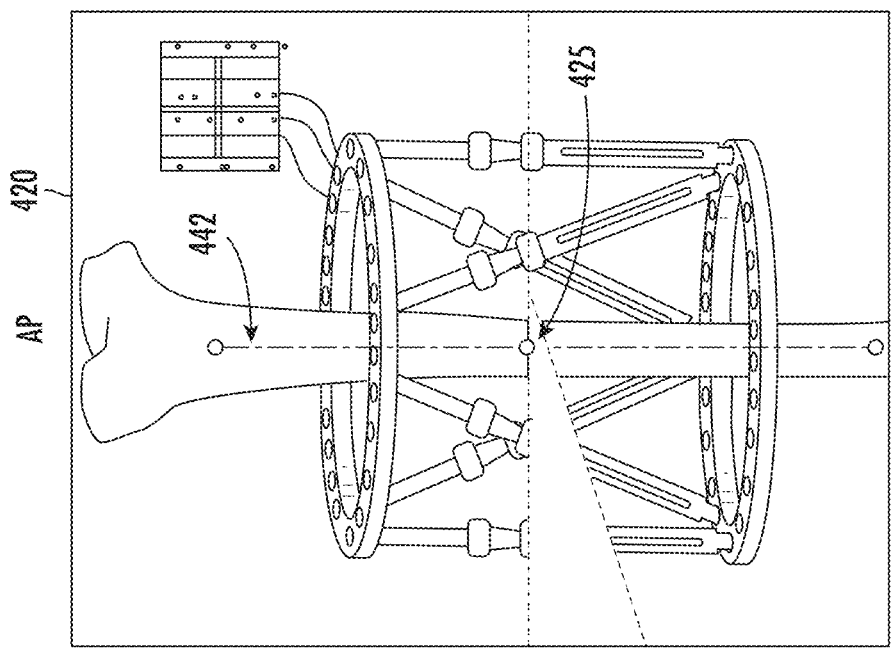

FIGS. 4I-J illustrate an optional inclusion of a mechanical axis overlay 442 in the AP image 420 and an optional inclusion of a mechanical axis overlay 444 in the LAT image 430. In some embodiments, the deformity analysis logic circuitry 188 may provide tools for the user to place reference lines/axes and rulers and take measurements to verify the final alignment is acceptable. The user can choose to visually check their final alignment without placing any lines if desired because the lines/axes and measurements do not drive the correction in many embodiments.

In some embodiments, the deformity analysis logic circuitry 188 may require axis lines such as 442 and 444 be placed to orient the coordinate system of each image and define the directions of the deformity parameters. Other embodiments assume an axis of the stationary bone segment in image segments 422 and 432 to pass through the rotation points 425 and 435 in a set orientation, such as vertical relative to images 420 and 430, by requiring the uploaded images to be oriented in a specified manner.

After the final alignment is accepted, the deformity analysis logic circuitry 188 may interact with the user to define the mounting parameters of the hardware. Some embodiments utilize the rotation points 425 and 435 on the images 420 and 430 as one common point or origin in 3D space by requiring the rotation points 425 and 435 be located in the same place on both images such as the center of the stationary bone at cut lines 413 and 414. In such embodiments, the location of the external fixator relative to the bone segments may be quantified as mounting parameters by the deformity analysis logic circuitry 118 by calculating the distance between the rotation points 425 and 435 and x-ray marker 406, which can be related back to a specific location on the external fixator, such as the center of a ring by the library logic circuitry 190. If x-ray marker(s) such as 406 are not found in the images 420 and 430 then the external fixator location must be defined through graphical input on the image such as placing an ellipse on the ring. Furthermore, the mounting parameters may be captured by manual input of the required distances from the user.

In addition to defining the deformity and the mounting parameters, the comprehensive logic circuitry 180 may interact with the user to define the rate at which to deformity should be corrected through the treatment logic circuitry 192. Thereafter, the treatment logic circuitry 192 may create a treatment plan. In further embodiments, the comprehensive logic circuitry 180 may also include treatment logic circuitry to receive and account for additional inputs from the user. For instance, the inputs may comprise modification of the correction path, marking of the structures that are to be protected during the correction, and possibly other processes. Such inputs during the creation of a treatment plan may improve the patient's experience.

Figure 4K:
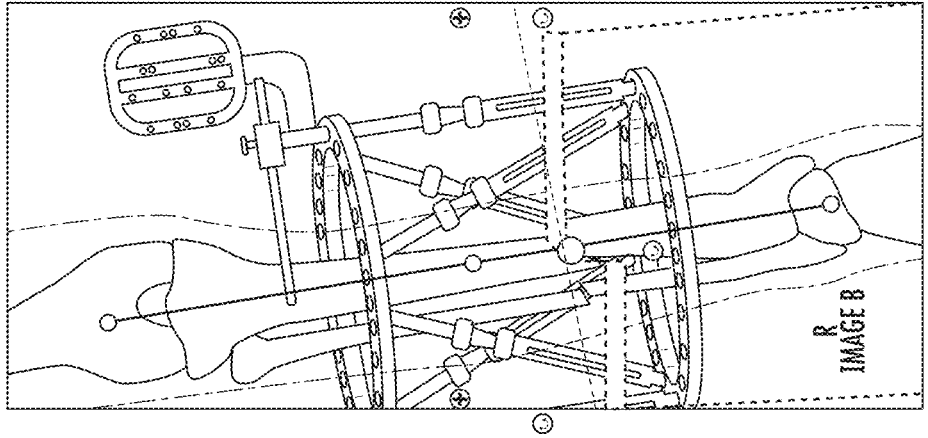
FIG. 4K depicts an embodiment of a screen shot of the process illustrated in FIGS. 4A-4J within an embodiment of comprehensive logic circuitry.

FIG. 4K depicts an embodiment 460 of a screen shot of the process illustrated in FIGS. 4A-4J within an embodiment of comprehensive logic circuitry 180 including a comprehensive software solution for a bone alignment device.

Figure 5A:
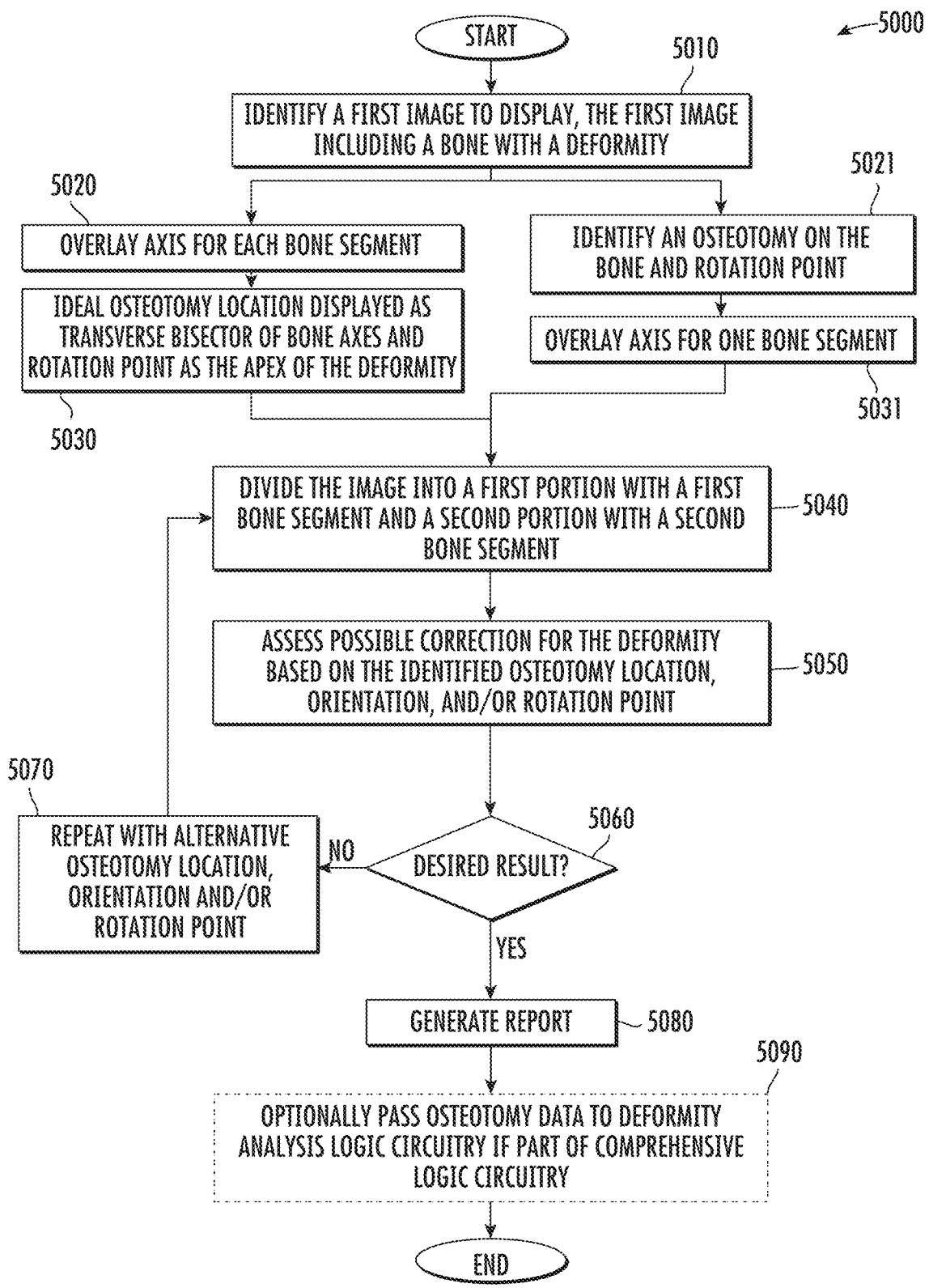
FIG. 5A depicts a flowchart of embodiments to identify a preoperative osteotomy.

FIG. 5A depicts a flowchart 5000 of embodiments to identify a preoperative osteotomy. The flowchart 5000 starts with identifying a first image to display, the first image including a bone with a deformity (element 5010). For instance, a server computer such as the server computer 3 in FIG. 1A may comprise osteotomy logic circuitry 182 to transmit or identify a scaled radiograph or other scaled image for a patient or to interact with a user of a computer such as the HCP device 4 in FIG. 1A to identify a scaled, first image for processing. In other embodiments, osteotomy logic circuitry 182 of the HCP device may interact with a user to identify a scaled radiograph to process to determine an osteotomy location and orientation. Images can have any known scale or any scale that can be determined through analysis. Furthermore, the image may comprise a 2D image or a 3D image.

After identifying the first image, the remote computer may display the first image to facilitate graphical input and/or other input from a user of the remote computer. The user may then choose to overlay the axis of each bone segment (element 5020). Thereafter, the osteotomy logic circuitry 182 will suggest the ideal osteotomy location and rotation point (element 5030) on the bone segment in the first image. In some embodiments, the user may place the osteotomy and rotation point (element 5021). If axes for the two bone segments have not been defined, the osteotomy logic circuitry 182, in some embodiments, may automatically, or through interaction with a user, overlay an axis through one of the bone segments (element 5031).

Depending on the embodiment, the HCP device 4 may divide the first image into two portions, the server computer 3 may divide the first image into two portions and transmit the two portions to the HCP device 4, or the server computer 3 may divide the first image into two portions and interact with the user via the HCP device 4 to facilitate movement of the portions via graphical input by the user. The first portion may include a first bone segment of the bone and the second portion may include a second bone segment of the bone (element 5040).

Some users may prefer to review and possibly take measurements of the bone structure to assess or evaluate alignment of the bone segments based on one or more reference lines such as the axes of the bone segments. Other users may prefer to evaluate the alignment based on the images of the aligned bone segments and, thus, may not want to use the one or more reference lines such as the axes of the bone segments.

After dividing the first image into the two portions, the osteotomy logic circuitry 182 may interact with the user to move one or both portions to align the bone segments and assess whether the corrections for the bone segments align the bone segments well or if adjustments to the osteotomy location, orientation, and/or rotation point might improve the alignment (element 5050).

Several embodiments facilitate multiple osteotomy assessments so the user can advantageously select a desirable osteotomy preoperatively. If the user is not satisfied with the potential corrections (element 5060), the user may repeat the pre-operative osteotomy analysis with an alternative osteotomy location, orientation, and/or rotation point (element 5070). Otherwise, the osteotomy logic circuitry 182 may generate a report (element 5080) for the user to describe the osteotomy and may pass the pre-operative osteotomy data to the deformity analysis logic circuitry 188 and/or a navigated surgery logic circuitry 186 (element 5090).

Figure 5B:
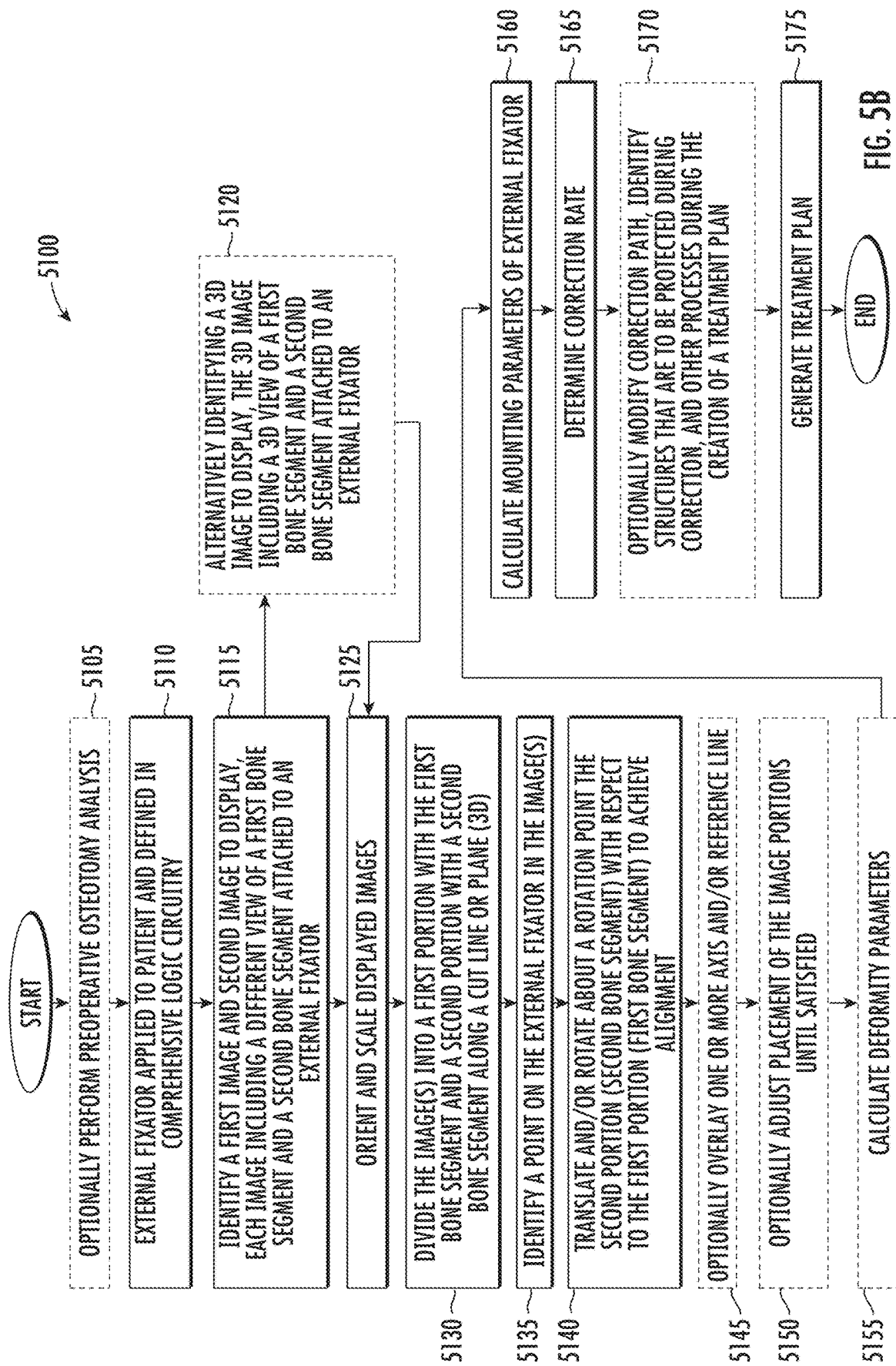
FIG. 5B depicts a flowchart of embodiments for deformity analysis with optional preoperative osteotomy and optional additional tools to generate a treatment plan.

FIG. 5B depicts a flowchart 5100 of embodiments to perform a comprehensive set of processes to create a treatment plan for an external fixator. Some embodiments perform osteotomy analysis (5105) such as what is described in FIG. 5A, deformity analysis, define the hardware, and incorporate additional treatment parameters to create a treatment plan for an external fixator to improve the patient's experience. Other embodiments may perform deformation analysis, define the hardware, and incorporate additional treatment parameters to create a treatment plan for an external fixator to improve the patient's experience but skip osteotomy planning.

After performing the pre-operative osteotomy, the surgeon may receive a report indicating the location of the osteotomy as well as a pre-operative deformation analysis to aid with a surgical osteotomy.

Figure 5C:
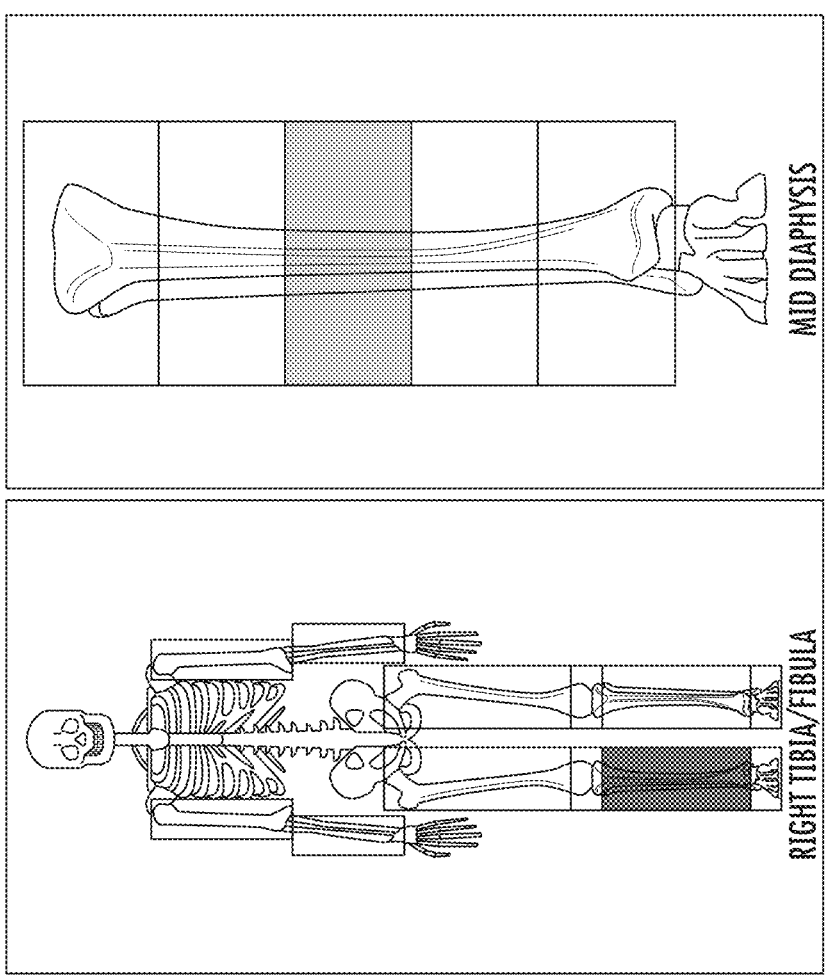
FIG. 5C depicts an embodiment of a graphical user interface of a comprehensive logic circuitry defining a correction area of the patient's external fixator.
Figure 5D:
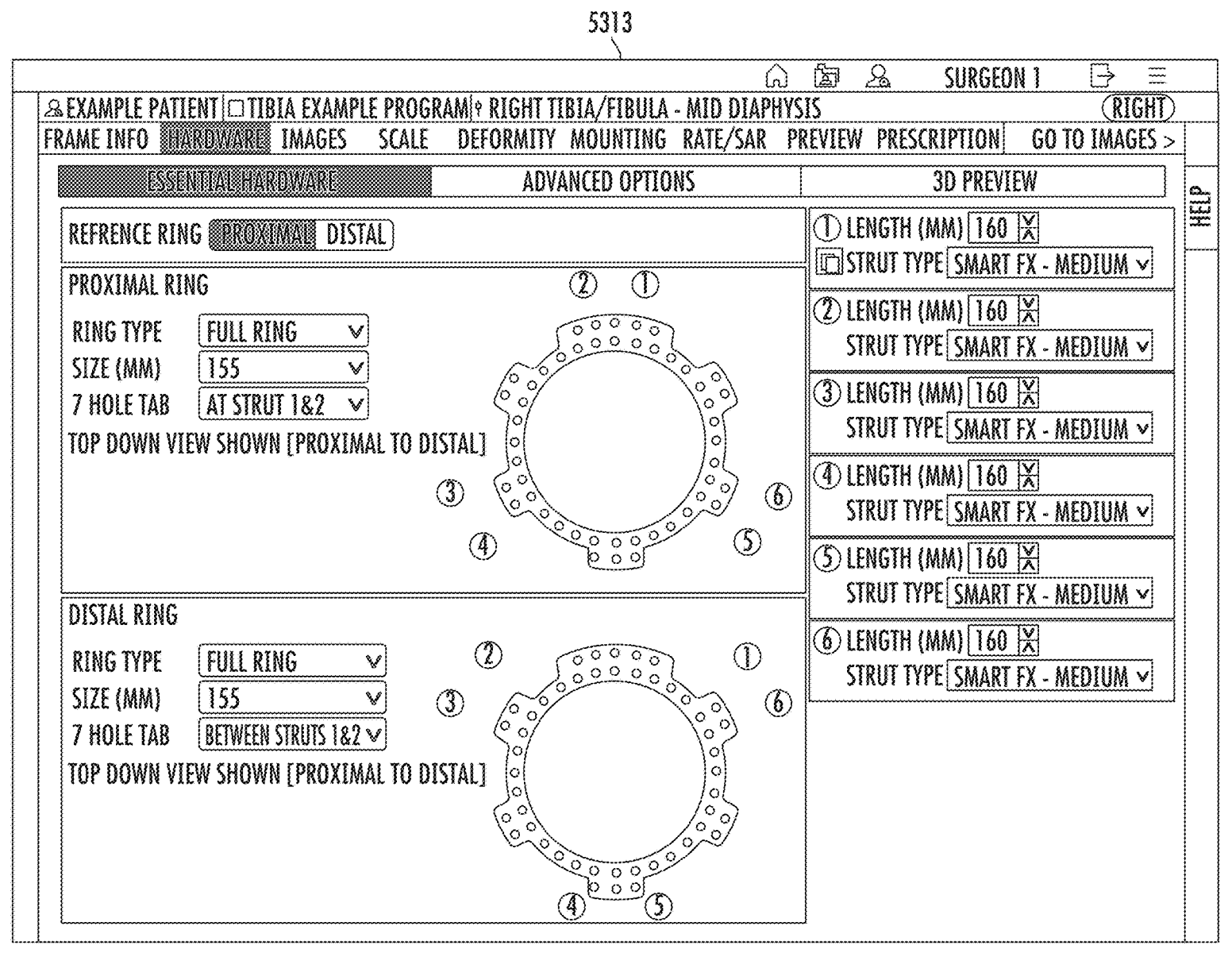

Once the external fixator is selected and attached the bone segments, a user may enter information about the external fixator into memory of the comprehensive logic circuitry 180 (element 5110). FIG. 5C depicts an embodiment of a graphical user interface 5310 of a comprehensive logic circuitry defining a correction area of the patient's external fixator for element 5110. FIG. 5D depicts an embodiment of a graphical user interface 5313 of a comprehensive logic circuitry defining the hardware used to construct the patient's external fixator for element 5110. For instance, the user may enter the size and type of the rings, the strut lengths, and/or the like. Other embodiments may access a library of information about one or more different external fixators and/or information about the patient to retrieve dimensions of rings and struts. In some embodiments, the external fixator may be defined by the comprehensive logic circuitry 180 later in the flow of flowchart 5100 but before a treatment plan is generated (element 5175).

Figure 5E:
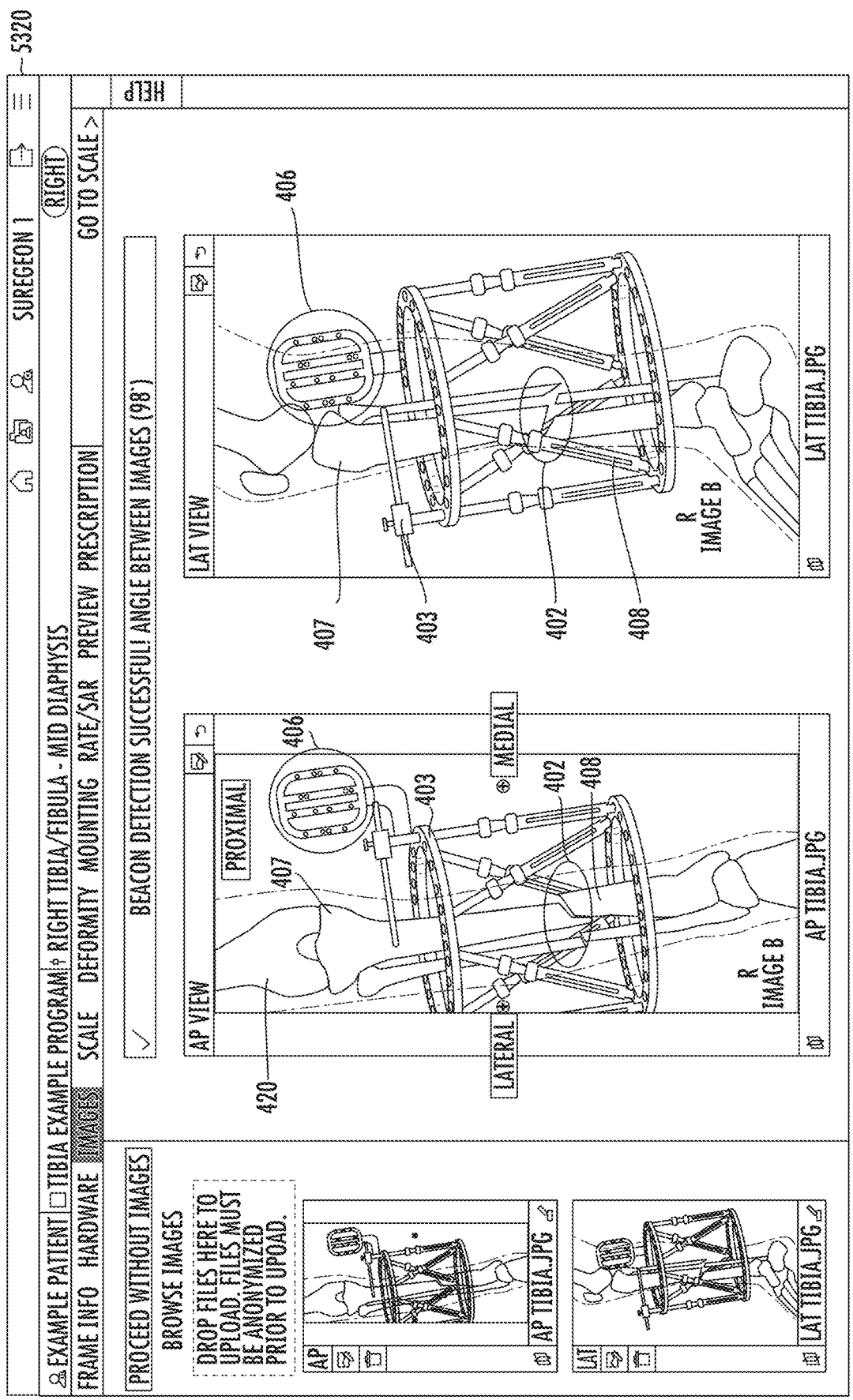
FIG. 5E depicts an embodiment of a graphical user interface of a comprehensive logic circuitry identifying an AP and LAT image containing bone fragments, a fixator, a fracture, and a marker, oriented to the to the anatomic labels shown.

With the external fixator specifications and dimensions, a user such as the surgeon or a medical assistant may identify one or more images in a patient's file to upload to the server computer 3 or the HCP device 4 for deformation analysis. The one or more images may contain one or more different 2D views of the first bone segment, the second bone segment, and the external fixator (element 5115). FIG. 5E depicts an embodiment of a graphical user interface 5320 of a comprehensive logic circuitry identifying an AP (420) and LAT image (430) containing bone fragments 407 and 408, fixator 403, fracture 402, and marker 406 for element 5115.

Alternatively, the user may identify and upload an image with a 3D view of the first bone segment, the second bone segment, and the external fixator (element 5120). For example, a server computer such as the server computer 3 in FIG. 1A may comprise deformity analysis logic circuitry 188 to transmit or identify a scaled radiograph or other scaled image for a patient or to interact with a user of a computer such as the HCP device 4 in FIG. 1A to identify a scaled, first image for processing. In other embodiments, deformity analysis logic circuitry 188 of the HCP device may interact with a user to identify a scaled radiograph to process to determine deformity parameters. Images can have any known scale or any scale that can be determined through analysis.

If the images are not scaled, the deformity analysis logic circuitry 188 may interact with the user to scale one or more of the images (element 5125). Scaling may be accomplished automatically with markers in the image or through user interaction. In addition to scaling, the deformity analysis logic circuitry 188 may optionally perform additional processes to improve the quality of the images and may place the images in predetermined orientations or label the images with the orientation of the images (element 5125). FIG. 5E depicts an embodiment of a graphical user interface 5320 of a comprehensive logic circuitry with images 420 and 430 oriented to the to the anatomic labels shown in the display for element 5125.

In some embodiments, scaling and orientation of the images may take place later in the flow of flowchart 5100 but no translational measurements can be displayed or calculated until the images are scaled and oriented by some means. Some embodiments may orient the image according to anatomical directions with an axis, line, vector, or the like drawn within the image (element 5145).

Figure 5F:
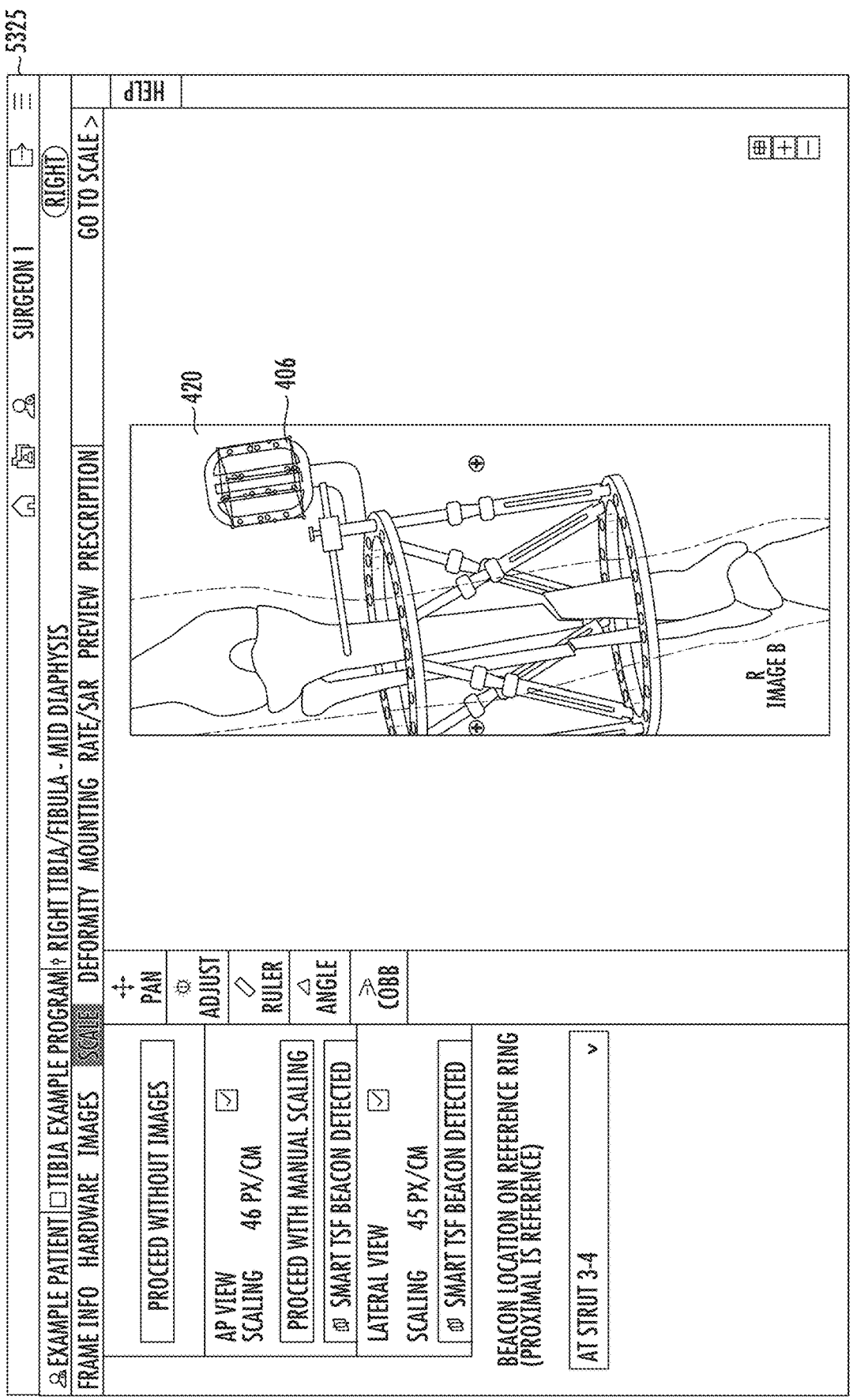
FIG. 5F depicts an embodiment of a graphical user interface of a comprehensive logic circuitry showing scaled images per a marker at the location on the external fixator in both the two-dimensional images.
Figure 5G:
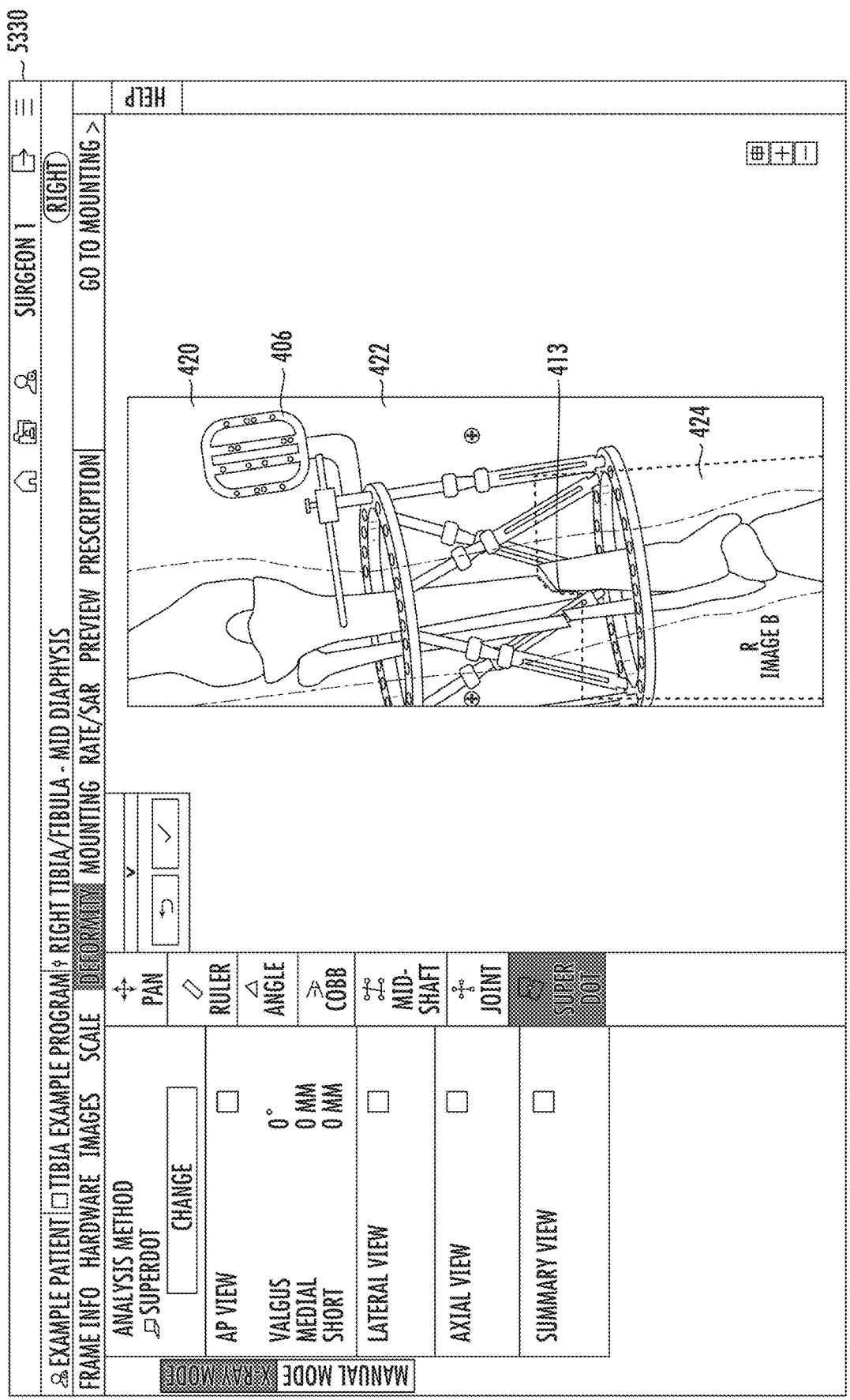
FIG. 5G depicts an embodiment of a graphical user interface of a comprehensive logic circuitry with an AP image divided into two portions by cut line.
Figure 5H:
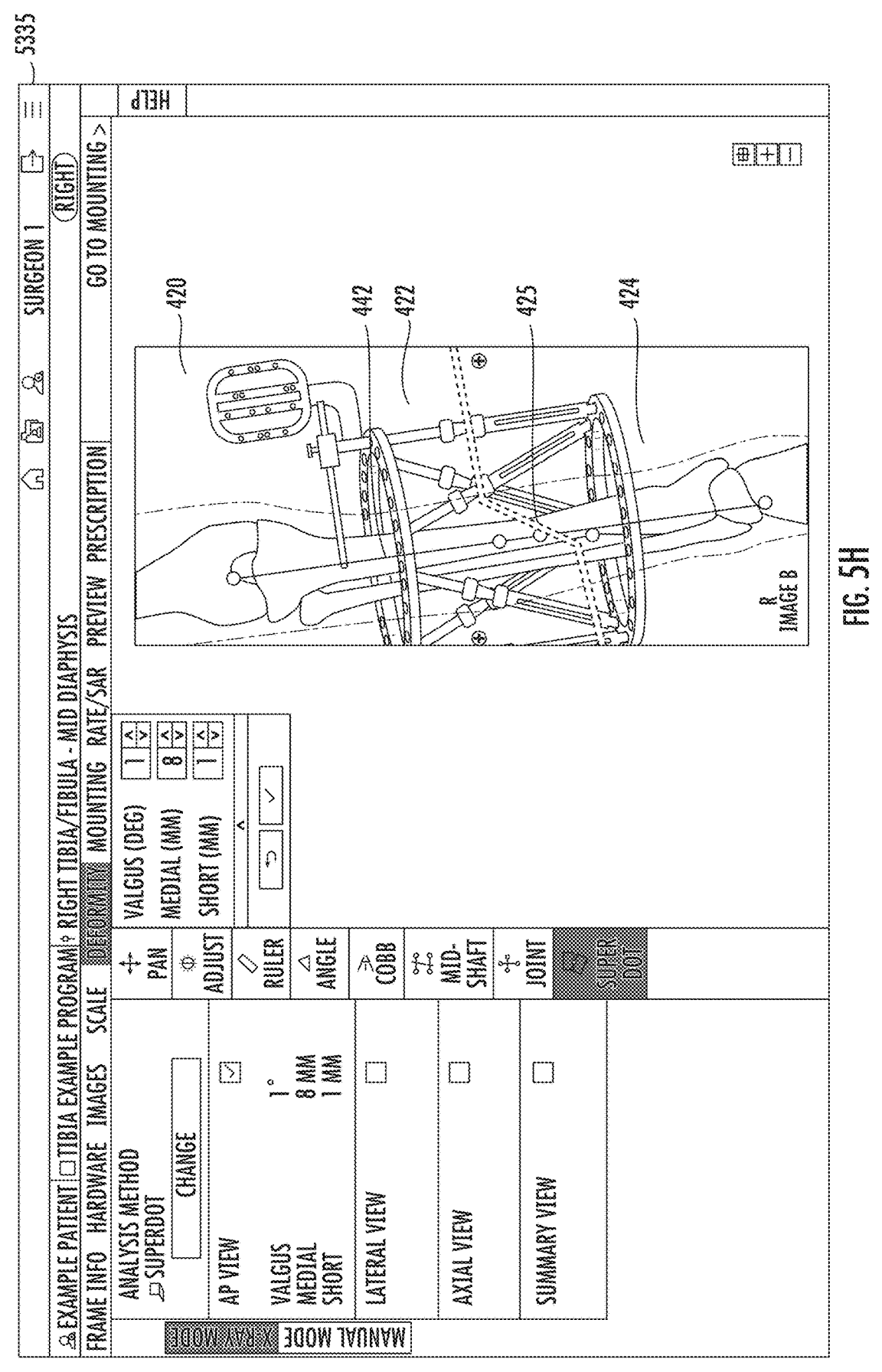
Figure 5I:
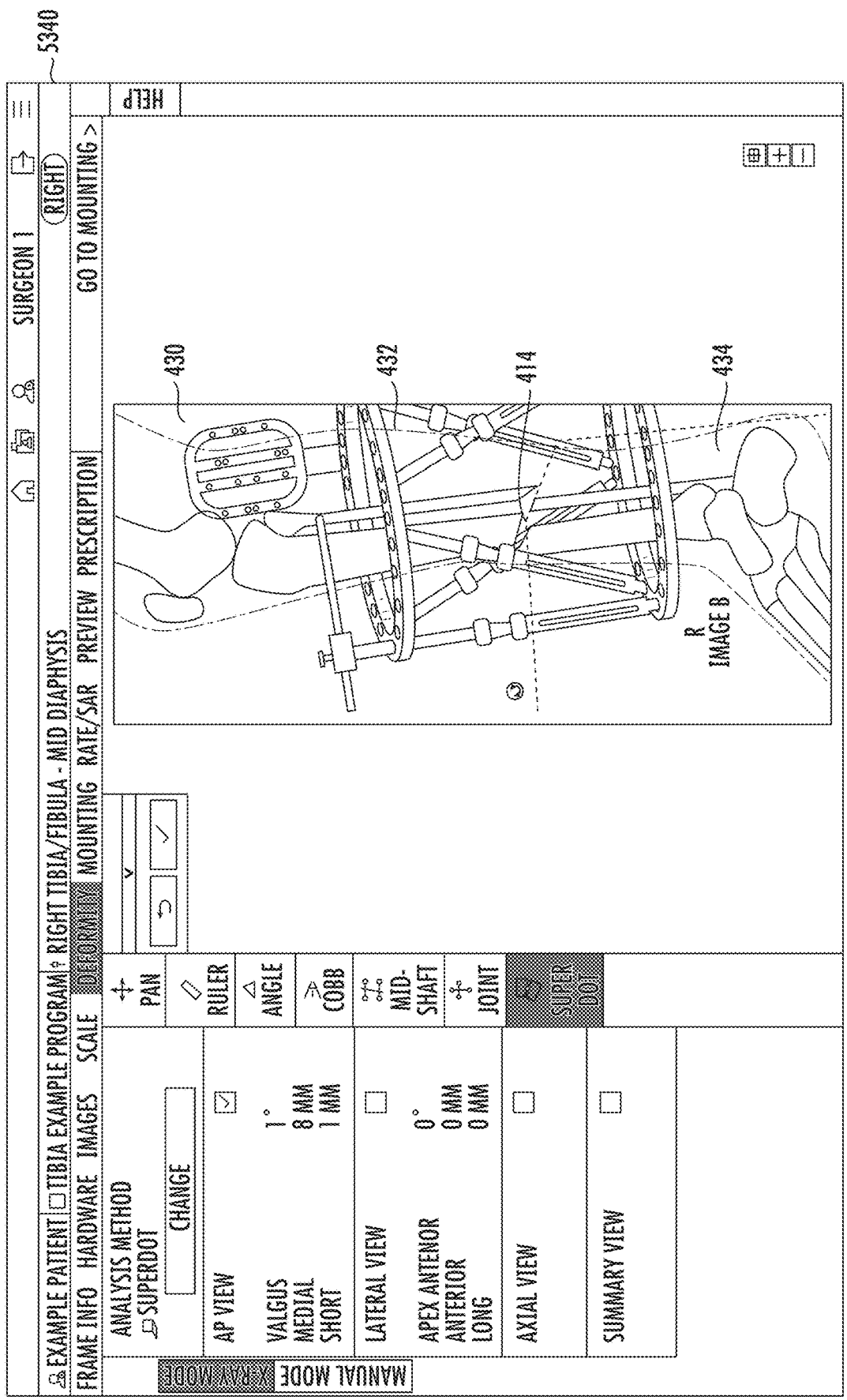
FIG. 5I depicts an embodiment of a graphical user interface of a comprehensive logic circuitry showing a LAT image divided into two portions by cut line.

The deformity analysis logic circuitry 188 may divide the scaled and optionally oriented image(s) into a first portion with the first bone segment and a second portion with a second bone segment (element 5130). This can be done by drawing a line, drawing a shape around a segment of the image, placing a plane in 3D, or other means. In some embodiments, the deformity logic circuitry 188 may automatically or through interaction the user, identify or determine a cut line for 2D images or a cut plane for 3D views and optionally overlay the cut line or cut plane on the image(s) (element 5130). FIG. 5G depicts an embodiment of a graphical user interface 5330 of a comprehensive logic circuitry showing an AP image 420 divided into two portions 422 and 424 by cut line 413 for element 5130, where the cut line appears as a dividing lasso. FIG. 5I depicts an embodiment of a graphical user interface 5340 of a comprehensive logic circuitry showing a LAT image 430 divided into two portions 432 and 434 by cut line 414, which appears as a dividing lasso, for element 5130.

After the orientations of the images are identified, the deformity analysis logic circuitry 188 may automatically through image recognition or through interaction with the user, identify one or more markers or structures, or common points (element 5135) in the images on the external fixator to locate the hardware within the image(s). For some embodiments using 2D images, the deformity analysis circuitry 188 utilizes the 2D position of the external fixator in each image and the orientation of the image planes, which can be derived from markers of known size and orientation in the images, to calculate the orientation of the external fixator in 3D space. In some embodiments, the points associated with the external fixator may be identified at any point in the flow of FIG. 5B after the images are displayed (element 5115). FIG. 5F depicts an embodiment of a graphical user interface 5325 of a comprehensive logic circuitry showing scaled images per a marker at the location on the external fixator (dropdown menu stating At Strut 3&4), which provides a point on the external fixator in the images common to both the two-dimensional images for element 5135.

Figure 5J:
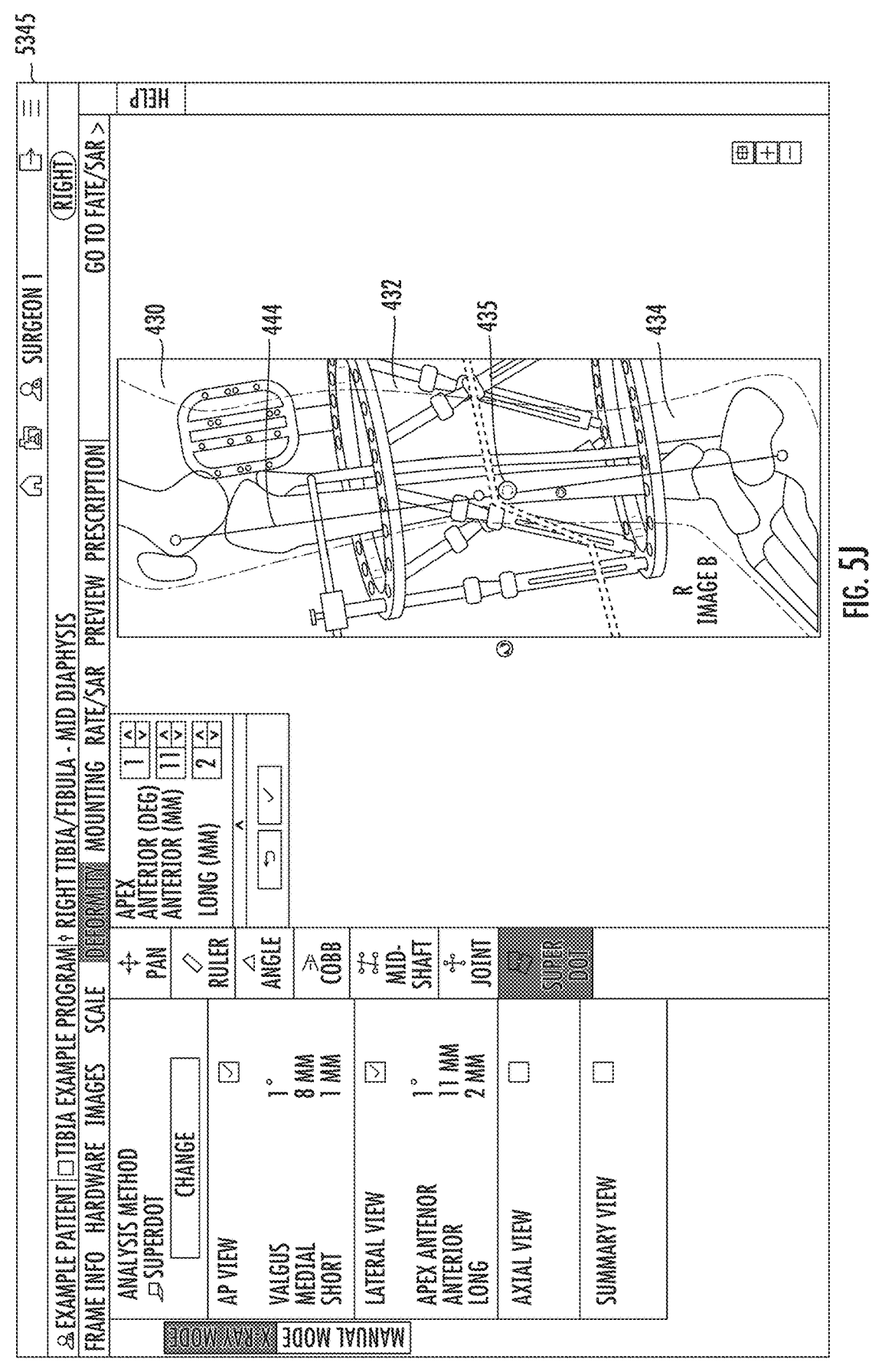

The user may manipulate one or both of the portions of the divided images through translations and/or rotations about a rotation point to align the first bone segment in the first portion with the second bone segment in the second portion (element 5140). FIG. 5H depicts an embodiment of a graphical user interface 5335 of a comprehensive logic circuitry with a second image portion 424 rotated relative to a first image portion 422 about rotation point 425 to achieve alignment for element 5140. If using a 3D marker with both images the 2D deformity parameters can be projected into 3D. FIG. 5J depicts an embodiment of a graphical user interface 5345 of a comprehensive logic circuitry showing a second image portion 434 rotated relative to a first image portion 432 about rotation point 435 to achieve alignment for element 5140 and initial deformity parameters of the LAT view calculated as the image portions are manipulated for element 5155. If using a 3D marker with both images, the 2D deformity parameters can be projected into 3D. Furthermore, the Axial view translation can be measured from AP and LAT images. Any discrepancy between the AP and LAT axial translation measurements may be handled in the comprehensive logic circuitry. The Axial view rotation may be measured by clinical assessment and input into the comprehensive logic circuitry.

In some embodiments, the user may interact with tools of the deformity analysis logic circuitry 188 to overlay one or more reference lines such as a mechanical axis of the first bone segment, a mechanical axis of the second bone segment, and/or other reference lines, rulers, and dimensions (element 5145). In some embodiments, the axis of a bone fragment may be assumed within an image by the deformity analysis logic circuitry 188 depending on the orientation of the image and points, such as the rotation point, within the image. Some embodiments may require the rotation point be located in each image, such that the points represent a single point on a bone segment in 3D space. By combining a 3D point on a bone segment with the orientation of the bone segment in each image, either through orientation of the images or axes of the bone segment overlaid on the images, the 3D orientation of a bone segment may be fully defined. With a 3D location of a bone segment identified, the location of the external fixator (element 5135) may be related to the 3D coordinate system of the bone segment.

Figure 5K:
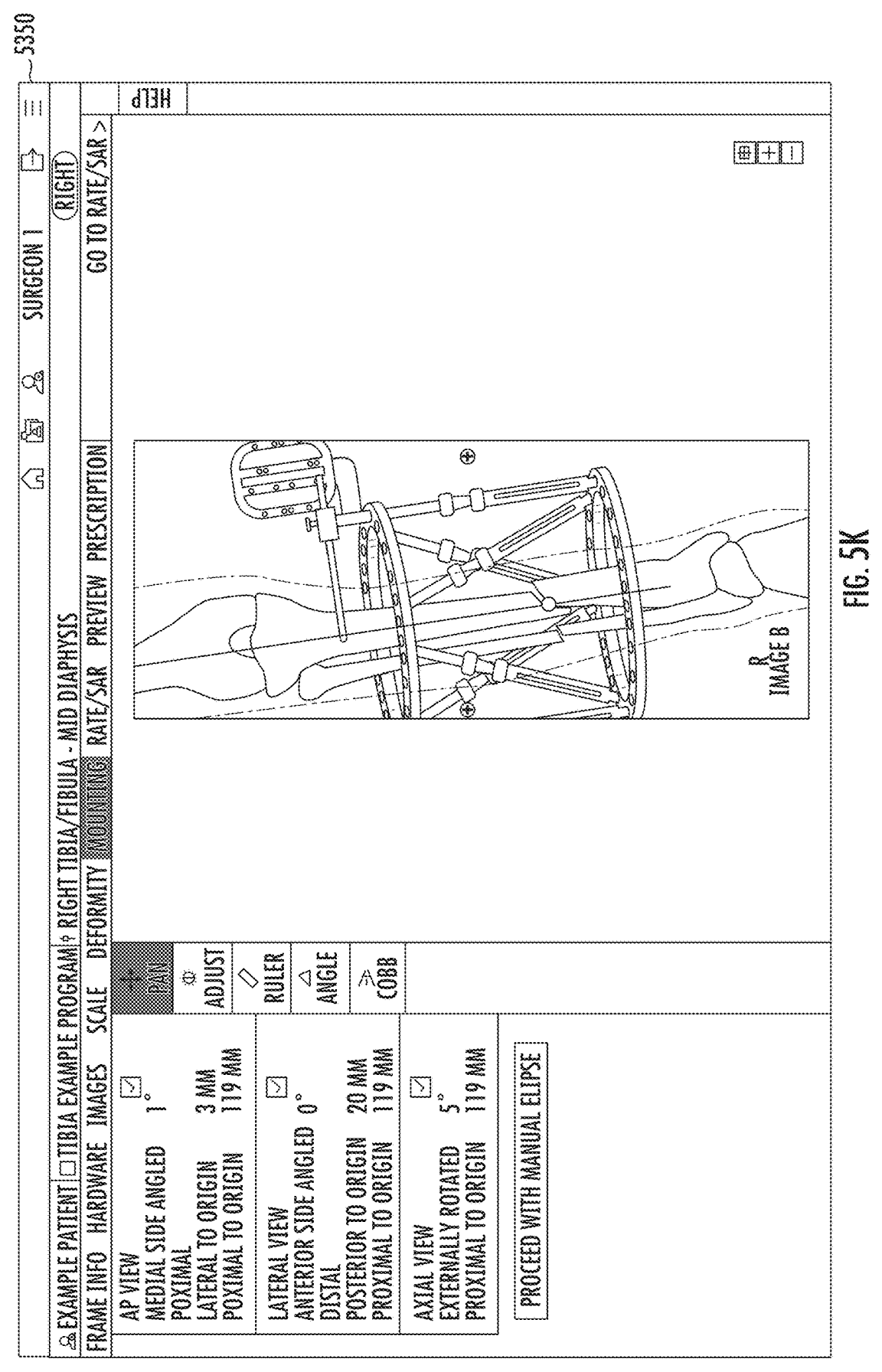

With the alignment of the bone segments and coordinates for a bone segment and the external fixator established, the deformity analysis logic may calculate the deformity parameters (element 5155) and the mounting parameters (element 5160). The order of calculation depends on the order of inputs necessary for the calculations. In some embodiments, the calculations of deformity parameters (element 5155) and mounting parameters (element 5160) may be distinct steps and, in others, the calculations may be simultaneous or concurrent. FIG. 5H depicts an embodiment of a graphical user interface 5335 of a comprehensive logic circuitry with initial deformity parameters of the AP view calculated as the image portions are manipulated for element 5155. Furthermore, FIG. 5K depicts an embodiment of a graphical user interface 5350 of a comprehensive logic circuitry showing calculated mounting parameters, which describe the location of the reference ring relative to the anatomy, for element 5160.

In some embodiments, if the user determines that the alignment can be improved through small adjustments (element 5150). The deformity analysis logic circuitry 188 may include nudge tools to facilitate movements, e.g., 1 millimeter or 2 millimeter translations and 1 degree or 2 degree rotations (element 5150). In some embodiments, the scale of the nudging adjustments may be modified by the user to accommodate smaller or larger adjustments. If all necessary inputs have been gathered, the calculated deformity parameters (element 5155) and mounting parameters (5160) resulting from adjustments of the image portions may be displayed by the deformity analysis circuitry 188 in real time.

Figure 5L:
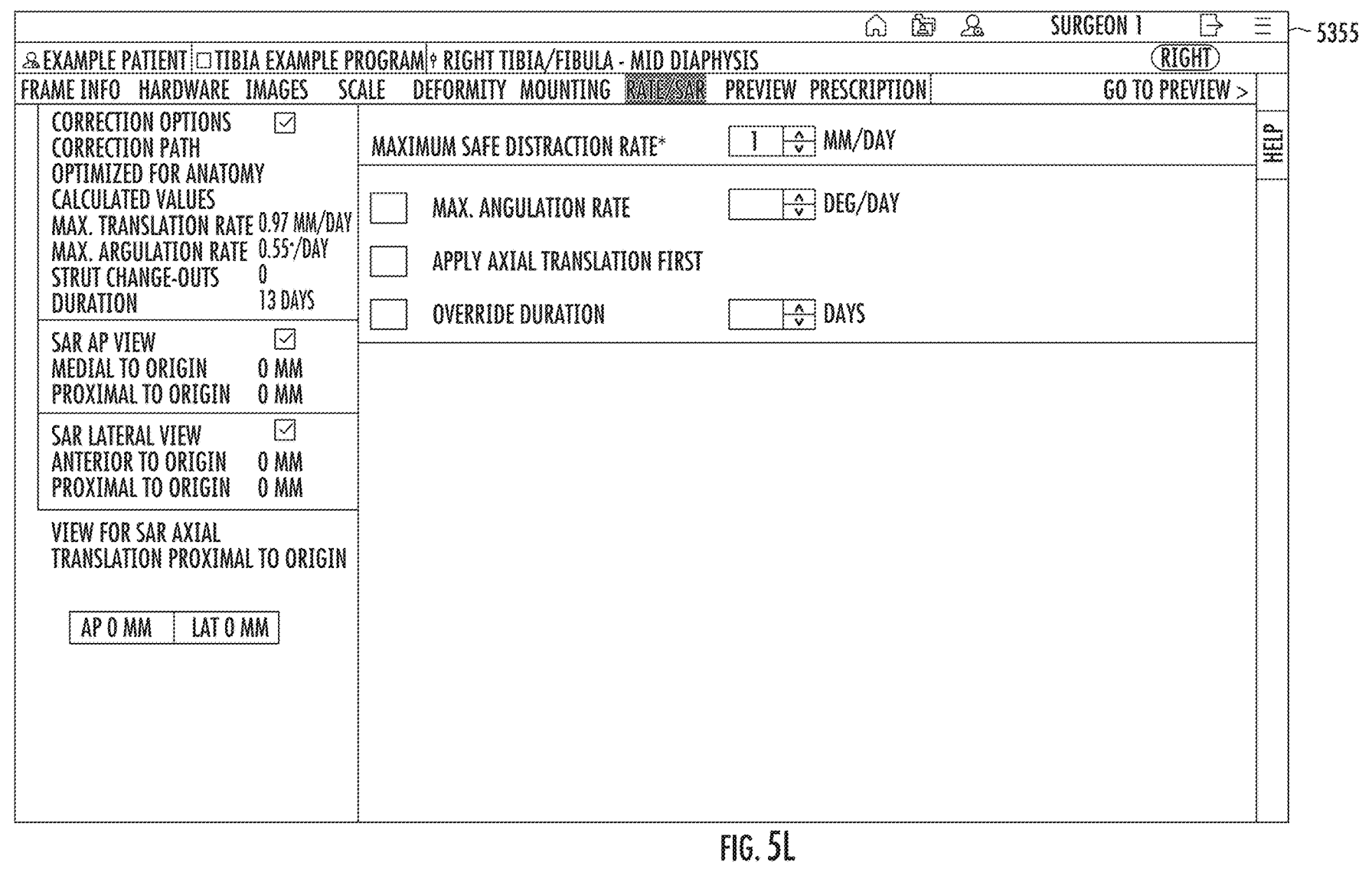

The user may enter the correction rate (element 5165) and then proceed to create a treatment plan. FIG. 5L depicts an embodiment of a graphical user interface 5355 of a comprehensive logic circuitry showing the determination of the Correction rate for element 5165.

The treatment plan may include a prescription for adjustment of the struts of the external fixator or similar adjustment for external fixators without struts (element 5175). FIG. 5M depicts an embodiment of a graphical user interface 5360 of a comprehensive logic circuitry showing a treatment plan generated for element 5175. In some embodiments, the user may also interact with a treatment logic circuitry 192 to refine the treatment plan to improve the experience of the patient by optionally modifying the correction path, marking structures that are to be protected during the correction, and performing other processes during the creation of a treatment plan (element 5170).

Figure 6:
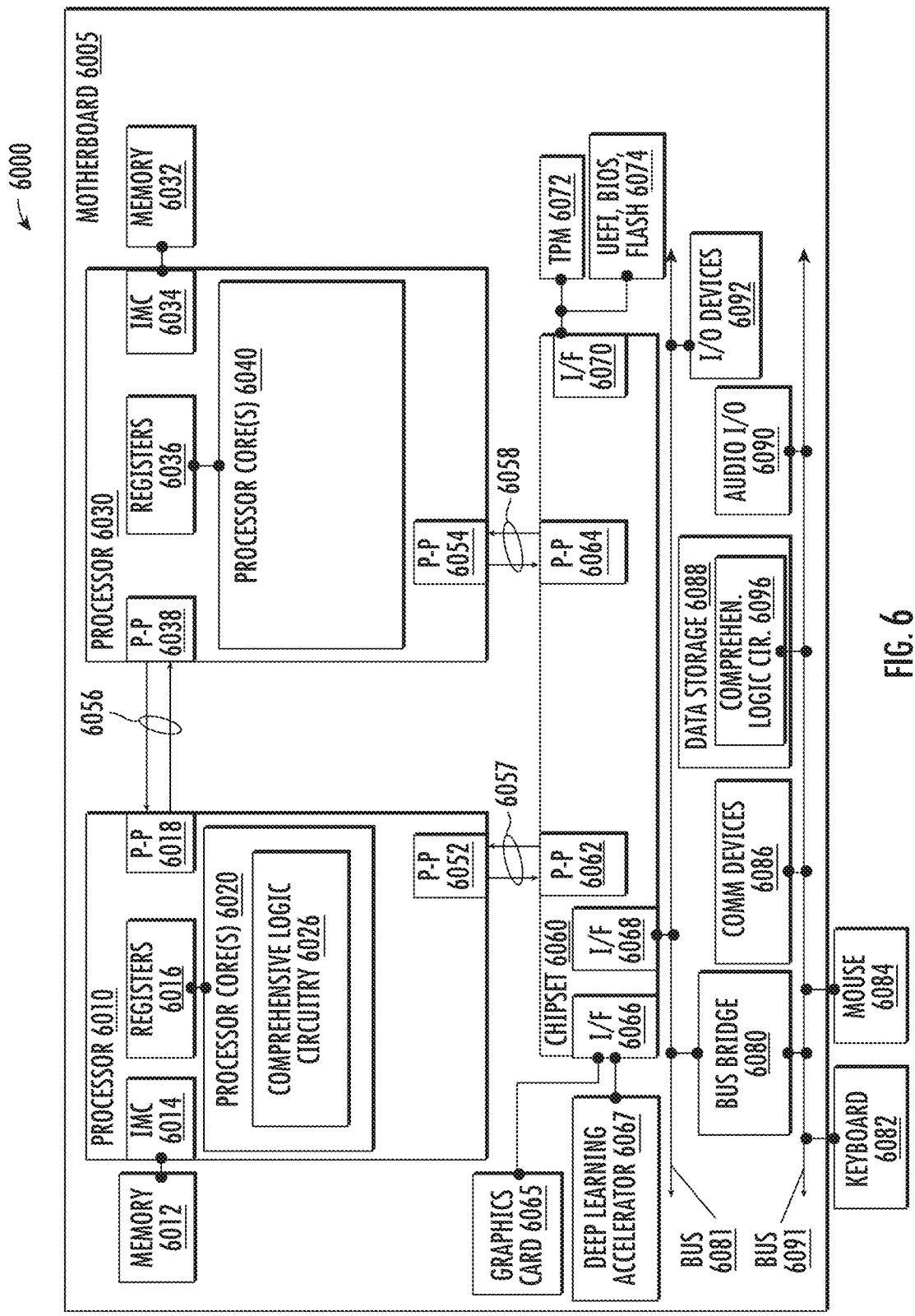
FIG. 6 depicts an embodiment of a system including a multiple-processor platform, a chipset, buses, and accessories the server computer, HCP device, and the patient device shown in FIG. 1A.

FIG. 6 illustrates an embodiment of a system 6000. The system 6000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 6000 may have a single processor with one core or more than one processor. Note that the term "processor" refers to a processor with a single core or a processor package with multiple processor cores.

As shown in FIG. 6, system 6000 comprises a motherboard 6005 for mounting platform components. The motherboard 6005 is a point-to-point interconnect platform that includes a first processor 6010 and a second processor 6030 coupled via a point-to-point interconnect 6056 such as an Ultra Path Interconnect (UPI). In other embodiments, the system 6000 may be of another bus architecture, such as a multi-drop bus. Furthermore, each of processors 6010 and 6030 may be processor packages with multiple processor cores including processor core(s) 6020 and 6040, respectively. While the system 6000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 6010 and the chipset 6060. Some platforms may include additional components and some platforms may only include sockets to mount the processors and/or the chipset.

The first processor 6010 includes an integrated memory controller (IMC) 6014 and point-to-point (P-P) interconnects 6018 and 6052. Similarly, the second processor 6030 includes an IMC 6034 and P-P interconnects 6038 and 6054. The IMC's 6014 and 6034 couple the processors 6010 and 6030, respectively, to respective memories, a memory 6012 and a memory 6032. The memories 6012 and 6032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 6012 and 6032 locally attach to the respective processors 6010 and 6030. In other embodiments, the main memory may couple with the processors via a bus and shared memory hub.

The processors 6010 and 6030 comprise caches coupled with each of the processor core(s) 6020 and 6040, respectively. In the present embodiment, the processor core(s) 6020 of the processor 6010 include a comprehensive logic circuitry 6026 such as the comprehensive logic circuitry 180 discussed in conjunction with FIGS. 1A and 1H. The comprehensive logic circuitry 6026 may represent circuitry configured to implement the functionality of deformity determinations for bone segments in one or more images within the processor core(s) 6020 or may represent a combination of the circuitry within a processor and a medium to store all or part of the functionality of the comprehensive logic circuitry 6026 in memory such as cache, the memory 6012, buffers, registers, and/or the like. In several embodiments, the functionality of the comprehensive logic circuitry 6026 resides in whole or in part as code in a memory such as the comprehensive logic circuitry 6096 in the data storage unit 6088 attached to the processor 6010 via a chipset 6060 such as the comprehensive logic circuitry 180 shown in FIG. 1H. The functionality of the comprehensive logic circuitry 6026 may also reside in whole or in part in memory such as the memory 6012 and/or a cache of the processor. Furthermore, the functionality of the comprehensive logic circuitry 6026 may also reside in whole or in part as circuitry within the processor 6010 and may perform operations, e.g., within registers or buffers such as the registers 6016 within the processor 6010, or within an instruction pipeline of the processor 6010.

In other embodiments, more than one of the processors 6010 and 6030 may comprise functionality of the comprehensive logic circuitry 6026 such as the processor 6030 and/or the processor within the deep learning accelerator 6067 coupled with the chipset 6060 via an interface (I/F) 6066. The I/F 6066 may be, for example, a Peripheral Component Interconnect-enhanced (PCI-e).

The first processor 6010 couples to a chipset 6060 via P-P interconnects 6052 and 6062 and the second processor 6030 couples to a chipset 6060 via P-P interconnects 6054 and 6064. Direct Media Interfaces (DMIs) 6057 and 6058 may couple the P-P interconnects 6052 and 6062 and the P-P interconnects 6054 and 6064, respectively. The DMI may be a high-speed interconnect that facilitates, e.g., eight Giga Transfers per second (GT/s) such as DMI 3.0. In other embodiments, the processors 6010 and 6030 may interconnect via a bus.

The chipset 6060 may comprise a controller hub such as a platform controller hub (PCH). The chipset 6060 may include a system clock to perform clocking functions and include interfaces for an input/output (I/O) bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 6060 may comprise more than one controller hub such as a chipset with a memory controller hub, a graphics controller hub, and an I/O controller hub.

In the present embodiment, the chipset 6060 couples with a trusted platform module (TPM) 6072 and the unified extensible firmware interface (UEFI), BIOS, Flash component 6074 via an interface (I/F) 6070. The TPM 6072 is a dedicated microcontroller designed to secure hardware by integrating cryptographic keys into devices. The UEFI, BIOS, Flash component 6074 may provide pre-boot code.

Furthermore, chipset 6060 includes an I/F 6066 to couple chipset 6060 with a high-performance graphics engine, graphics card 6065. In other embodiments, the system 6000 may include a flexible display interface (FDI) between the processors 6010 and 6030 and the chipset 6060. The FDI interconnects a graphics processor core in a processor with the chipset 6060.

Various I/O devices 6092 couple to the bus 6081, along with a bus bridge 6080 which couples the bus 6081 to a second bus 6091 and an I/F 6068 that connects the bus 6081 with the chipset 6060. In one embodiment, the second bus 6091 may be a low pin count (LPC) bus. Various devices may couple to the second bus 6091 including, for example, a keyboard 6082, a mouse 6084, communication devices 6086 and a data storage unit 6088 that may store code such as the comprehensive logic circuitry 6096. Furthermore, an audio I/O 6090 may couple to second bus 6091. Many of the I/O devices 6092, communication devices 6086, and the data storage unit 6088 may reside on the motherboard 6005 while the keyboard 6082 and the mouse 6084 may be add-on peripherals. In other embodiments, some or all the I/O devices 6092, communication devices 6086, and the data storage unit 6088 are add-on peripherals and do not reside on the motherboard 6005.

Figure 7:
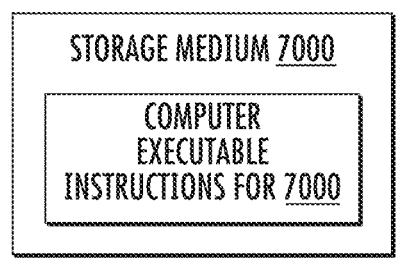
FIGS. 7-8 depict embodiments of a storage medium and a computing platform such as the server computer, HCP device, and the patient device shown in FIG. 1A and FIG. 6.

FIG. 7 illustrates an example of a storage medium 7000 to store processor data structures. Storage medium 7000 may comprise an article of manufacture. In some examples, storage medium 7000 may include any non-transitory computer readable medium or machine readable medium, such as an optical, magnetic or semiconductor storage. Storage medium 7000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
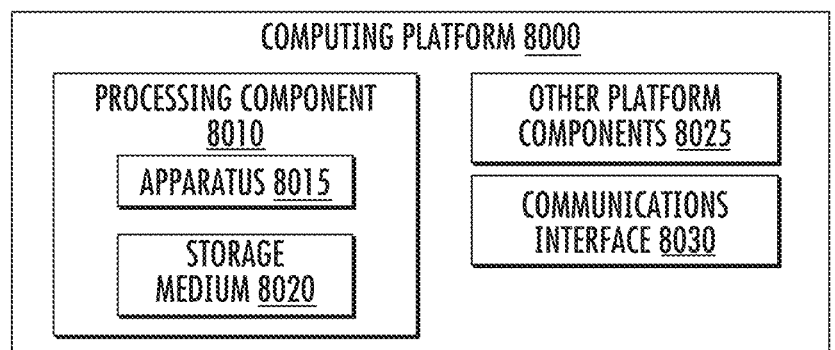

FIG. 8 illustrates an example computing platform 8000. In some examples, as shown in FIG. 8, computing platform 8000 may include a processing component 8010, other platform components or a communications interface 8030. According to some examples, computing platform 8000 may be implemented in a computing device such as a server in a system such as a data center or server farm that supports a manager or controller for managing configurable computing resources. Furthermore, the communications interface 8030 may comprise a wake-up radio (WUR) and may can wake up a main radio of the computing platform 8000.

According to some examples, processing component 8010 may execute processing operations or logic for apparatus 8015 described herein such as the comprehensive logic circuitry 180 discussed in conjunction with FIGS. 1-5. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 8000 described herein, may be included or omitted in various embodiments of computing platform 8000, as suitably desired.

The components and features of computing platform 8000 may be implemented using any combination of discrete circuitry, ASICs, logic gates and/or single chip architectures. Further, the features of computing platform 8000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 8000 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

FURTHER EXAMPLES OF EMBODIMENTS

In Example 1, an apparatus to determine deformity parameters for generation of a treatment plan for an external fixator, the apparatus comprising a memory; and logic circuitry coupled with the memory to: identify a preoperative osteotomy location on a first image of a bone; determine a first portion and a second portion of the first image, the first portion and second portion comprising bone segments of the bone, the bone segments representative of a potential, postoperative result of an osteotomy; display the first image and the potential, postoperative result of the osteotomy including the bone segments; determine a postoperative cut line or cut plane for deformity analysis based on a second image, the second image comprising a postoperative image of a first bone segment and a second bone segment, of the bone, attached to an external fixator; adjust a display of the first bone segment and second bone segment via the graphical user interface, based on input received, to move the second bone segment in the display independently from movement of the first bone segment in the display; and determine movements of the second bone segment with respect to the first bone segment in the display to determine the deformity parameters. In Example 2, the apparatus of Example 1, further comprising logic circuitry coupled with the memory to generate a treatment plan with a prescription for an external fixator based on the movements, a correction rate, and information about the external fixator. In Example 3, the apparatus of Example 1, wherein the logic circuitry comprises a processor and a chipset coupled with the memory and further comprising a display device coupled with the logic circuitry. In Example 4, the apparatus of Example 1, wherein determining a postoperative cut line or cut plane comprises identification of one or more points on the first bone segment. In Example 5, the apparatus of Example 4, wherein the second image comprises a three-dimensional image, the logic circuitry to determine a cut plane adjacent to the first bone segment. In Example 6, the apparatus of Example 4, wherein the second image comprises a two-dimensional image, the logic circuitry to determine a cut line adjacent to the first bone segment and to analyze a third image comprising a perspective of the first and second bones segments different from a perspective of the first and second bones segments. In Example 7, the apparatus of Example 6, the logic circuitry to display the first image and a second two-dimensional, preoperative image of the bone, wherein the first image and the second two-dimensional, preoperative image comprise different perspectives of the bone, wherein adjustments to the osteotomy location on either image causes real-time adjustments to both the images and real-time adjustments to the potential, postoperative result of the osteotomy. In Example 8, the apparatus of Example 1, further comprising adjusting, in real-time, the potential, postoperative result of the osteotomy during receipt of adjustments to the preoperative osteotomy location via the graphical user interface, wherein the preoperative osteotomy location comprises an osteotomy plane, an osteotomy line, an osteotomy rotation point, or a combination thereof. In Example 9, the apparatus of Example 1, the logic circuitry to adjust the position, rotation, or a combination of the position and rotation of one of the bone segments, in the potential, postoperative result of the osteotomy, in response to input received via the graphical user interface. In Example 10, the apparatus of Example 1, the logic circuitry to highlight an overlap or otherwise communicate an impingement that results from manipulation of one of the bone segments, in the potential, postoperative result of the osteotomy, via the graphical user interface. In Example 11, the apparatus of Example 1, the logic circuitry to display, in real-time, deformity parameters responsive to movement of the second bone segment in the second image, via the graphical user interface.

In Example 12, a non-transitory computer-readable medium, comprising instructions, which when executed by a processor, cause the processor to perform operations to: identify a preoperative osteotomy location on a first image of a bone; determine a first portion and a second portion of the first image, the first portion and second portion comprising bone segments of the bone, the bone segments representative of a potential, postoperative result of an osteotomy; display the first image and the potential, postoperative result of the osteotomy including the bone segments; determine a postoperative cut line or cut plane for deformity analysis based on a second image, the second image comprising a postoperative image of a first bone segment and a second bone segment, of the bone, attached to an external fixator; adjust a display of the first bone segment and second bone segment via the graphical user interface, based on input received, to move the second bone segment in the display independently from movement of the first bone segment in the display; and determine movements of the second bone segment with respect to the first bone segment in the display to determine the deformity parameters. In Example 13, the non-transitory computer-readable medium of Example 12, further comprising instructions to cause the processor to perform operations to generate a treatment plan with a prescription for an external fixator based on the movements, a correction rate, and information about the external fixator. In Example 14, the non-transitory computer-readable medium of Example 12, wherein determining a postoperative cut line or cut plane comprises identification of one or more points on the first bone segment. In Example 15, the non-transitory computer-readable medium of Example 14, wherein the second image comprises a three-dimensional image, and further comprising instructions to cause the processor to perform operations to determine a cut plane adjacent to the first bone segment. In Example 16, the non-transitory computer-readable medium of Example 14, wherein the second image comprises a two-dimensional image, and further comprising instructions to cause the processor to perform operations to determine a cut line adjacent to the first bone segment and to analyze a third image comprising a perspective of the first and second bones segments different from a perspective of the first and second bones segments. In Example 17, the non-transitory computer-readable medium of Example 16, wherein comprising instructions to cause the processor to perform operations to display the first image and a second two-dimensional, preoperative image of the bone, wherein the first image and the second two-dimensional, preoperative image comprise different perspectives of the bone, wherein adjustments to the osteotomy location on either image causes real-time adjustments to both the images and real-time adjustments to the potential, postoperative result of the osteotomy. In Example 18, the non-transitory computer-readable medium of Example 12, further comprising instructions to cause the processor to perform operations to adjust, in real-time, the potential, postoperative result of the osteotomy during receipt of adjustments to the preoperative osteotomy location via the graphical user interface, wherein the preoperative osteotomy location comprises an osteotomy plane, an osteotomy line, an osteotomy rotation point, or a combination thereof. In Example 19, the non-transitory computer-readable medium of Example 12, wherein comprising instructions to cause the processor to perform operations to adjust the position, rotation, or a combination of the position and rotation of one of the bone segments, in the potential, postoperative result of the osteotomy, in response to input received via the graphical user interface. In Example 20, the non-transitory computer-readable medium of Example 12, wherein comprising instructions to cause the processor to perform operations to highlight an overlap or otherwise communicate an impingement that results from manipulation of one of the bone segments, in the potential, postoperative result of the osteotomy, via the graphical user interface. In Example 21, the non-transitory computer-readable medium of Example 12, wherein comprising instructions to cause the processor to perform operations to display, in real-time, deformity parameters responsive to movement of the second bone segment in the second image, via the graphical user interface.

In Example 22, a method to determine deformity parameters for generation of a treatment plan for an external fixator, the method comprising: identifying a preoperative osteotomy location on a first image of a bone; determining a first portion and a second portion of the first image, the first portion and second portion comprising bone segments of the bone, the bone segments representative of a potential, postoperative result of an osteotomy; displaying the first image and the potential, postoperative result of the osteotomy including the bone segments; determining a postoperative cut line or cut plane for deformity analysis based on a second image, the second image comprising a postoperative image of a first bone segment and a second bone segment, of the bone, attached to an external fixator; adjusting a display of the first bone segment and second bone segment via the graphical user interface, based on input received, to move the second bone segment in the display independently from movement of the first bone segment in the display; and determining movements of the second bone segment with respect to the first bone segment in the display to determine the deformity parameters. In Example 23, the method of Example 22, further comprising generating a treatment plan with a prescription for an external fixator based on the movements, a correction rate, and information about the external fixator. In Example 24, the method of Example 22, wherein determining a postoperative cut line or cut plane comprises identification of one or more points on the first bone segment. In Example 25, the method of Example 24, wherein the second image comprises a three-dimensional image, and further comprising determining a cut plane adjacent to the first bone segment. In Example 26, the method of Example 24, wherein the second image comprises a two-dimensional image, further comprising determining a cut line adjacent to the first bone segment and analyzing a third image comprising a perspective of the first and second bones segments different from a perspective of the first and second bones segments. In Example 27, the method of Example 26, wherein comprising displaying the first image and a second two-dimensional, preoperative image of the bone, wherein the first image and the second two-dimensional, preoperative image comprise different perspectives of the bone, wherein adjustments to the osteotomy location on either image causes real-time adjustments to both the images and real-time adjustments to the potential, postoperative result of the osteotomy. In Example 28, the method of Example 22, further comprising adjusting, in real-time, the potential, postoperative result of the osteotomy during receipt of adjustments to the preoperative osteotomy location via the graphical user interface, wherein the preoperative osteotomy location comprises an osteotomy plane, an osteotomy line, an osteotomy rotation point, or a combination thereof. In Example 29, the method of Example 22, further comprising adjusting the position, rotation, or a combination of the position and rotation of one of the bone segments, in the potential, postoperative result of the osteotomy, in response to input received via the graphical user interface. In Example 30, the method of Example 22, further comprising highlighting an overlap or otherwise communicating an impingement that results from manipulation of one of the bone segments, in the potential, postoperative result of the osteotomy, via the graphical user interface. In Example 31, the method of Example 22, further comprising displaying, in real-time, deformity parameters responsive to movement of the second bone segment in the second image, via the graphical user interface.

In Example 32, an apparatus to determine deformity parameters for generation of a treatment plan for an external fixator, the method comprising: a means for identifying a preoperative osteotomy location on a first image of a bone; a means for determining a first portion and a second portion of the first image, the first portion and second portion comprising bone segments of the bone, the bone segments representative of a potential, postoperative result of an osteotomy; a means for displaying the first image and the potential, postoperative result of the osteotomy including the bone segments; a means for determining a postoperative cut line or cut plane for deformity analysis based on a second image, the second image comprising a postoperative image of a first bone segment and a second bone segment, of the bone, attached to an external fixator; a means for adjusting a display of the first bone segment and second bone segment via the graphical user interface, based on input received, to move the second bone segment in the display independently from movement of the first bone segment in the display; and a means for determining movements of the second bone segment with respect to the first bone segment in the display to determine the deformity parameters. In Example 33, the apparatus of Example 32, further comprising a means for generating a treatment plan with a prescription for an external fixator based on the movements, a correction rate, and information about the external fixator. In Example 34, the apparatus of Example 32, wherein the means for determining a postoperative cut line or cut plane comprises a means for identifying one or more points on the first bone segment. In Example 35, the apparatus of Example 34, wherein the second image comprises a three-dimensional image, and further comprising a means for determining a cut plane adjacent to the first bone segment. In Example 36, the apparatus of Example 34, wherein the second image comprises a two-dimensional image, further comprising a means for determining a cut line adjacent to the first bone segment and a means for analyzing a third image comprising a perspective of the first and second bones segments different from a perspective of the first and second bones segments. In Example 37, the apparatus of Example 36, further comprising a means for displaying the first image and a second two-dimensional, preoperative image of the bone, wherein the first image and the second two-dimensional, preoperative image comprise different perspectives of the bone, wherein adjustments to the osteotomy location on either image causes real-time adjustments to both the images and real-time adjustments to the potential, postoperative result of the osteotomy. In Example 38, the apparatus of Example 32, further comprising a means for adjusting, in real-time, the potential, postoperative result of the osteotomy during receipt of adjustments to the preoperative osteotomy location via the graphical user interface, wherein the preoperative osteotomy location comprises an osteotomy plane, an osteotomy line, an osteotomy rotation point, or a combination thereof. In Example 39, the apparatus of Example 32, further comprising a means for adjusting the position, rotation, or a combination of the position and rotation of one of the bone segments, in the potential, postoperative result of the osteotomy, in response to input received via the graphical user interface. In Example 40, the apparatus of Example 32, further comprising a means for highlighting an overlap or a means for otherwise communicating an impingement that results from manipulation of one of the bone segments, in the potential, postoperative result of the osteotomy, via the graphical user interface. In Example 41, the apparatus of Example 32, further comprising a means for displaying, in real-time, deformity parameters responsive to movement of the second bone segment in the second image, via the graphical user interface. In Example 42, the apparatus of Example 32, wherein the means for identifying the preoperative osteotomy location comprises a processor and a chipset coupled with a memory and further comprising a display device coupled with the chipset.

In Example 43, an apparatus to determine a preoperative correction of a deformed bone, the method comprising: a means for identifying a preoperative osteotomy location on a first image of a bone; a means for determining a first portion and a second portion of the first image, the first portion and second portion comprising a different one of bone segments of the bone, the bone segments representative of a potential, postoperative result of an osteotomy; a means for displaying the first image and the potential, postoperative result of the osteotomy including the bone segments as a second image; a means for adjusting a display of the bone segments in the first portion and the second portion, to move the bone segments independently to correct the deformed bone via the graphical user interface, based on input received; and a means for determining movements of the second portion with respect to the first portion in the display to determine the deformity parameters pre-operatively. In Example 44, the apparatus of Example 43, further comprising a means for generating a treatment plan with a prescription for an external fixator based on the preoperative movements of the bone segments, a correction rate, and information about the external fixator. In Example 45, the apparatus of Example 43, wherein the means for determining the first and second portions of the first image comprises a means for identifying one or more points on the first bone segment. In Example 46, the apparatus of Example 45, wherein the second image comprises a three-dimensional image, and further comprising a means for determining a cut plane adjacent to the first bone segment. In Example 47, the apparatus of Example 43, further comprising a means for adjusting, in real-time, the potential, postoperative result of the osteotomy during receipt of adjustments to the preoperative osteotomy location via the graphical user interface, wherein the preoperative osteotomy location comprises an osteotomy plane, an osteotomy line, an osteotomy rotation point, or a combination thereof. In Example 48, the apparatus of Example 43, wherein the means for identifying the preoperative osteotomy location comprises a processor and a chipset coupled with a memory and further comprising a display device coupled with the chipset.

In Example 49, an apparatus to generate a treatment plan to correct a deformed bone with an external fixator, comprising: a means for displaying a first image of a first bone segment and a second bone segment; a means for determining a first portion and a second portion of the first image, the first portion comprising a first bone segment and the second portion comprising a second bone segment of the bone; a means for adjusting a display of the first bone segment and second bone segment in the first image to correct the deformed bone via the graphical user interface, based on input received, to move the second bone segment in the display independently from movement of the first bone segment in the display; a means for displaying a second image of the first bone segment and the second bone segment at a perspective that is different from a perspective of the first image; a means for dividing the second image into a first portion and a second portion of the first image, the first portion and second portion comprising bone segments of the bone; a means for adjusting a display of the first bone segment and second bone segment in the second image to correct the deformed bone via the graphical user interface, based on input received, to move the second bone segment in the display independently from movement of the first bone segment in the display; a means for determining movements of the second bone segment with respect to the first bone segment in the first and second images to determine the deformity parameters of the bone segments prior to correction; and a means for defining a correction rate and information about the external fixator. In Example 50, the apparatus of Example 49, wherein the first and second images are different perspectives of a single three-dimensional image of the first and second bone segments. In Example 51, the apparatus of Example 50, wherein a three-dimensional rotation point is defined about which the second portion of the three-dimensional image rotates relative the first portion of the three-dimensional image. In Example 52, the apparatus of Example 49, further comprising a means for resolving a conflict between a deformity parameter common to the corrected first image and the corrected second image. In Example 53, the apparatus of Example 49, wherein rotation points are defined in each image about which the second portion of each image is rotated relative to the first portion of each image. In Example 54, the apparatus of Example 53, wherein the rotation points are located at a point common to the two images that can be projected into three-dimensional coordinate system as a single point.

In Example 55, a non-transitory computer-readable medium, comprising instructions, which when executed by a processor, cause the processor to perform operations to: identify a preoperative osteotomy location on a first image of a bone; determine a first portion and a second portion of the first image, the first portion and second portion comprising bone segments of the bone, the bone segments representative of a potential, postoperative result of an osteotomy; display the first image and the potential, postoperative result of the osteotomy including the bone segments; adjust a display of the first bone segment and second bone segment via the graphical user interface, based on input received, to move the second bone segment in the display independently from movement of the first bone segment in the display; and determine movements of the second bone segment with respect to the first bone segment in the display to determine the deformity parameters. In Example 56, the non-transitory computer-readable medium of Example 55, further comprising instructions to cause the processor to perform operations to generate a treatment plan with a prescription for an external fixator based on the movements, a correction rate, and information about the external fixator. In Example 57, the non-transitory computer-readable medium of Example 55, wherein determining a postoperative cut line or cut plane comprises identification of one or more points on the first bone segment. In Example 58, the non-transitory computer-readable medium of Example 55, further comprising instructions to cause the processor to perform operations to adjust, in real-time, the potential, postoperative result of the osteotomy during receipt of adjustments to the preoperative osteotomy location via the graphical user interface, wherein the preoperative osteotomy location comprises an osteotomy plane, an osteotomy line, an osteotomy rotation point, or a combination thereof. In Example 59, the non-transitory computer-readable medium of Example 55, wherein comprising instructions to cause the processor to perform operations to adjust the position, rotation, or a combination of the position and rotation of one of the bone segments, in the potential, postoperative result of the osteotomy, in response to input received via the graphical user interface. In Example 60, the non-transitory computer-readable medium of Example 55, wherein comprising instructions to cause the processor to perform operations to highlight an overlap or otherwise communicate an impingement that results from manipulation of one of the bone segments, in the potential, postoperative result of the osteotomy, via the graphical user interface. In Example 61, the non-transitory computer-readable medium of Example 55, wherein comprising instructions to cause the processor to perform operations to display, in real-time, deformity parameters responsive to movement of the second bone segment in the second image, via the graphical user interface.

In Example 62, a non-transitory computer-readable medium, comprising instructions, which when executed by a processor, cause the processor to perform operations to: display a first image of a first bone segment and a second bone segment; determine a first portion and a second portion of the first image, the first portion comprising a first bone segment and the second portion comprising a second bone segment of the bone; adjust a display of the first bone segment and second bone segment in the first image to correct the deformed bone via the graphical user interface, based on input received, to move the second bone segment in the display independently from movement of the first bone segment in the display; display a second image of the first bone segment and the second bone segment at a perspective that is different from a perspective of the first image; divide the second image into a first portion and a second portion of the first image, the first portion and second portion comprising bone segments of the bone; adjust a display of the first bone segment and second bone segment in the second image to correct the deformed bone via the graphical user interface, based on input received, to move the second bone segment in the display independently from movement of the first bone segment in the display; determine movements of the second bone segment with respect to the first bone segment in the first and second images to determine the deformity parameters of the bone segments prior to correction; and define a correction rate and information about the external fixator. In Example 63, the non-transitory computer-readable medium of Example 62, wherein the first and second images are different perspectives of a single three-dimensional image of the first and second bone segments. In Example 64, the non-transitory computer-readable medium of Example 62, wherein a three-dimensional rotation point is defined about which the second portion of the three-dimensional image rotates relative the first portion of the three-dimensional image. In Example 65, the non-transitory computer-readable medium of Example 62, wherein comprising instructions to cause the processor to perform operations to further resolve a conflict between a deformity parameter common to the corrected first image and the corrected second image. In Example 66, the non-transitory computer-readable medium of Example 62, wherein rotation points are defined in each image about which the second portion of each image is rotated relative to the first portion of each image. In Example 67, the non-transitory computer-readable medium of Example 66, wherein the rotation points are located at a point common to the two images that can be projected into three-dimensional coordinate system as a single point.

In Example 68, an apparatus to determine deformity parameters, the apparatus comprising: a means for determining a postoperative cut line or cut plane for deformity analysis based on a first image, the first image comprising a postoperative image of a first bone segment and a second bone segment, of a bone; a means for adjusting a display of the first bone segment and second bone segment via the graphical user interface, based on input received, to move the second bone segment in the display independently from movement of the first bone segment in the display; and a means for determining movements of the second bone segment with respect to the first bone segment in the display to determine the deformity parameters. In Example 69, the apparatus of Example 68, further comprising: a means for identifying a preoperative osteotomy location on a second image of the bone; a means for determining a first portion and a second portion of the second image, the first portion and second portion comprising bone segments of the bone, the bone segments representative of a potential, postoperative result of an osteotomy; and a means for displaying the second image and the potential, postoperative result of the osteotomy including the bone segments. In Example 70, the apparatus of Example 69, wherein the means for identifying the preoperative osteotomy location comprises a processor and a chipset coupled with a memory and further comprising a display device coupled with the chipset. In Example 71, the apparatus of Example 69, further comprising a means for displaying the second image and a two-dimensional, preoperative image of the bone, wherein the second image and the two-dimensional, preoperative image comprise different perspectives of the bone, wherein adjustments to the osteotomy location on either image causes real-time adjustments to both the images and real-time adjustments to the potential, postoperative result of the osteotomy. In Example 72, the apparatus of Example 69, further comprising a means for adjusting, in real-time, the potential, postoperative result of the osteotomy during receipt of adjustments to the preoperative osteotomy location via the graphical user interface, wherein the preoperative osteotomy location comprises an osteotomy plane, an osteotomy line, an osteotomy rotation point, or a combination thereof. In Example 73, the apparatus of Example 68, further comprising a means for generating a treatment plan with a prescription for an external fixator based on the movements, a correction rate, and information about the external fixator, wherein the first bone segment and the second bone segment are attached to the external fixator in the first image. In Example 74, the apparatus of Example 68, wherein the means for determining a postoperative cut line or cut plane comprises a means for identifying one or more points on the first bone segment, wherein the first image comprises a three-dimensional image, and further comprising a means for determining a cut plane adjacent to the first bone segment. In Example 75, the apparatus of Example 68, wherein the means for determining a postoperative cut line or cut plane comprises a means for identifying one or more points on the first bone segment, wherein the first image comprises a two-dimensional image, further comprising a means for determining a cut line adjacent to the first bone segment and a means for analyzing a third image comprising a perspective of the first and second bones segments different from a perspective of the first and second bones segments shown in the second image.

In Example 76, a non-transitory computer-readable medium, comprising, which when executed by a processor, cause the processor to perform operations to: determine a postoperative cut line or cut plane for deformity analysis based on a first image, the first image comprising a postoperative image of a first bone segment and a second bone segment, of a bone; adjust a display of the first bone segment and second bone segment via the graphical user interface, based on input received, to move the second bone segment in the display independently from movement of the first bone segment in the display; and determine movements of the second bone segment with respect to the first bone segment in the display to determine deformity parameters. In Example 77, the apparatus of Example 76, further comprising instructions to cause the processor to perform operations to: identify a preoperative osteotomy location on a second image of the bone; determine a first portion and a second portion of the second image, the first portion and second portion comprising bone segments of the bone, the bone segments representative of a potential, postoperative result of an osteotomy; and display the second image and the potential, postoperative result of the osteotomy including the bone segments. In Example 78, the non-transitory computer-readable medium of Example 77, further comprising instructions to cause the processor to perform operations to adjust, in real-time, the potential, postoperative result of the osteotomy during receipt of adjustments to the preoperative osteotomy location via the graphical user interface, wherein the preoperative osteotomy location comprises an osteotomy plane, an osteotomy line, an osteotomy rotation point, or a combination thereof. In Example 79, the non-transitory computer-readable medium of Example 77, wherein comprising instructions to cause the processor to perform operations to adjust the position, rotation, or a combination of the position and rotation of one of the bone segments, in the potential, postoperative result of the osteotomy, in response to input received via the graphical user interface. In Example 80, the non-transitory computer-readable medium of Example 77, further comprising instructions to cause the processor to perform operations to highlight an overlap or otherwise communicate an impingement that results from manipulation of one of the bone segments, in the potential, postoperative result of the osteotomy, via the graphical user interface. In Example 81, the non-transitory computer-readable medium of Example 76, further comprising instructions to cause the processor to perform operations to generate a treatment plan with a prescription for an external fixator based on the movements, a correction rate, and information about the external fixator, wherein the first bone segment and the second bone segment are attached to the external fixator in the first image. In Example 82, the non-transitory computer-readable medium of Example 76, wherein determining a postoperative cut line or cut plane comprises identification of one or more points on the first bone segment and further comprising instructions to cause the processor to perform operations to display, in real-time, deformity parameters responsive to movement of the second bone segment in the second image, via the graphical user interface.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the certain embodiments or configurations of the disclosure may be combined in alternate embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority but are used to distinguish one feature from another. The drawings are for purposes of illustration only and the dimensions, positions, order and relative to sizes reflected in the drawings attached hereto may vary.

What is claimed is:

1. An apparatus to determine deformity parameters, the apparatus comprising:
a means for determining a postoperative cut line or cut plane for deformity analysis based on a first image, the first image comprising a postoperative image of a first bone segment and a second bone segment, of a bone;
a means for adjusting a display of the first bone segment and second bone segment via a graphical user interface, based on input received, to move the second bone segment in the display independently from movement of the first bone segment in the display;
a means for determining movements of the second bone segment with respect to the first bone segment in the display to determine the deformity parameters;
a means for identifying a preoperative osteotomy location on a second image of the bone comprising a processor and a chipset coupled with a memory and further comprising a display device coupled with the chipset;
a means for determining a first portion and a second portion of the second image, the first portion and second portion comprising bone segments of the bone, the bone segments representative of a potential, postoperative result of an osteotomy; and
a means for displaying the second image and the potential, postoperative result of the osteotomy including the bone segments.

2. The apparatus of claim 1, further comprising a means for displaying the second image and a two-dimensional, preoperative image of the bone, wherein the second image and the two-dimensional, preoperative image comprise different perspectives of the bone, wherein adjustments to the osteotomy location on either image causes real-time adjustments to both the images and real-time adjustments to the potential, postoperative result of the osteotomy.

3. The apparatus of claim 1, further comprising a means for generating a treatment plan with a prescription for an external fixator based on the movements, a correction rate, and information about the external fixator, wherein the first bone segment and the second bone segment are attached to the external fixator in the first image.

4. The apparatus of claim 1, wherein the means for determining a postoperative cut line or cut plane comprises a means for identifying one or more points on the first bone segment, wherein the first image comprises a three-dimensional image, and further comprising a means for determining a cut plane adjacent to the first bone segment.

5. The apparatus of claim 1, wherein the means for determining a postoperative cut line or cut plane comprises a means for identifying one or more points on the first bone segment, wherein the first image comprises a two-dimensional image, further comprising a means for determining a cut line adjacent to the first bone segment and a means for analyzing a third image comprising a perspective of the first and second bones segments different from a perspective of the first and second bones segments shown in the second image.

6. A non-transitory computer-readable medium, comprising, which when executed by a processor, cause the processor to perform operations to:
determine a postoperative cut line or cut plane for deformity analysis based on a first image, the first image comprising a postoperative image of a first bone segment and a second bone segment, of a bone;
adjust a display of the first bone segment and second bone segment via a graphical user interface, based on input received, to move the second bone segment in the display independently from movement of the first bone segment in the display;
determine movements of the second bone segment with respect to the first bone segment in the display to determine deformity parameters;
identify a preoperative osteotomy location on a second image of the bone;
determine a first portion and a second portion of the second image, the first portion and second portion comprising bone segments of the bone, the bone segments representative of a potential, postoperative result of an osteotomy;
display the second image and the potential, postoperative result of the osteotomy including the bone segments; and
adjust, in real-time, the potential, postoperative result of the osteotomy during receipt of adjustments to the preoperative osteotomy location via the graphical user interface, wherein the preoperative osteotomy location comprises an osteotomy plane, an osteotomy line, an osteotomy rotation point, or a combination thereof.

7. The non-transitory computer-readable medium of claim 6, wherein comprising instructions to cause the processor to perform operations to adjust the position, rotation, or a combination of the position and rotation of one of the bone segments, in the potential, postoperative result of the osteotomy, in response to input received via the graphical user interface.

8. The non-transitory computer-readable medium of claim 6, further comprising instructions to cause the processor to perform operations to generate a treatment plan with a prescription for an external fixator based on the movements, a correction rate, and information about the external fixator, wherein the first bone segment and the second bone segment are attached to the external fixator in the first image.

9. The non-transitory computer-readable medium of claim 6, wherein determining a postoperative cut line or cut plane comprises identification of one or more points on the first bone segment and further comprising instructions to cause the processor to perform operations to display, in real-time, deformity parameters responsive to movement of the second bone segment in the second image, via the graphical user interface.

10. An apparatus to determine deformity parameters, the apparatus comprising:
a means for determining a postoperative cut line or cut plane for deformity analysis based on a first image, the first image comprising a postoperative image of a first bone segment and a second bone segment, of a bone;
a means for adjusting a display of the first bone segment and second bone segment via a graphical user interface, based on input received, to move the second bone segment in the display independently from movement of the first bone segment in the display;
a means for determining movements of the second bone segment with respect to the first bone segment in the display to determine the deformity parameters;

a means for identifying a preoperative osteotomy location on a second image of the bone;

a means for determining a first portion and a second portion of the second image, the first portion and second portion comprising bone segments of the bone, the bone segments representative of a potential, postoperative result of an osteotomy;

a means for displaying the second image and the potential, postoperative result of the osteotomy including the bone segments; and a means for adjusting, in real-time, the potential, postoperative result of the osteotomy during receipt of adjustments to the preoperative osteotomy location via the graphical user interface, wherein the preoperative osteotomy location comprises an osteotomy plane, an osteotomy line, an osteotomy rotation point, or a combination thereof.

11. A non-transitory computer-readable medium comprising, which when executed by a processor, cause the processor to perform operations to:

determine a postoperative cut line or cut plane for deformity analysis based on a first image, the first image comprising a postoperative image of a first bone segment and a second bone segment, of a bone;

adjust a display of the first bone segment and second bone segment via a graphical user interface, based on input received, to move the second bone segment in the display independently from movement of the first bone segment in the display:

determine movements of the second bone segment with respect to the first bone segment in the display to determine deformity parameters;

identify a preoperative osteotomy location on a second image of the bone;

determine a first portion and a second portion of the second image, the first portion and second portion comprising bone segments of the bone, the bone segments representative of a potential, postoperative result of an osteotomy;

display the second image and the potential, postoperative result of the osteotomy including the bone segments; and highlight an overlap or otherwise communicate an impingement that results from manipulation of one of the bone segments, in the potential, postoperative result of the osteotomy, via the graphical user interface.

* * * * *